(12) United States Patent
Tour et al.

(10) Patent No.: US 9,455,094 B2
(45) Date of Patent: Sep. 27, 2016

(54) GRAPHENE-CARBON NANOTUBE HYBRID MATERIALS AND USE AS ELECTRODES

(71) Applicants: James M. Tour, Bellaire, TX (US); Yu Zhu, Houston, TX (US); Lei Li, Houston, TX (US); Zheng Yan, Houston, TX (US); Jian Lin, Houston, TX (US)

(72) Inventors: James M. Tour, Bellaire, TX (US); Yu Zhu, Houston, TX (US); Lei Li, Houston, TX (US); Zheng Yan, Houston, TX (US); Jian Lin, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 264 days.

(21) Appl. No.: 14/358,864

(22) PCT Filed: Nov. 19, 2012

(86) PCT No.: PCT/US2012/065894
§ 371 (c)(1),
(2) Date: May 16, 2014

(87) PCT Pub. No.: WO2013/119295
PCT Pub. Date: Aug. 15, 2013

(65) Prior Publication Data
US 2014/0313636 A1    Oct. 23, 2014

Related U.S. Application Data

(60) Provisional application No. 61/561,578, filed on Nov. 18, 2011.

(51) Int. Cl.
*H01G 11/36* (2013.01)
*C01B 31/04* (2006.01)
(Continued)

(52) U.S. Cl.
CPC ............. *H01G 11/36* (2013.01); *B82Y 30/00* (2013.01); *B82Y 40/00* (2013.01); *C01B 31/022* (2013.01);
(Continued)

(58) Field of Classification Search
CPC ...... H01G 11/36; H01G 11/28; H01G 11/68; H01G 9/0036; H01G 9/028
USPC ......... 361/502, 503–504, 512, 517, 528–529
See application file for complete search history.

(56) References Cited

U.S. PATENT DOCUMENTS 8,861,183 B2 * 10/2014 Jung ...................... H01G 11/28
361/502
9,017,854 B2 * 4/2015 Fleischer ............... B82Y 30/00
29/25.41
(Continued)

FOREIGN PATENT DOCUMENTS

KR    10-2011-0032999    3/2011
WO    2011016616 A2    2/2011
WO    WO-2011112589 A1    9/2011

OTHER PUBLICATIONS

Intellectual Property Office of Singapore, Written Opinion, Application No. 11201503710X, Oct. 23, 2015.
(Continued)

*Primary Examiner* — Nguyen Ha
(74) *Attorney, Agent, or Firm* — Winstead PC

(57) ABSTRACT

Provided are methods of making graphene-carbon nanotube hybrid materials. Such methods generally include: (1) associating a graphene film with a substrate; (2) applying a catalyst and a carbon source to the graphene film; and (3) growing carbon nanotubes on the graphene film. The grown carbon nanotubes become covalently linked to the graphene film through carbon-carbon bonds that are located at one or more junctions between the carbon nanotubes and the graphene film. In addition, the grown carbon nanotubes are in ohmic contact with the graphene film through the carbon-carbon bonds at the one or more junctions. The one or more junctions may include seven-membered carbon rings. Also provided are the formed graphene-carbon nanotube hybrid materials.

55 Claims, 42 Drawing Sheets

(51) Int. Cl.
C01B 31/02 (2006.01)
H01G 11/72 (2013.01)
B82Y 30/00 (2011.01)
B82Y 40/00 (2011.01)

(52) U.S. Cl.
CPC ....... *C01B 31/0226* (2013.01); *C01B 31/0438* (2013.01); *C01B 31/0484* (2013.01); *H01G 11/72* (2013.01); *Y02E 60/13* (2013.01); *Y10T 428/24893* (2015.01); *Y10T 428/30* (2015.01)

(56) References Cited

U.S. PATENT DOCUMENTS

| | | | |
|---|---|---|---|
| 9,218,917 B2* | 12/2015 | Brambilla | C01B 31/0233 |
| 9,257,704 B2* | 2/2016 | Balu | B82Y 30/00 |
| 2010/0081057 A1 | 4/2010 | Liu et al. | |
| 2010/0159366 A1 | 6/2010 | Shao-Horn et al. | |
| 2012/0121891 A1 | 5/2012 | Kim et al. | |
| 2012/0192931 A1 | 8/2012 | Jeon et al. | |

OTHER PUBLICATIONS

International Search Report and Written Opinion for PCT/US2012/065894, Mailed on Jul. 23, 2013.
Paul, R. K. et al. Synthesis of a pillared graphene nanostructure: a counterpart of three-dimensional carbon architectures. Small 6, 2309-2313, (2010).
Fan, Z. et al. A Three-dimensional carbon nanotube/graphene sandwich and its application as electrode in supercapacitors. Adv. Mater. 22, 3723-3728, (2010).
Zhang, L. L., Xiong, Z. G. & Zhao, X. S. Pillaring chemically exfoliated graphene oxide with carbon nanotubes for photocatalytic degradation of dyes under visible light irradiation. ACS Nano 4, 7030-7036, (2010).
Lee, D. H. et al. Versatile carbon hybrid films composed of vertical carbon nanotubes grown on mechanically compliant graphene films. Adv. Mater. 22, 1247-1252, (2010).
Pint, C., Alvarez, N. & Hauge, R. Odako growth of dense arrays of single-walled carbon nanotubes attached to carbon surfaces. Nano Research 2, 526-534, (2009).
Jousseaume, V.; Cuzzocrea, J.; Bernier, N.; Renard, V. Few Graphene Layers/Carbon nanotube Composites Grown at Complementary-Metal-Oxide-Semiconductor Compatible Temperature. Appl. Phys. Lett. 2011, 98, 123103-123103.
Miller et al., Graphene double-layer capacitor with ac line-filtering performance, Science, 2010, 329, 1637-1639.
O'Connel et al., Carbon Nanotube Properties and Applications, Boca Raton: Taylor & Francis Group 2006.
Dimitrakakis et al., Pillard Graphene: A new 3-D network Nanostructure for Enhanced Hydrogen Storage, Nano Letters, 2006, 8(10), 3166-3170.
Novoselov, K.S. et al. Electric field effect in atomically thin carbon films. Science 306, 666-669 (2004).
Zhu, Y. et al. Carbon-based supercapacitors produced by activation of graphene. Science 332, 1537-1541 (2011).
Sun, Z. et al. Growth of graphene from solid carbon sources. Nature 468, 549-552 (2010).
Li, et al. Large-area synthesis of high-quality and uniform graphene films on copper foils. Science 324, 1312-1314 (2009).
Kim, K.S. et al. Large-scale pattern growth of graphene films for stretchable transparent electrodes. Nature 457, 706-710 (2009).
Reina et al., Large area, few-layer graphene films on arbitrary substrates by chemical vapor deposition. Nano Lett. 9, 30-35 (2008).
Bolotin, et al. Ultrahigh electron mobility in suspended graphene. Sol. St. Comm. 146, 351-355 (2008).

Yan et al., Growth of Bilayer Graphene on Insulating Substrates. ACS Nano 2011, 5, 8187-8192.
Du et al., High Power Density Supercapacitors Using Locally Aligned Carbon Nanotube Electrodes. Nanotechnology 2005, 16, 350-353.
Stoller et al., Graphene-Based Ultracapacitors. Nano Lett. 2008, 8, 3498-3502.
Gao et al., Direct Laser Writing of Micro-Supercapacitors on Hydrated Graphite Oxide Films. Nature Nanotechnol. 2011, 6, 496-500.
Pech et al., Ultrahigh-power micrometre-sized supercapacitors based on onion-like carbon, Nat. Nanotech. 2010, 5, 651-654.
El-Kady et al., Laser Scribing of High-Performance and Flexible Graphene-Based Electrochemical Capacitors, Science 2012, 335, 1326-1330.
Futaba, D.N. et al. Shape-engineerable and highly densely packed single-walled carbon nanotubes and their application as supercapacitor electrodes. Nature Mater. 5, 987-994 (2006).
Novaes et al., Electronic transport between graphene layers covalently connected by carbon nanotubes. ACS Nano 4, 7596-7602 (2010).
Varshney et al., Modeling of thermal transport in pillared-graphene architectures. ACS Nano 4, 1153-1161 (2010).
Balandin et al., Superior thermal conductivity of single-layer graphene. Nano Lett. 8, 902-907 (2008).
Hiraoka et al. Compact and light supercapacitor electrodes from a surface-only solid by opened carbon nanotubes with 2200 $m^2$ $g^{-1}$ surface area. Adv. Func. Mater. 20, 422-428 (2010).
Liu et al., Graphene-based supercapacitor with an ultrahigh energy density. Nano Lett. 10, 4863-4868, (2010).
Wang et al., Controllable Preparation of Patterns of Aligned Carbon Nanotubes on Metals and Metal-coated Silicon Substrates. J. Mater. Chem. 2003, 13, 1124-1126.
Talapatra et al., Direct Growth of Aligned Carbon Nanotubes on Bulk Metals. Nature Nanotechnol. 2006, 1, 112-116.
Lahiri et al., Enhanced Field Emission From Multi-Walled Carbon Nanotubes Grown on Pure Copper Substrate. Carbon 2010, 48, 1531-1538.
Fan et al., Self-oriented Regular Arrays of Carbon Nanotubes and Their Field Emission Properties, Science 1999, 283, 512-514.
Jo et al., Field Emission of Carbon Nanotubes Grown on Carbon Cloth. Appl. Phys. Lett. 2004, 85, 810-812.
Jung et al., Aligned Carbon Nanotube-Polymer Hybrid Architectures for Diverse Flexible Electronic Applications. Nano Lett. 2006, 6, 413-418.
Chen et al., Three-Dimensional Flexible and Conductive Interconnected Graphene Networks Grown by Chemical Vapor Deposition. Nature Mater. 2011, 10, 424-428.
Das et al., Synthesis and Characterization of Self-organized Multilayered Graphene-Carbon Nanotube Hybrid Films. J. Mater. Chem. 2011, 21, 7289-7295.
Zhu et al., One-Step Synthesis of a Graphene-Carbon Nanotube Hybrid Decorated by Magnetic Nanoparticles. Carbon 2012, 50, 2764-2771.
Kaempgen et al., Printable Thin Film Supercapacitors Using Single-Walled Carbon Nanotubes Nano Lett. 2009, 9, 1872-1876.
Rolison et al., Multifunctional 3D nanoarchitectures for energy storage and conversion, Chem. Soc. Rev. 2009, 38, 226-252.
Miller et al., Graphene Double-Layer Capacitor with ac Line-Filtering Performance, Science 2010, 329, 1637-1639.
European Patent Office, European Search Report, Application No. EP 12868206.9, Nov. 19, 2012.
Database WPI, Week 201118 Thomson Scientific, London, GB; AN 2011-B52579 and WO 2011/016616 A2, Feb. 10, 2011, and US 2012/192931 A1, Aug. 2, 2012.
Intellectual Property Office of Singapore, Second Written Opinion, Application No. 11201503710X, Jun. 5, 2015.

* cited by examiner

A

B

A

B

A

B

C

GRAPHENE-CARBON NANOTUBE HYBRID MATERIALS AND USE AS ELECTRODES

CROSS-REFERENCE TO RELATED APPLICATIONS

This application claims priority to U.S. Provisional Patent Application No. 61/561,578, filed on Nov. 18, 2011. The entirety of the aforementioned application is incorporated herein by reference.

STATEMENT REGARDING FEDERALLY SPONSORED RESEARCH

This invention was made with government support under Grant No. DE-FC36-05GO15073, awarded by the U.S. Department of Energy; Office of Naval Research Grant No. N00014-09-1-1066, awarded by the U.S. Department of Defense; and Air Force Office of Scientific Research Grant No. FA9550-12-1-0035, also awarded by the U.S. Department of Defense. The government has certain rights in the invention.

BACKGROUND

Current methods of making graphene-carbon nanotube hybrid materials suffer from numerous limitations, including efficiency. Furthermore, the currently manufactured graphene-carbon nanotube hybrid materials have limitations in terms of structural integrity and electrical properties. Therefore, a need exists for more effective methods of making graphene-carbon nanotube hybrid materials.

SUMMARY

In some embodiments, the present disclosure provides improved methods of making graphene-carbon nanotube hybrid materials. In some embodiments, such methods generally include: (1) associating a graphene film with a substrate; (2) applying a catalyst and a carbon source to the graphene film; and (3) growing carbon nanotubes on the graphene film. In some embodiments, the grown carbon nanotubes become covalently linked to the graphene film through carbon-carbon bonds that are located at one or more junctions between the carbon nanotubes and the graphene film. In some embodiments, the grown carbon nanotubes are in ohmic contact with the graphene film through the carbon-carbon bonds at the one or more junctions. In some embodiments, the one or more junctions may include seven-membered carbon rings. In some embodiments, the one or more junctions are seamless.

In some embodiments, the substrate may include one or more atoms selected from the group consisting of Ni, Co, Fe, Pt, Au, Al, Cr, Cu, Mg, Mn, Mo, Rh, Si, Ta, Ti, W, U, V, Zr, $SiO_2$, $Al_2O_3$, BN, diamond, alloys thereof, and combinations thereof. In some embodiments, the substrate is a copper foil. In some embodiments, the substrate is a porous substrate, such as porous nickel.

In some embodiments, the graphene film becomes associated with the substrate by forming the graphene film on the substrate. In some embodiments, the graphene film formation occurs by chemical vapor deposition (CVD). In some embodiments, the graphene film becomes associated with the substrate by transferring a pre-grown graphene film onto the substrate. In some embodiments, the graphene film on the substrate includes at least one of monolayer graphene, few-layer graphene, double-layer graphene, triple-layer graphene, multi-layer graphene, and combinations thereof. In some embodiments, the graphene films exclude reduced graphene oxide. In some embodiments, the graphene films exclude graphite.

In some embodiments, the catalyst comprises a metal, such as iron, nickel, cobalt, palladium, platinum, gold, ruthenium, rhodium, iridium, alloys thereof, and combinations thereof. In some embodiments, the catalyst comprises a metal and a buffer, such as iron and aluminum oxide, respectively. In some of such embodiments, the catalyst may be applied to the graphene film by (1) depositing the metal onto a surface of the graphene film; and (2) depositing the buffer onto a surface of the metal. In some embodiments, the catalyst may be applied to the graphene film by electron beam deposition. In some embodiments, the catalyst may be applied to the graphene film by solution-based deposition of metallic nanoparticles.

In some embodiments, the carbon source used to grow carbon nanotubes or graphene films may include at least one of alkanes, alkenes, alkylenes, alkynes, polymers, carbon oxides, and combinations thereof. In some embodiments, the carbon source may include a polymer, such as polymethylmethacrylate (PMMA).

In some embodiments, carbon nanotubes are grown on graphene films by heating. In some embodiments, the heating occurs at temperatures between about 500° C. and about 1,000° C. In some embodiments, the catalyst is lifted off from the graphene film by the carbon nanotubes.

In some embodiments, the grown carbon nanotubes may include at least one of single-walled carbon nanotubes, double-walled carbon nanotubes, triple-walled carbon nanotubes, multi-walled carbon nanotubes, ultra-short carbon nanotubes, small diameter carbon nanotubes, and combinations thereof. In some embodiments, the grown carbon nanotubes may include vertically aligned carbon nanotubes that are substantially perpendicular to the graphene film.

In some embodiments, the methods of the present disclosure may also include a step of controlling the length of the growing carbon nanotubes. In some embodiments, the controlling may include a step of adjusting carbon nanotube growth time. In some embodiments, the carbon nanotube growth time may be adjusted from about 1 minute to about 20 minutes.

In some embodiments, the methods of the present disclosure may also include a step of removing the substrate from the formed graphene-carbon nanotube hybrid material to form free-standing graphene-carbon nanotube hybrid materials. In some embodiments, the removing may include a step of etching the substrate from the graphene-carbon nanotube hybrid material.

In some embodiments, the formed graphene-carbon nanotube hybrid material may span only one side of the substrate. In some embodiments, the formed graphene-carbon nanotube hybrid material may span both sides of the substrate.

Additional embodiments of the present disclosure pertain to graphene-carbon nanotube hybrid materials that are formed in accordance with the methods of the present disclosure. Further embodiments of the present disclosure pertain to such graphene-carbon nanotube hybrid materials that are components of a capacitor, such as a two-electrode electric double-layer capacitor (EDLC). In some embodiments, the capacitor may have an impedance phase angle of −81.5° at a frequency of 120 Hz. In various embodiments, the capacitor may have a specific capacitance that ranges from about 1 $mF/cm^2$ to about 1 $F/cm^2$, from about 2 $mF/cm^2$ to about 500 $mF/cm^2$, from about 2 $mF/cm^2$ to about 100 mF/cm², from about 2 mF/cm² to about 20 mF/cm², or from about 2 mF/cm² to about 4 mF/cm².

DESCRIPTION OF THE FIGURES

FIG. 1A shows a copper foil substrate. FIG. 1B depicts graphene formation on the copper foil by chemical vapor deposition (CVD) or solid carbon source growth. FIG. 1C shows that iron and alumina are deposited on the graphene covered copper foil by using ebeam evaporation. FIG. 1D shows that CNT carpet is directly grown from the graphene surface while the iron catalyst and alumina protective layer are lifted up by the CNT carpet as it grows.

FIGS. 2A-H provide scanning electron microscopy (SEM) images of nanotube carpets grown from a graphene covered copper foil. The samples in FIGS. 2A-2B were grown by using 0.3 nm of iron and 3 nm of alumina. The dark regions in FIG. 2A are gaps in the broken alumina layer, and the brighter regions are alumina covered areas. FIG. 2B provides an enlarged image for one of the lifted areas where the CNTs were grown. The samples in FIGS. 2C-2D were grown by using 0.5 nm of iron and 3 nm of alumina. As shown in FIG. 2C, the top alumina layer is partially broken. As shown in FIG. 2D, the top alumina layer can be fully removed during growth. The samples grown in FIGS. 2E-H were grown by using 1 nm of iron and 3 nm of alumina. FIGS. 2E-F show top views of the CNT carpet on the graphene-covered copper foil. FIG. 2G shows the side view of CNT carpet grown on the graphene. The height of the CNT is ~120 μm. FIG. 2H shows a close-up view on the upper portion of the CNT carpet. FIGS. 2I-J show Raman spectra of the CNT carpet and graphene. FIG. 2I shows a Raman spectrum of the CNT carpet (excitation wavelength 633 nm). Inset: the spectrum of the radial breathing modes (RBMs). FIG. 2J shows Raman spectra of graphene before (black) and after (red) CNT growth (excitation wavelength 514 nm). FIG. 2K shows the diffraction pattern of the graphene after CNT growth. FIGS. 2L-2N shows transmission electron microscopy (TEM) images of CNTs grown in this Example, including single-walled carbon nanotubes (FIG. 2L), double-walled carbon nanotubes (FIG. 2M), and triple-walled carbon nanotubes (FIG. 2N).

FIGS. 3A-B provide characterization of the electrical properties of graphene and CNT carpet hybrid materials. FIG. 3A shows I-V curves of three experiments described in FIG. 3B. The inset is the SEM image of the device, where graphene (the dark area) is patterned into a Hall-bar shape, "Pt" is the platinum electrode deposited on graphene, "CNT" is the CNT carpet electrode grown on graphene, and "G" is the bare graphene electrode. FIG. 3B shows three experiments that were used to measure I-V responses: I, one probe contacts the platinum electrode and the other probe on the graphene electrode; II, one probe is on the platinum electrode, the other probe is suspended above the surface; III, one probe is on the platinum electrode, the other probe is contacting the CNT carpet sidewalls. FIGS. 3C-E provide characterization of a supercapacitor made from the graphene and CNT carpet hybrid materials. FIG. 3C shows a cyclic voltammetry of supercapacitor devices under different scan rates. FIG. 3D shows galvonostatic discharge curves under different discharge currents. FIG. 3E shows ragone chart of energy density vs. power density, where the voltage window is 4V.

FIGS. 4A-B show TEM images of the samples prepared by a solvent induced bundling method (See FIG. 16). The connection regions (roots) are directly observable. The cyan color represents graphene planes and blue color represents the CNTs. FIGS. 4C-D show BF STEM images (band pass filtered) of the CNT root regions. The blue color represents CNTs and the cyan color represents the additional shells on the root. Shown is a triple-walled nanotube in FIG. 4C and a double-walled nanotube in FIG. 4D. FIGS. 4E-H show high resolution bright field (BF) STEM images of the root of CNTs. FIGS. 4E and 4G are original STEM images (band pass filtered). FIGS. 4F and 4H are color-enhanced images. The cyan color represents the open-end region. The blue color, green color and yellow color represent the nanotube walls. FIG. 4I provides a proposed model of the graphene and CNT junction. The CNT is covalently bonded to the graphene plane with additional shells (shown in blue) at the root. FIG. 4J is a dark field (DF) STEM image of the CNT-graphene junction. The image was filtered with band pass filter as indicated in the inset in the upper-right corner. FIGS. 4K-L provide theoretical models suggesting the atomic structure of the CNT/graphene junction. A perspective view (FIG. 4K) and a top-projected view (FIG. 4L) are shown. FIGS. 4M-T provide high resolution BF STEM images of CNT/graphene junctions. FIGS. 4M and 4Q show the raw BF STEM images. FIGS. 4N and 4R show the high resolution images after applying a filter (upper-right inset) to the FFT of raw BF STEM images in the selected area (indicated as squares in FIG. 4M and FIG. 4Q). FIG. 4N is from the red rectangle area in FIG. 4M. FIG. 4R is from the green rectangle area in FIG. 4Q. FIGS. 4O and 4S are BF STEM images of junction areas with an overlayed structural sketch. FIGS. 4P and 4T are BF STEM images of junction areas with indicated areas for intensity profiles measurements. FIGS. 4U and 4V are intensity profiles of indicated areas in FIG. 4P and FIG. 4T, respectively. FIG. 4W shows simulated STEM image of CNT and graphene junction areas. FIG. 4X show simulated STEM image of CNT and graphene junction areas with an overlayed structural sketch.

In FIGS. 5A-B, 0.3 nm of alumina was used as a buffer layer. In FIGS. 5C-D, 10 nm alumina was used as a buffer layer.

FIG. 7A shows 2D/G ratio of Raman spectra for graphene before CNT growth. FIG. 7B shows 2D/G ratio of Raman spectra for graphene after CNT growth. FIG. 7C shows G/D ratio of Raman spectra for graphene before CNT growth. FIG. 7D shows G/D ratio of Raman spectra for graphene after CNT growth. The size of the figure edge is 50 μm×50 μm.

FIG. 8A shows the Raman spectra of CNTs on the carpet top and bottom as noted. FIG. 8B shows the radial breathing mode of CNTs on the carpet top and bottom as noted.

FIG. 9A shows an overview of the entire device. FIG. 9B shows the enlarged image of CNT carpet electrode.

FIG. 10 shows BET specific surface area of graphene and CNT carpet hybrid materials. FIG. 10A shows BET analysis of graphene and CNT carpet hybrid materials, where the nitrogen isothermal curve is at 77.4 K. FIG. 10B shows the fitting result based on FIG. 10A, where P and $P_0$ are the equilibrium and the saturation pressure of nitrogen at 77.4 K, respectively, and W is the adsorbed nitrogen quantity. The surface area of this sample is 2285 $m^2/g$.

FIG. 15A shows the Ragone plots of energy density vs. power density under different operation voltage windows. FIG. 15B shows the Ragone plots of per volume energy density vs. per volume power density.

FIG. 17A shows CNT and graphene junction with the CNT 90° to the graphene plane. FIG. 17B shows CNT and graphene junction with the CNT 60° to the graphene plane. FIG. 17C shows CNT and graphene junction with the CNT 30° to the graphene plane.

FIG. 18A shows simulated STEM image of CNT covalently bonded to graphene plane, a ring like structure is characteristic on the root. FIG. 18B shows simulated STEM images of CNT lying on the graphene plane. Both the open end (left) and the closed end (right) show no ring-like structure. FIG. 18C show experimental STEM images showing a CNT covalently bonded to the graphene. The ring like structure is visible. More detailed images are shown in FIGS. 4E-H. FIG. 18D shows experimental STEM images showing a closed end SWNT lying on the graphene plane. No ring like structure is observed.

FIG. 19A shows a model of CNT and graphene junction with the CNT 90° to the graphene plane. FIG. 19B shows a model of CNT and graphene junction with the CNT 60° to the graphene plane. FIG. 19C shows a model of CNT and graphene junction with the CNT 30° to the graphene plane. The structures in FIGS. 19A-C are from FIG. 16 with decreased size that is suitable for STEM simulation. FIG. 19D shows a simulated STEM image of FIG. 19A. FIG. 19E shows a simulated STEM image of FIG. 19B. FIG. 19F shows a simulated STEM image of FIG. 19C. FIG. 19G shows a simulated STEM image of FIG. 19A with an overlaid structural sketch. FIG. 19H shows a simulated STEM image of FIG. 19B with an overlaid structural sketch. FIG. 19I shows a simulated STEM image of FIG. 19C with an overlaid structural sketch. In FIGS. 19G-I, the sketch is drawn based on the coordinates of every atom in the simulation.

FIG. 20A shows a triple-walled CNT with 4~5 shells at the root region. FIG. 20B shows a double-walled CNT (the middle top one) with 3~4 shells at the root region.

FIG. 21A shows the porous nickel substrate. FIG. 21B shows that few-layer graphene is formed on the porous nickel by a CVD method. FIG. 21C shows that Fe and $Al_2O_3$ are sequentially deposited on the graphene using ebeam evaporation. FIG. 21D shows that CNT forests are directly grown from the graphene surface while lifting the $Fe/Al_2O_3$ catalyst layer.

FIG. 22A shows photographs of porous nickel, graphene-porous nickel and CNT-graphene-porous nickel (from left to right). FIGS. 22B-E show SEM images of the same samples. The samples were synthesized using 1.5 nm Fe/10 nm $Al_2O_3$ as the catalyst and the growth time was 10 min. FIG. 22D shows the side view of the CNT-catalyst interface, showing that the catalyst layer was raised up during the growth of CNTs. FIG. 22E shows the side view of CNT-graphene interface. FIG. 22F shows TEM images of the CNTs indicating the number of tube layers. FIG. 22G shows the Raman spectra of the obtained CNTs under 633 nm excitation wavelengths. Inset: the spectra of the radial breathing modes (RBMs). FIGS. 22H-J shows the SEM images of obtained CNTs at different growth times. The samples were grown using 1.5 nm Fe/10 nm $Al_2O_3$ as the catalyst. The length of CNTs can be adjusted from ~3 μm to ~250 μm by changing growth time.

FIG. 23A provides a schematic illustration of the field-emission setup. FIG. 23B provides the test setup for the field-emission devices. The inset in the upper right is the photograph of an emitting device. FIG. 23C provides a variation of the emission current density as a function of the applied field for S1 (CNT, 60 min), S2 (CNT, 5 min) and S3 (CNT, 2 min). The inset is the enlarged data, from which the turn-on fields are determined at the current density of 0.01 $mA/cm^2$. FIG. 23D shows the Fowler-Nordheim plots obtained for S1 (CNT, 60 min), S2 (CNT, 5 min) and S3 (CNT, 2 min).

FIG. 24A provides CV curves for different scan rates. The rectangular shapes indicate the capacitive behavior. FIG. 24B provides Nyquist plot, showing the imaginary part versus the real part of impedance. Inset shows the data at high frequency ranges. FIG. 24C shows the Galvanostatic charge/discharge curves of CNT-graphene-porous nickel based double-layer capacitor measured in the 6 M KOH electrolyte under different constant currents. FIG. 24D shows various specific capacitance versus discharging current density. The device was made by 2 min-growth CNTs on graphene-porous nickel.

FIG. 25A shows the SEM image of the porous nickel. FIG. 25B shows a photograph of the starting porous nickel sheet.

FIG. 26A provides Raman spectra of the graphene (excitation wavelength 633 nm). No D peak was observed, indicating the high quality of obtained graphene. The intensity ratio of G to 2D peak is ~1.6, suggesting the graphene is few-layered. FIG. 26B shows Hexagonal SAED pattern of the graphene, suggesting the high crystallinity of obtained graphene. FIGS. 26C-D show HRTEM images of graphene edges. The obtained graphene was 3 or 4 layers thick by counting randomly exposed edges, in concert with Raman spectroscopy shown in FIG. 26A.

FIG. 27A shows a photograph of a self-supporting CNT-graphene after etching the porous nickel. FIGS. 27B-D show the SEM images of CNT-graphene after etching the porous nickel. The SEM images show that CNTs bundle together after etching the nickel due to a solvent-induced bundling effect. The growth time of the sample shown in FIGS. 27A-D was 10 min using 1.5 nm Fe/10 nm $Al_2O_3$ as the catalyst.

FIG. 28A shows two experiments performed to measure the I-V responses of CNT-graphene hybrids. FIG. 28B shows the I-V curves of CNT-graphene in the horizontal direction and the vertical direction. The size of the device used for I is 20×20×0.8 mm. The size of device used for II is 1.5×1.5×0.8 mm. The two devices are made by 60-min-growth CNTs on graphene-porous nickel.

In FIGS. 29A-C, the effects of the thickness of catalysts were studied. In these experiments, graphene was grown on porous nickel in advance. FIG. 29A shows the SEM image of the obtained sample using 0.5 nm Fe/3 nm $Al_2O_3$ as the catalyst for 5 min growth at 750° C. In this case, CNTs grew poorly due to the rapid deactivation of the catalyst. FIG. 29B shows the SEM image of the sample using 1 nm Fe/3 nm $Al_2O_3$ as the catalyst for 5 min growth at 750° C. In this case, CNTs covered almost all the graphene surface. However, CNTs were easily bent due to the cracking of the catalyst layer. FIG. 29C shows an SEM image where CNTs were aligned well even after 10 min growth at 750° C. when a thicker catalyst layer, 1.5 nm Fe/10 nm $Al_2O_3$, was used. FIG. 29D shows that CNTs did not grow well when directly on the porous nickel without the previous coverage of graphene layer. In this experiment, 1 nm Fe/10 nm $Al_2O_3$ was used as the catalyst and the growth time was 10 min.

FIG. 30A shows the SEM image of CNTs obtained at 1 min growth. FIG. 30B shows the enlarged SEM image of the blue circled region in FIG. 30A. FIGS. 30C-D show the SEM images of samples at 30 min growth. FIGS. 30E-F show SEM images of samples obtained at 60 min growth and 120 min growth, respectively.

FIG. 31A provides a variation of the emission current density as a function of the applied field for porous nickel (blank curve), graphene-porous nickel (red curve) and CNT-graphene-porous nickel (blue curve) electrodes. FIG. 31B provides the enlarged figure of FIG. 31A. From FIG. 31B, the turn-on voltages of porous nickel, graphene-porous nickel and CNT-graphene-porous nickel were determined, which are, respectively, 3.26 V/μm, 1.91 V/μm and 1.14 V/μm at the current density of 0.01 mA/cm².

FIG. 32A provides a schematic of the structure of graphene/CNTCs microsupercapacitors (G/CNTCs-MCs). The inset shows an enlarged scheme of Ni-G-CNTCs pillar structure that does not show the $Al_2O_3$ atop the CNTCs. FIG. 32B is an SEM image of a fabricated G/CNTCs-MC. FIGS. 32C-E provide TEM images of individual single-, double-and few-wall CNTs. FIGS. 32F-H provide cross-sectioned SEM images of CNTCs grown for 1 min, 2.5 min and 5 min.

FIG. 33A shows impedance phase angle versus frequency. The phase angles occurring at 120 Hz are 81.5°, 77.2° and 73.4° for 1, 2.5, 5-min growth, respectively. The phase angle at 120 Hz for an AEC is 83.9°. FIG. 33B shows Nyquist plots of impedance from the three different growth-time structures. The inset is the expanded view in the high-frequency region. FIG. 33C shows $C_A$ versus f using series-RC circuit model. $\tau_{RC}$ of 195 μs, 325 μs and 402 μs were obtained for 1, 2.5, and 5-min growth. FIG. 33D shows C' and C" versus f. The extremely low $\tau_0$ of 0.82 ms, 1.78 ms and 2.62 ms were extracted from 1, 2.5, and 5-min growth.

FIG. 34A provides CVs of microsupercapacitors with and without CNTCs obtained at a scan rate of 100 mV/s. FIGS. 34B-E provides CVs obtained at various scan rates of 1 V/s, 10 V/s, 100 V/s and 500 V/s. FIG. 34F provides discharge current densities as a function of scan rate.

FIG. 35A provides a comparison of $C_V$ versus discharge volumetric current densities. FIG. 35B provides a comparison, in the Ragone plots, of specific volumetric power density ($P_V$) and energy density ($E_V$).

FIG. 36A shows patterning and depositing Cr/Ni (10 nm/450 nm) films on a $Si/SiO_2$ substrate. FIG. 36B shows growing few layered graphene (FLG) films on patterned Ni electrodes by CVD at 800° C. FIG. 36C shows patterning and evaporating 1 nm Fe and 3 nm $Al_2O_3$ on graphene. FIG. 36D shows growing CNTCs on FLG films by CVD at 750° C.

FIG. 37A provides high magnification SEM image of CNTCs showing small individual pitches. FIG. 37B shows a microsupercapacitor without graphene grown on top of Ni after the CNT growth. The device without graphene results in very spare and non-measureable CNTs. FIG. 37C provides Raman spectrum of FLG on Ni. The laser wavelength was 514.5 nm and the power was 5 mW. The very small D band to G peak ratio indicates high quality of FLG. FIG. 37D provides Raman spectrum of CNTCs grown for 5 min. Inset is the magnified spectrum showing RBM. The laser wavelength is 633 nm, and the power is 5 mW.

FIG. 38A shows galvanostatic CC curves at various current densities of 0.1, 0.2, 0.5, 1 and 2 mA/cm². FIG. 38B shows Galvanostatic CC curves at various current densities of 5, 10, 20, 50 and 100 mA/cm².

FIG. 38C shows CV curve obtained at a scan rate of 200 V/s.

FIG. 38D shows CV curves obtained at a scan rate of 400 V/s.

FIG. 39A shows CVs of microsupercapacitors with CNTCs grown for 5 min. FIG. 39B shows a comparison of impedance phase angles as functions of frequency for microsupercapacitors with CNTs grown for 5 min. The frequencies (f) at phase angle of −45° are ~460 Hz and 320 Hz. FIG. 39C shows $C_A$ of microsupercapacitors with CNTCs grown for different durations (1 min, 2.5 min and 5 min). All of the $C_A$ were derived from CC measurements with constant current density of 0.2 mA/cm$^2$.

FIG. 40A shows galvanostatic CC curve at a constant current density of 0.2 mA/cm$^2$. FIG. 40B shows the retention of capacitance over 8,000 cycles. Cyclability tests were conducted at a constant current density of 0.5 mA/cm$^2$. The retention was increased by 13% in the first 2,000 cycles and then stabilized at 98.4% even after 8,000 cycles.

FIG. 41A shows galvanostatic CC curves at various discharge current densities of 0.05, 0.1, 0.25, 0.5, 1 and 2.5 A/cm$^3$ using 1 M Na$_2$SO$_4$. FIG. 41B shows galvanostatic CC curves at various discharge current densities of 5, 10, 25, 50, 100 A/cm$^3$ using 1 M Na$_2$SO$_4$. FIG. 41C shows galvanostatic CC curves at various discharge current densities of 0.05, 0.1, 0.25, 0.5 and 1 A/cm$^3$ using BMIM-BF$_4$. FIG. 41D shows galvanostatic CC curves at various discharge current densities of 2.5, 5, 10, 20 and 50 A/cm$^3$ using BMIM-BF$_4$.

DETAILED DESCRIPTION

Figure 1:
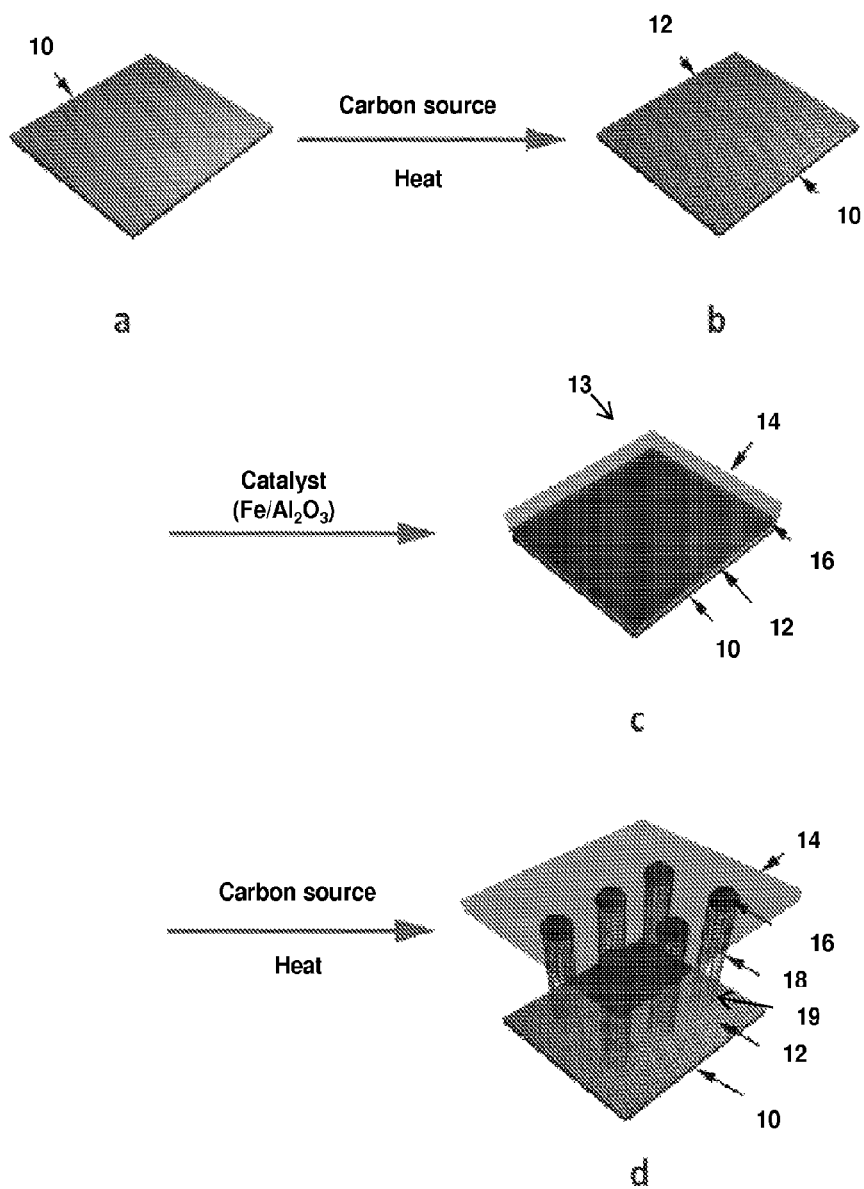
FIG. 1 provides a scheme for the synthesis of carbon nanotube (CNT) carpets directly from graphene.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Carbon nanotubes (CNTs) grown directly on bulk metal substrates have been used in several applications ranging from electronics to biotechnology. In some devices, such as field-emitters and capacitors, such direct CNT growth eliminates the need for post-transfer processes. However, such direct growth methods suffer from inadequate CNT-metal-electrode contacts and low-surface-area-utilization-efficiency. Thus, graphene has been used to bridge this gap and serve as an interfacial layer between metals and CNTs. The use of graphene has also enabled the design of new three dimensional (3D) structures with better performance metrics.

In particular, as low dimensional materials, graphene and carbon nanotubes exhibit exceptional properties, such as high carrier mobility, high electrical and thermal conductivity, and large specific surface area (SSA). However, high quality, single-and few-walled carbon nanotube carpets with large specific surface area are usually grown on alumina, an insulator that immobilizes the catalyst particles and supports efficient growth. In contrast, high quality graphene is usually produced on metal substrates, such as copper or nickel. These two different growth conditions hamper attempts to covalently combine the two materials during growth. As a result, attempts to grow graphene and CNT carpet hybrid materials have failed to match the predicted values on SSA, electrical connection or both.

Without being bound by theory, several factors can explain the aforementioned shortcomings. First, the quality of graphene has not been well-controlled in prior devices. For instance, some studies have used reduced graphene oxide instead of chemical vapor deposition (CVD)-produced graphene. The reduced graphene is a defect-rich material compared to the models used in the theoretical calculations. This could inevitably lead to materials with different properties from those based on calculations.

Second, the quality of the CNTs may not be ideal. Many of the best properties of the general class of compounds that comprise CNTs, such as high SSA and large aspect ratio, are based on single-walled carbon nanotubes (SWNTs), which were the properties used in the theoretical modeling. However, the CNTs synthesized were multi-walled carbon nanotubes (MWNTs) with large diameters that have much lower SSA and more defects compared to SWNTs.

Third, although those reports referred to the products as graphene/CNT hybrid material, the actual connection between the CNTs and graphene was not studied. The atomic structure of the graphene-CNT junction has never been observed, and it is dubious in previously published works whether there are covalent bonds that seamlessly link the graphene and CNTs. Based on the properties reported, it could be that many of those CNTs are physisorbed on the graphene plane rather than conjoined by sp$^2$-carbon to sp$^2$-carbon.

Therefore, a need exists for more effective methods of making graphene-carbon nanotube hybrid materials. A need also exists for graphene-carbon nanotube hybrid materials that have improved electrical properties and structural integrity. The present disclosure addresses these needs.

In particular, various embodiments of the present disclosure pertain to methods of making graphene-carbon nanotube hybrid materials. Additional embodiments of the present disclosure pertain to the formed graphene-carbon nanotube hybrid materials and their use in electrical devices, such as capacitors.

Methods of Making Graphene-Carbon Nanotube Hybrid Materials

Various methods may be used to make graphene-carbon nanotube hybrid materials. Such methods generally include: (1) associating a graphene film with a substrate; (2) applying a catalyst and a carbon source to the graphene film; and (3) growing carbon nanotubes on the graphene film.

Figure 21:
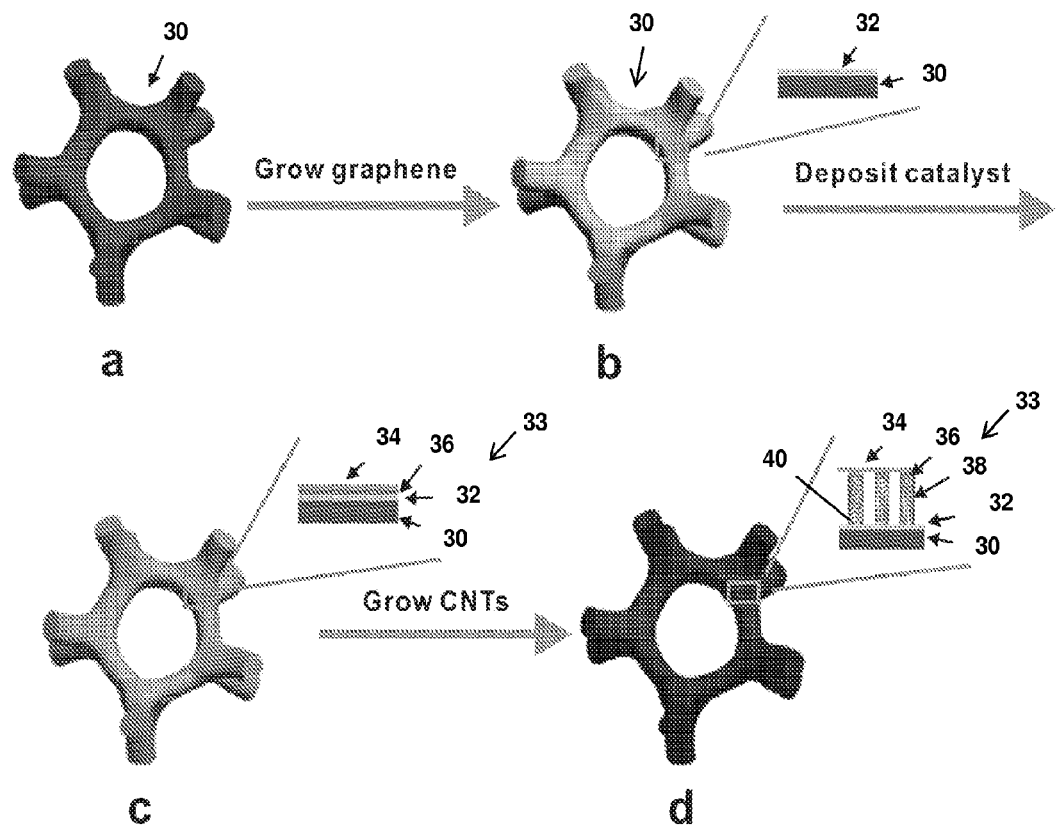
FIG. 21 provides a scheme for the synthesis of CNT forests on graphene-porous nickel.

Exemplary methods of making graphene-carbon nanotube hybrid materials are illustrated in FIGS. 1 and 21. For instance, as illustrated in FIG. 1, substrate 10 (e.g., a copper foil) is associated with a carbon source (e.g., $CH_4$ or polymethyl methacrylate (PMMA)) and heated to form graphene film 12 on the substrate (FIGS. 1A-1B). Thereafter, a catalyst (Fe/$Al_2O_3$) is applied to the graphene film to form a layered structure 13, which consists of $Al_2O_3$ 14, Fe 16, graphene film 12, and substrate 10 (FIG. 1C). Next, a carbon source (e.g., $C_2H_4$ or $C_2H_2$) is applied to layered structure 13 and heated. The heating initiates the growth of SWNTs 18 on graphene film 12 (FIG. 1D). The formed SWNTs become covalently linked to graphene film 12 through carbon-carbon bonds at junctions 19. Furthermore, the catalyst components (i.e., $Al_2O_3$ 14 and Fe 16) are lifted off from graphene film 12 by the growing SWNTs 18 (FIG. 1D).

In the example illustrated in FIG. 1, the starting materials are only deposited on one side of substrate 10. Therefore, the graphene-carbon nanotube hybrid materials are formed on only one side of substrate 10. However, in other embodiments, the starting materials may be deposited on both sides of a substrate in order to form the hybrid materials on both sides of the substrate. An example of such an embodiment is illustrated in FIG. 21.

As illustrated in FIG. 21, both sides of porous substrate 30 (e.g., porous nickel) (FIG. 21A) are associated with a carbon source and heated. As a result, graphene film 32 forms on both sides of substrate 30 (FIG. 21B). Thereafter, a catalyst (Fe/$Al_2O_3$) is applied to the graphene film to form layered structure 33, which consists of $Al_2O_3$ 34, Fe 36, graphene film 32, and substrate 30 (FIG. 21C). Next, a carbon source is applied to layered structure 33 and heated. This results in the growth of SWNTs 38 on graphene film 32 while the catalyst components (i.e., $Al_2O_3$ 34 and Fe 36) are lifted off by the growing SWNTs (FIG. 21D). Since the starting materials were deposited on both sides of porous substrate 30, the graphene-carbon nanotube hybrid materials form on both sides of the substrate. In addition, the formed carbon nanotubes become covalently linked to the graphene film through carbon-carbon bonds at junctions 40.

As set forth in more detail herein, the methods of the present disclosure have numerous variations. In particular, various substrates may be utilized. Furthermore, various methods may be utilized to associate graphene films with those substrates. In addition, various catalysts and carbon sources may be applied to the graphene films to grow various types of carbon nanotubes. Furthermore, the length of the grown carbon nanotubes on the graphene films may be controlled by various growth conditions.

Substrates

Substrates generally refer to structures that are able to support the formation of graphene-carbon nanotube hybrid materials. In some embodiments, the substrate may be a conductive substrate, such as a current collector substrate. In some embodiments, the substrate may be a metal or an alloy. In some embodiments, the substrate may include one or more atoms of Ni, Co, Fe, Pt, Au, Al, Cr, Cu, Mg, Mn, Mo, Rh, Si, Ta, Ti, W, U, V, Zr, $SiO_2$, $Al_2O_3$, BN, diamond, alloys thereof, and combinations thereof. In some embodiments, the substrate may include at least one of copper, nickel, cobalt, platinum, gold, iridium, silicon, alloys thereof, and combinations thereof. In some embodiments, the substrate may include a copper foil. In some embodiments, the substrate may include nickel. In some embodiments, the substrate may be a silicon substrate, such as Si/$SiO_2$.

In some embodiments, the substrates may include non-porous substrates. In some embodiments, the substrates may include porous substrates. In some embodiments, the porous substrates may include porous nickel.

The substrates of the present disclosure can have various shapes. For instance, in some embodiments, the substrates of the present disclosure may be circular, oval, rectangular, square-like, or amorphous. In some embodiments, the substrates of the present disclosure may be rectangular. In some embodiments, the substrates of the present disclosure may have a three-dimensional structure (e.g., porous substrate 30 in FIG. 21).

The substrates of the present disclosure can also have various sizes. For instance, in some embodiments, the substrates of the present disclosure may have dimensions that range from a few micrometers to a few meters. In some embodiments, the substrates of the present disclosure may have dimensions in the micrometer range, the millimeter range, the centimeter range, or the meter range.

Association of Graphene Films with Substrates

Various methods may be used to associate graphene films with substrates. In some embodiments, graphene films may be associated with substrates by directly forming the graphene films on the substrates. In other embodiments, graphene films may be associated with substrates by transferring pre-formed graphene films onto the substrates.

Various methods may be used to form graphene films on substrates. For instance, in some embodiments, the forming may include graphene film growth from gaseous carbon sources, graphene film growth from non-gaseous carbon sources, reduction of graphene oxide, exfoliation of graphite, and combinations thereof. However, in more specific embodiments, the graphene films are not derived from graphene oxide.

Various methods may also be used to deposit carbon sources onto substrates for graphene film growth. In some embodiments, the methods may include at least one of chemical vapor deposition (CVD), spin-coating, drop-casting, spray coating, dip coating, physical application, vapor-coating, sublimation, blading, inkjet printing, screen printing, direct placement, thermal evaporation, and combinations thereof.

In some embodiments, graphene films may form on substrates by CVD. In some embodiments, the CVD may occur at temperatures that range from about 750° C. to about 1000° C. In some embodiments, the CVD may occur at temperatures of about 1000° C.

Furthermore, various carbon sources may be used to form graphene films on substrates. For instance, in some embodiments, the carbon sources may include, without limitation, non-polymeric carbon sources, raw carbon sources, small molecules, organic compounds, fullerenes, fluorenes, carbon nanotubes, phenylene ethynylenes, sucrose, sugars, polysaccharides, carbohydrates, proteins, and combinations thereof. In some embodiments, the carbon sources may include polymers, such as PMMA, polystyrenes, polyacrylonitriles, polycarbonates, poly(phenylene ethynylene)s, cellulose, and combinations thereof. In some embodiments, the carbon sources may include alkanes or alkenes, such as methane ($CH_4$), ethane ($C_2H_4$), ethylene ($C_2H_2$), and combinations thereof.

Additional methods of forming graphene films are disclosed in Applicants' co-pending U.S. patent application Ser. No. 13/561,889, entitled "Growth of Graphene Films from Non-Gaseous Carbon Sources." The entirety of this application is incorporated herein by reference.

The substrates of the present disclosure may become associated with various types of graphene films, whether by direct formation on substrates, or by transfer of pre-formed graphene film onto the substrate. In some embodiments, the graphene films may include at least one of monolayer graphene, few-layer graphene, double-layer graphene, triple-layer graphene, multi-layer graphene, graphite, and combinations thereof. In some embodiments, the graphene film may be single-layer graphene. In some embodiments, the graphene film may be few-layered graphene, such as graphene that is 3 or 4 layers thick. In some embodiments, the graphene film may include graphite. In some embodiments, the graphene films exclude reduced graphene oxide. In some embodiments, the graphene films exclude graphite.

Catalysts

Various methods may also be used to apply catalysts onto graphene films for carbon nanotube growth. In some embodiments, the applying can occur by electron beam deposition, thermal deposition, sputtering, dip coating from a nanoparticle solution, electrochemical deposition and combinations of such methods. In some embodiments, the applying occurs by electron beam deposition. In some embodiments, the catalyst may be applied to the graphene film by solution-based deposition of metallic nanoparticles. Likewise, various catalysts may be used to grow carbon nanotubes.

Catalysts generally refer to compounds or compositions that can facilitate the formation of carbon nanotubes from various carbon sources. In some embodiments, the catalysts may include a metal, such as iron, nickel, cobalt, palladium, platinum, gold, ruthenium, rhodium, iridium, alloys thereof, and combinations thereof. In some embodiments, the metals may be in various forms, such as metal nanoparticles, evaporated metal films, sputtered metal films, and the like.

In some embodiments, the catalysts may have thicknesses that range from about 1 nm to about 10 nm. In some embodiments, the catalysts may have a thickness of about 1 nm.

In some embodiments, the catalyst may include a combination of a metal and a buffer. In some embodiments, the buffer may include at least one of aluminum, magnesium, silicon, alloys thereof, derivatives thereof, and combinations thereof.

In some embodiments, the buffer may include metal particles, evaporated metal films, sputtered metal films, metal oxide particles, evaporated metal oxide films, sputtered metal oxide films, and combinations thereof. In some embodiments, the buffer may include metal oxides, such as alumina, magnesium oxide, silicon oxide, and combinations thereof. In some embodiments, the buffer is aluminum oxide ($Al_2O_3$).

In some embodiments, the buffer may be in the form of a layer. In some embodiments, the buffer layer may have a thickness between about 1 nm and about 10 nm. In some embodiments, the buffer layer may have a thickness between about 1 nm and about 5 nm.

In some embodiments, the catalyst may include a combination of iron (Fe) and $Al_2O_3$. In some embodiments, various thicknesses of Fe and $Al_2O_3$ may be utilized. Exemplary thicknesses include, without limitation, 0.5 nm Fe/3 nm $Al_2O_3$, 1 nm Fe/3 nm $Al_2O_3$, and 1.5 nm Fe/10 nm $Al_2O_3$.

In some embodiments where a metal and a buffer are utilized as catalysts, the metal and the buffer may be sequentially applied onto the graphene film. For instance, in some embodiments, the metal may be deposited onto a surface of the graphene film. Thereafter, the buffer may be deposited onto a surface of the catalyst. In more specific embodiments, Fe and $Al_2O_3$ may be sequentially deposited onto a graphene film using electron beam evaporation.

In further embodiments, catalysts may be patterned onto a graphene film surface. In some embodiments, the patterning can lead to selective carbon nanotube growth on the patterned areas once the carbon source is applied.

Carbon Sources

Various carbon sources may also be utilized to grow carbon nanotubes, as described previously for graphene film formation. In more specific some embodiments, the carbon sources that may be used to grow carbon nanotubes may include, without limitation, at least one of alkanes, alkenes, alkylenes, alkynes, polymers, carbon oxides, and combinations thereof. In some embodiments, the carbon sources may include methane, ethane, ethylenes, carbon monoxides, carbon dioxides, and combinations thereof. In some embodiments, the carbon sources may be mixed with hydrogen or dihydrogen. Additional carbon sources for growing carbon nanotubes can also be envisioned.

Growing of Carbon Nanotubes on Graphene Films

Once the carbon source and the catalyst are deposited on graphene films, the carbon nanotubes can be grown by various methods. In some embodiments, carbon nanotubes may be grown by heating. In some embodiments, the heating can occur at temperatures that range from about 500° C. to about 1100° C. In some embodiments, the heating occurs at about 800° C. In some embodiments, the carbon nanotubes grow spontaneously in the absence of heating once catalysts and carbon sources are deposited on graphene films.

In some embodiments, carbon nanotube growth time may vary anywhere from about 1 minute to about 120 minutes. In some embodiments, carbon nanotube growth time may occur anywhere from about 1 minute to about 10 minutes. In some embodiments, carbon nanotube growth time may occur anywhere from about 1 minute to about 6 minutes. In some embodiments, the carbon nanotube growth time may be controlled by changing the environment of the sample. For instance, in some embodiments, the carbon nanotubes may be grown in a heating chamber (e.g., furnace) for a desired amount of time. Thereafter, the carbon nanotubes may be removed from the heating chamber to cease or slow down the growth of carbon nanotubes. In some embodiments, the catalyst components (e.g., metal and buffer layer) may be lifted off from the graphene film by the growing carbon nanotubes.

The grown carbon nanotubes may have various lengths. For instance, in some embodiments, the lengths of the grown carbon nanotubes may range from about 3 μm to about 250 μm.

In some embodiments, the methods of the present disclosure may also include a step of controlling the length of the grown carbon nanotubes. In some embodiments, the length of the carbon nanotubes may be controlled by adjusting the growth time of the carbon nanotubes. For instance, in some embodiments, the length of the grown carbon nanotubes may be adjusted from about 3 μm to 250 μm by adjusting the growth time to about 1 minute, 6 minutes, or 10 minutes. In further embodiments, the length of the grown carbon nanotubes may be controlled by adjusting the CNT growth time anywhere from about 1 minute to about 120 minutes. In some embodiments, the CNT growth time may be adjusted by adjusting the heating time of a sample that contains the growing CNTs.

In addition, various conditions may be used to grow carbon nanotubes. For instance, in some embodiments, carbon nanotubes may be grown under atmospheric pressure. In some embodiments, carbon nanotubes may be grown under a stream of one or more gases at various flow rates. In more specific embodiments, the carbon nanotubes may be grown under a steady stream of ethylene, hydrogen, argon, or combinations of such gases.

Furthermore, the methods of the present disclosure may be used to grow various types of carbon nanotubes on graphene films. For instance, in some embodiments, the grown carbon nanotubes may include at least one of single-walled carbon nanotubes, double-walled carbon nanotubes, triple-walled carbon nanotubes, multi-walled carbon nanotubes, ultra-short carbon nanotubes, small diameter carbon nanotubes, and combinations thereof. In some embodiments, the grown carbon nanotubes may include single-walled carbon nanotubes.

In addition, the grown nanotubes may become associated with the graphene films by various types of bonds. In some embodiments, the formed carbon nanotubes become covalently linked to the graphene film through carbon-carbon bonds. In some embodiments, the formed carbon nanotubes become covalently linked to the graphene film through carbon-carbon bonds at one or more junctions between the carbon nanotubes and the graphene film. In some embodiments, the carbon-carbon bonds that link the carbon nanotubes to the graphene film include carbon-carbon double bounds. In some embodiments, the grown carbon nanotubes are in ohmic contact with the graphene film through the carbon-carbon bonds at the one or more junctions between the graphene film and the carbon nanotubes. In some embodiments, the junctions between the carbon nanotubes and the graphene films include seven-membered carbon rings. In some embodiments, the one or more junctions are seamless. In some embodiments, the seamless junctions refer to junctions where carbon nanotubes seamlessly emanate from a graphene film surface, as shown, for example, in FIGS. 1D, 4, 17, and 19.

In addition, the grown carbon nanotubes may have various orientations with respect to the graphene film. In some embodiments, the grown carbon nanotubes may include vertically aligned carbon nanotubes that are perpendicular or substantially perpendicular to the graphene film. In some embodiments, the grown carbon nanotubes may include horizontally aligned carbon nanotubes that are parallel or substantially parallel to the graphene film.

Furthermore, the grown carbon nanotubes may be at various angles with respect to the graphene plane. In some embodiments, the grown carbon nanotubes may be at angles of 90°, 60°, or 30° to the graphene plane. In some embodiments, the grown carbon nanotubes may lay on the graphene plane.

Removal of Substrates or Catalysts

In some embodiments, the methods of the present disclosure may also include a step of removing the substrate from the formed graphene-carbon nanotube hybrid material. In some embodiments, the removal step can form free-standing graphene-carbon nanotube hybrid materials. In some embodiments, the removal step may include etching the substrate from the graphene-carbon nanotube hybrid material. In some embodiments, the etching may include the use of HCl, $FeCl_3$, water, and combinations thereof. In some embodiments, the etching may include the use of water. In some embodiments, the etching may include the use of mixtures of HCl and $FeCl_3$.

In some embodiments, the methods of the present disclosure may also include a step of removing the catalyst from the formed graphene-carbon nanotube hybrid material. In some embodiments, the catalyst may also be removed by etching, as previously described.

Additional Variations

In some embodiments, the graphene-carbon nanotube hybrid materials of the present disclosure may grow on only one side of a substrate. In some embodiments, the graphene-carbon nanotube hybrid materials of the present disclosure may grow on both sides of the substrate. For instance, in some embodiments, the graphene film, the catalyst and the carbon source may be associated with both sides of a substrate, thereby resulting in the formation of graphene-carbon nanotube hybrid materials on both sides of the substrate. In other embodiments, the graphene film, the catalyst and the carbon source may be associated with only one side of a substrate, thereby resulting in the formation of graphene-carbon nanotube hybrid materials on one side of the substrate.

In some embodiments, the methods of the present disclosure may be used to make a single-layered graphene-carbon nanotube hybrid material. In other embodiments, the methods of the present disclosure may be repeated multiple times to make multi-layer graphene-carbon nanotube hybrid materials.

Formed Graphene-Carbon Nanotube Hybrid Materials

Additional embodiments of the present disclosure pertain to the formed graphene-carbon nanotube hybrid materials and their use in various electrical devices, such as capacitors and field emitter devices. For instance, in some embodiments, the graphene-carbon nanotube hybrid materials of the present disclosure may include a graphene film and carbon nanotubes covalently linked to the graphene film. In some embodiments, the carbon nanotubes may be covalently-linked to the graphene film through carbon-carbon bonds at one or more junctions between the carbon nanotubes and the graphene film. In some embodiments, the grown carbon nanotubes are in ohmic contact with the graphene film through the carbon-carbon bonds at the one or more junctions between the graphene film and the carbon nanotubes. In some embodiments, the carbon-carbon bonds that link the carbon nanotubes to the graphene film include carbon-carbon double bounds. In some embodiments, the one or more junctions between the carbon nanotubes and the graphene films include seven-membered carbon rings. In some embodiments, the one or more junctions are seamless.

In some embodiments, the graphene film may include at least one of monolayer graphene, few-layer graphene, double-layer graphene, triple-layer graphene, multi-layer graphene, graphite, and combinations thereof. In some embodiments, the graphene film may include few-layer graphene. In some embodiments, the graphene films exclude reduced graphene oxide. In some embodiments, the graphene films exclude graphite.

In some embodiments, the carbon nanotubes may include at least one of single-walled carbon nanotubes, double-walled carbon nanotubes, triple-walled carbon nanotubes, multi-walled carbon nanotubes, ultra-short carbon nanotubes, small diameter carbon nanotubes, and combinations thereof. In some embodiments, the carbon nanotubes may include vertically aligned carbon nanotubes that are perpendicular or substantially perpendicular to the graphene film, such as vertically aligned single-walled carbon nanotubes. In some embodiments, the carbon nanotubes may include horizontally aligned carbon nanotubes that are parallel or substantially parallel to the graphene film.

In some embodiments, the graphene-carbon nanotube hybrid materials may be free-standing. In other embodiments, the graphene-carbon nanotube hybrid materials may include a substrate that is associated with the graphene film. In some embodiments, the substrate may include one or more atoms of Ni, Co, Fe, Pt, Au, Al, Cr, Cu, Mg, Mn, Mo, Rh, Si, Ta, Ti, W, U, V, Zr, $SiO_2$, $Al_2O_3$, BN, diamond, alloys thereof, and combinations thereof. In some embodiments, the substrate may include at least one of copper, nickel, cobalt, platinum, gold, iridium, silicon, alloys thereof, and combinations thereof. In some embodiments, the substrate may include a copper foil.

The graphene-carbon nanotube hybrid materials of the present disclosure may also have various specific surface areas. For instance, in some embodiments, the graphene-carbon nanotube hybrid materials may include specific surface areas that range from about 100 $m^2/g$ to about 3,000 $m^2/g$. In some embodiments, the graphene-carbon nanotube hybrid materials may include specific surface areas that range from about 2,000 $m^2/g$ to about 3,000 $m^2/g$. In some embodiments, the graphene-carbon nanotube hybrid materials may include specific surface areas that range from about 2,600 $m^2/g$ to about 3,000 $m^2/g$. In some embodiments, the graphene-carbon nanotube hybrid materials may include specific surface areas that are more than about 650 $m^2/g$.

An example of a graphene-carbon nanotube hybrid material is shown in FIG. 11A. In this example, graphene-carbon nanotube hybrid material 20 includes nickel substrate 22, graphene film 24, and vertically aligned single-walled carbon nanotubes 26 that are covalently linked to the graphene film through carbon-carbon bonds at junctions 25.

Capacitors

In some embodiments, the graphene-carbon nanotube hybrid materials of the present disclosure may be used as components of capacitors. Thus, additional embodiments of the present disclosure pertain to capacitors that incorporate the graphene-carbon nanotube hybrid materials of the present disclosure.

In some embodiments, the capacitor may be a two-electrode electric double-layer capacitor (EDLC). In some embodiments, capacitors containing the graphene-carbon nanotube hybrid materials of the present disclosure may have impedance phase angles that range from about −70° to about −85° at a frequency of 120 Hz. In some embodiments, capacitors containing the graphene-carbon nanotube hybrid materials of the present disclosure may have impedance phase angles of about −81.5° at a frequency of 120 Hz. In various embodiments, capacitors containing the graphene-carbon nanotube hybrid materials of the present disclosure may have a specific capacitance that ranges from about 1 $mF/cm^2$ to about 1 $F/cm^2$, from about 2 $mF/cm^2$ to about 500 $mF/cm^2$, from about 2 $mF/cm^2$ to about 100 $mF/cm^2$, from about 2 $mF/cm^2$ to about 20 $mF/cm^2$, or from about 2 $mF/cm^2$ to about 4 $mF/cm^2$. In some embodiments, the specific capacitance of a capacitor containing the graphene-carbon nanotube hybrid materials of the present disclosure may depend on the length of the carbon nanotubes. For instance, in some embodiments, capacitors with longer carbon nanotube lengths may have a higher specific capacitance.

Capacitors that incorporate the graphene-carbon nanotube hybrid materials of the present disclosure may have various arrangements. For instance, in some embodiments, the substrate of the graphene-carbon nanotube hybrid material may serve as a current collector in the capacitor. Likewise, the graphene films may serve as electrodes.

An example of an EDLC that includes the graphene-carbon nanotube hybrid materials of the present disclosure is shown in FIG. 11B. In this example, EDLC 28 contains two super-imposed graphene-carbon nanotube hybrid materials 20 that were previously described and shown in FIG. 11A. Nickel substrate 22 serves as current collectors. Likewise, graphene film 24 serves as electrodes. The two superimposed graphene-carbon nanotube hybrid materials are separated by separator 27. In some embodiments, separator 27 may be a filter paper or another object.

Field Emitter Devices

In some embodiments, the graphene-carbon nanotube hybrid materials of the present disclosure may be used as components of field emitter devices. Thus, additional embodiments of the present disclosure pertain to field emitter devices that incorporate the graphene-carbon nanotube hybrid materials of the present disclosure.

Figure 23:
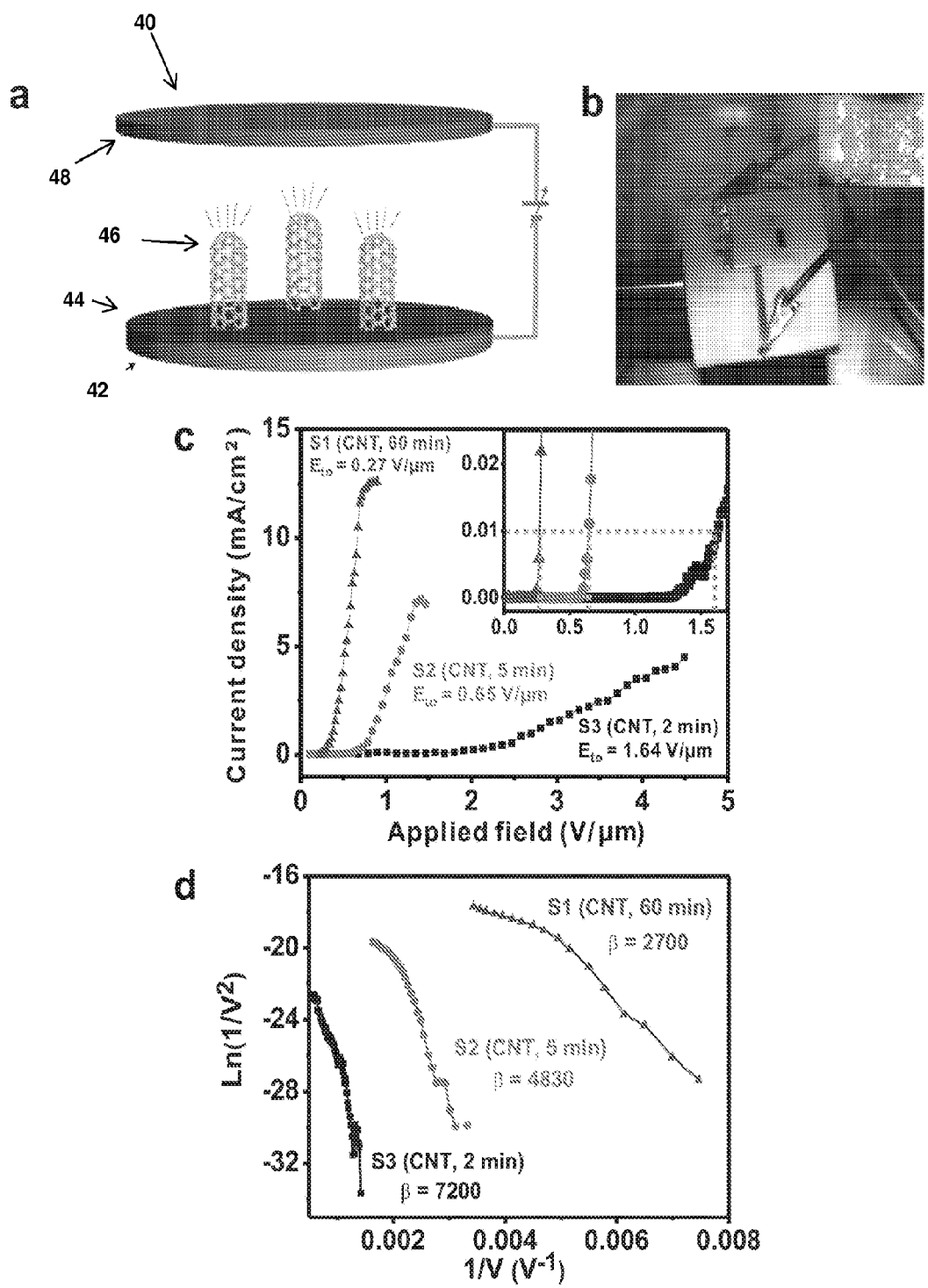
FIG. 23 provides field-emission characteristics of the CNT-graphene-porous nickel electrodes.

The field emitter devices that incorporate the graphene-carbon nanotube hybrid materials of the present disclosure may also have various arrangements. For instance, in some embodiments, the substrate of the graphene-carbon nanotube hybrid material can serve as an electrode. Likewise, the graphene films can serve as a linking surface. Similarly, and the carbon nanotubes can serve as emitters. An example of such an embodiment is shown in FIG. 23A as field emitter device 40. In this Example, porous nickel substrate 42 serves as the cathode while graphene film 44 serves as the linking surface. Likewise, SWNTs 46 serve as field-emission emitters. In addition, an indium tin oxide (ITO)-coated glass 48 is used as the anode.

Applications and Advantages

The graphene-carbon nanotube hybrid materials of the present disclosure can display ohmic interconnections, stand-alone properties, high interfacial contacts, high surface areas, and efficient volume utilization. Thus, the graphene-carbon nanotube hybrid materials of the present disclosure can find numerous applications in various electrical and energy storage devices, including capacitors, field emitter devices, dampeners, batteries, photovoltaic devices, fuel cells, and the like.

Furthermore, as set forth in more detail in the Examples herein, electrical devices that incorporate the graphene-carbon nanotube hybrid materials of the present disclosure demonstrate significantly improved performance over electrical devices that incorporate previously designed carbon nanotube-based hybrid structures.

For instance, in some embodiments, the graphene films in the graphene-carbon nanotube hybrid structures of the present disclosure can serve as linking agents between the carbon nanotube-metal substrate interfaces so that electrical power is used efficiently. In addition, the use of porous nickel substrates can improve the surface-area-utilization-efficiency of the metal substrates.

In fact, as set forth in more detail in the Examples herein, ohmic contact at the one or more junctions between the carbon nanotubes and graphene film was observed. In contrast, in most of recently reported carbon nanotube-graphene hybrids, CNTs and graphene were physically combined together with poor junctions that in turn limit their potential applications in electronics.

As also set forth in more detail in the Examples herein, the graphene-carbon nanotube hybrid materials of the present disclosure have shown impedance phase angle of −81.5° at a frequency of 120 Hz when used as capacitors. Such results are comparable to commercial aluminum electrolytic capacitors (AECs) for alternating current (AC) line filtering applications. Furthermore, the capacitors that incorporate the graphene-carbon nanotube hybrid materials of the present disclosure can deliver a high volumetric energy density of 2.42 $mWh/cm^3$ in ionic liquid, more than two orders of magnitude higher than that of AECs. In addition, such capacitors demonstrate high rate capability of up to 400 V/s, thereby enabling the microdevices to demonstrate a maximum power density of 115 W/cm³ in aqueous electrolyte. Thus, such high performance electrochemical properties can provide more compact AC filtering units and discrete power sources in future electronic devices.

Additional Embodiments

Reference will now be made to more specific embodiments of the present disclosure and experimental results that provide support for such embodiments. However, Applicants note that the disclosure herein is for illustrative purposes only and is not intended to limit the scope of the claimed subject matter in any way.

Example 1

Design of a Seamless 3-Dimensional Carbon Nanotube Graphene Hybrid Material

In this Example, Applicants disclose a method to bond graphene and single-walled carbon nanotubes (SWNTs) or small diameter carbon nanotubes seamlessly during the growth stage. The hybrid material exhibits a surface area of more than 2,000 m²/g and ohmic contact from the vertically aligned SWNTs to the graphene. Using aberration-corrected scanning transmission electron microscopy, Applicants observed the covalent transformation of sp²-carbon between the planar graphene and the SWNTs at the atomic-resolution level. These findings provide a new benchmark for understanding the three-dimensional graphene/SWNT conjoined materials.

More specifically, Applicants disclose in this Example a method to prepare high quality graphene with few-walled (1-3-walled) carbon nanotube (CNT) carpets seamlessly connected via covalent bonds. Without sacrificing their stand-alone properties, the ohmic interconnected graphene and CNT carpet hybrid can be produced in a high surface area material that can affect, for example, high performance supercapacitor devices. The graphene substrate method disclosed here permits access to investigate the atomic nature of the interface between the carbon surfaces, in this case graphene, and the nanotube carpet. The atomic scale aberration corrected STEM analysis gives the detailed information of the conjugated covalent bonds in the junction region, which is in agreement with simulation studies.

Example 1.1

Synthesis of Covalently Bonded Graphene and CNT Forests by Using a Floating Buffer Layer To simultaneously control the diameter of CNTs while forming covalent bonds between graphene and the CNT forest, Applicants utilized a sandwich structure with the catalyst layer between the graphene substrate and top protective alumina layer. See FIG. 1. In this structure, there is no barrier between the graphene and nanotube carpet. In addition, the top alumina layer acts as a floating protective layer, assisting the formation of small diameter CNT carpets.

The growth process is diagrammed in FIG. 1, as described previously. First, the graphene is grown on a copper foil. See FIGS. 1A-B. Next, the iron catalyst and alumina buffer layer are deposited on the graphene in series by electron beam (e-beam) evaporation. See FIG. 1C. During the growth, the catalyst and alumina are lifted up and the CNT carpet is grown directly out of the graphene. See FIG. 1D. This growth strategy results in seamless covalent bonds between the graphene and CNT carpet.

Observation of the growth at the initial stage of CNT growth was sought. However, the growth is fast with over 10 μm-long nanotubes grown in seconds. This makes direct observation of the initial stage difficult. Alternatively, if less catalyst is used, the CNT growth can be stopped at its initial stage for direct observation due to rapid deactivation of the catalyst. FIGS. 2A-D and 2E-H are scanning electron microscope (SEM) images of samples grown using 0.3 nm, 0.5 nm and 1 nm iron catalyst layers, respectively. With a 0.3 nm iron catalyst layer, the CNTs grew in isolated patches and the alumina layer was not fully lifted. With 0.5 nm of iron catalyst, although the growth was still limited to small patches, a CNT forest appeared and the alumina layer was sporadically lifted.

Figure 2:
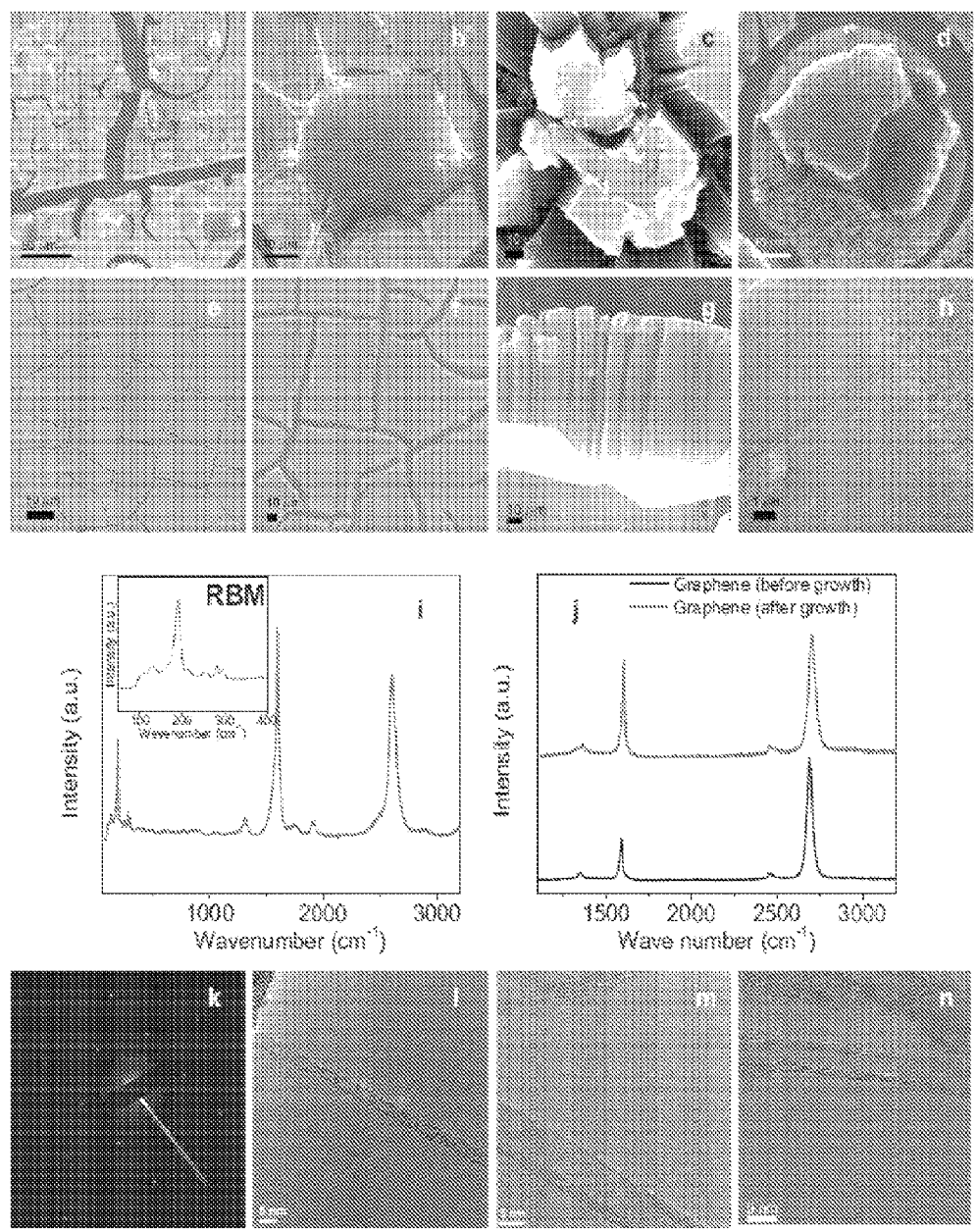
FIG. 2 provides characterization of CNT carpets grown from graphene.

Applicants also observed that the top alumina layer was partially (FIG. 2C, center part) or fully (FIG. 2D) removed. Such observations provide evidence for the alumina layer lifting mechanism. On the areas where alumina was raised (FIG. 2C, center part and FIG. 2D), a bright catalyst layer was visible using SEM, indicating a tip-growth (i.e., "Odako" or Japanese kite) mechanism. When the iron catalyst layer was 1 nm thick (FIGS. 2E-H), the CNT carpet was grown throughout the entire catalyst region and a large-scale homogeneous carpet was visible (FIGS. 2E-F). Compared to the normal CNT carpet under super growth conditions, this carpet was usually split into patches of hundreds of μm in size. The gaps in-between were formed during the initial growth stage, when the carbon feedstock needed to pass through them to reach the catalyst. The side view of the CNT carpet in FIG. 2G shows the CNTs can be as long as 120 μm after 10 min of growth. The carpet tip region is imaged in FIG. 2H, where the nanotubes are still well-aligned.

Figure 5:
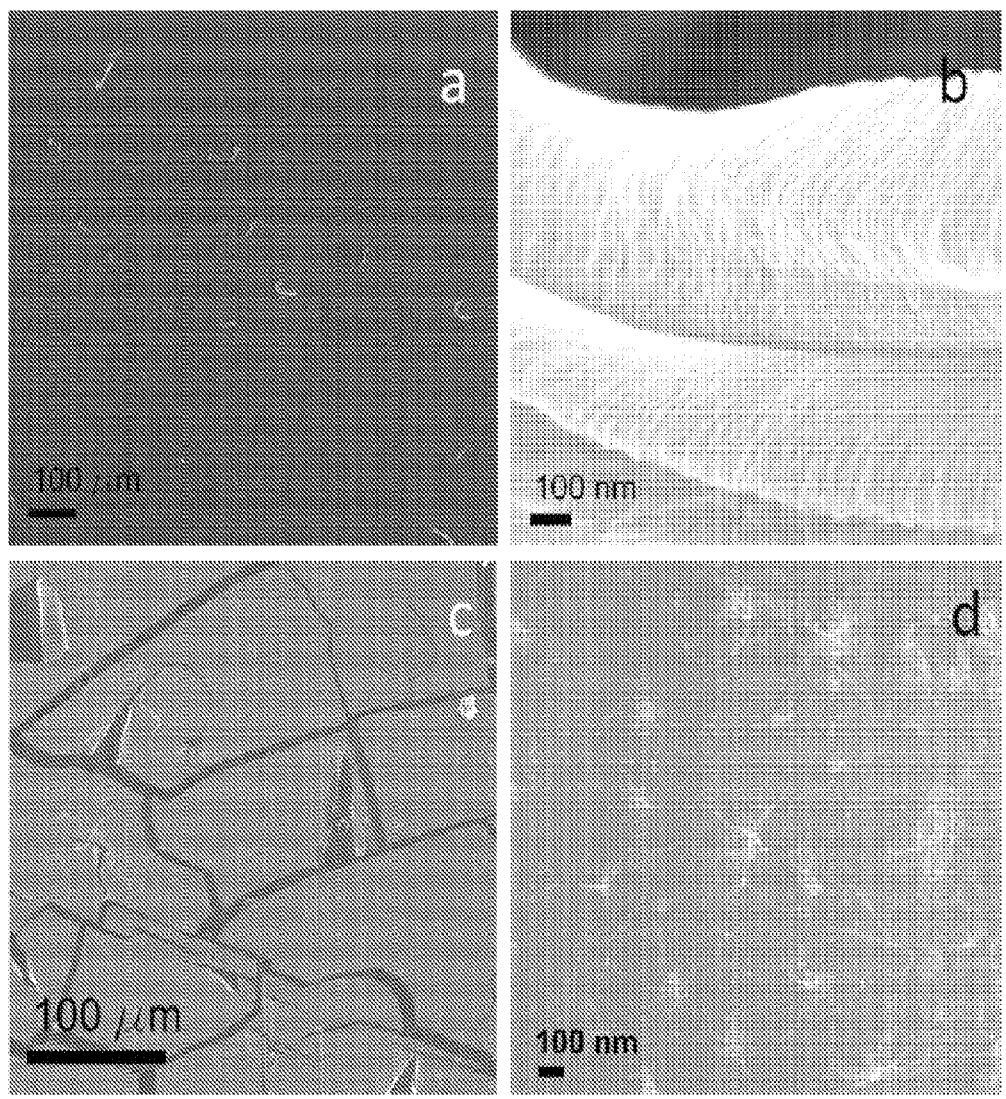
FIG. 5 shows SEM image of CNT carpet grown on graphene using different amounts of alumina.
Figure 6:
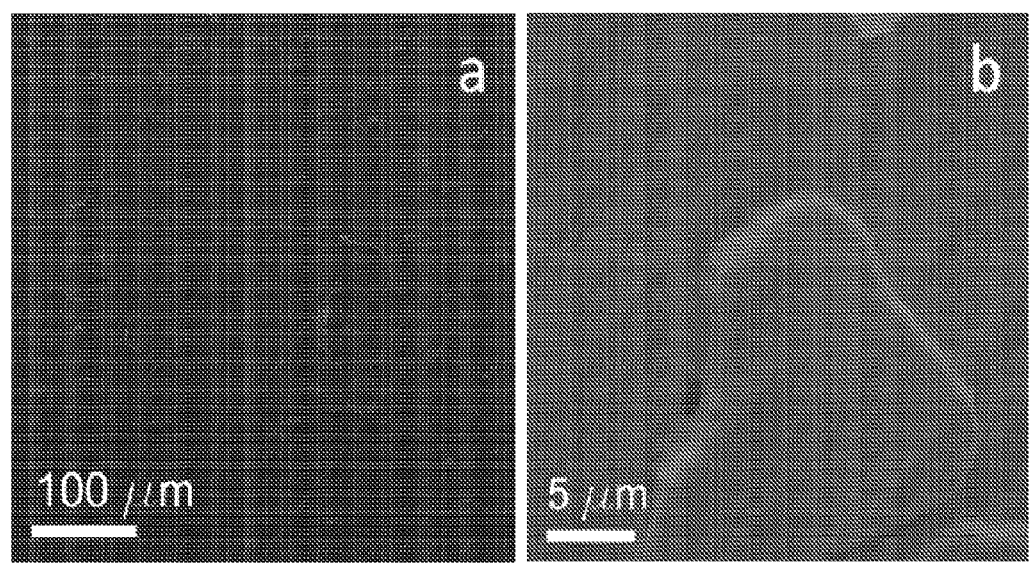
FIG. 6 shows SEM images of attempted CNT growth on a graphene free copper foil substrate. A large-area view (FIG. 6A) and a zoomed-in view (FIG. 6B) are shown. No nanotube growth is seen.
Figure 7:
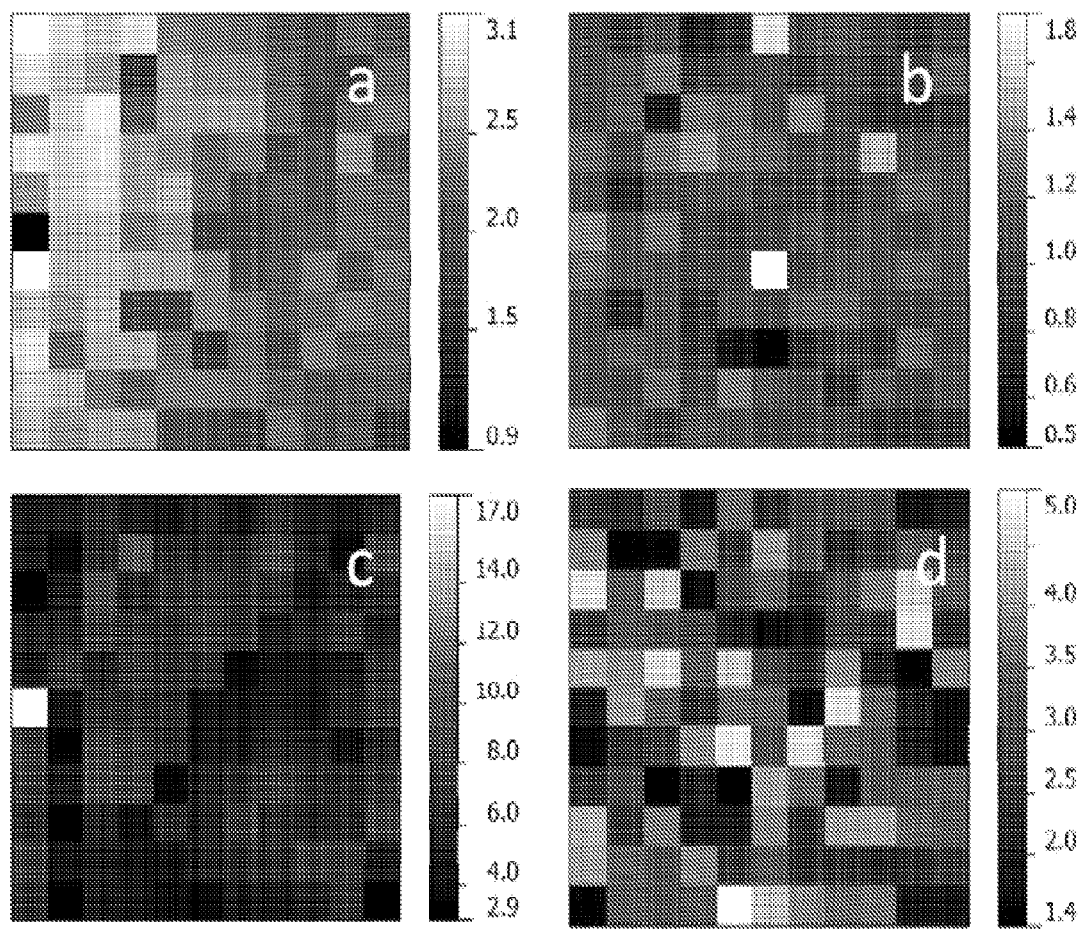
FIG. 7 shows Raman spectral mapping for graphene before and after CNT growth.

Additional data relating to CNT growth optimizations are illustrated in FIGS. 5-7. The graphene layer was found to be required for the CNT growth over the copper foil. For instance, without the graphene layer, deactivation of the iron catalyst ensued (FIG. 6), presumably due to alloying.

Since the CNT carpet is grown directly from the graphene surface atop copper, it is difficult to observe the Raman spectrum of the graphene after growth. To solve this problem, a graphene sheet was transferred to a Si/SiO₂ wafer and the catalyst was patterned on the graphene surface using ebeam lithography. The same growth parameters that were used on the copper foil were used for the graphene on Si/SiO₂, and the CNT carpet only grew on the area where there was catalyst. The characteristic Raman spectra of CNTs and graphene were observed from the hybrid material, as shown in FIGS. 2I-J. The G/D ratio of the CNTs is ~8:1, which is comparable to super growth CNT forests. The strong radial breathing mode signals (FIGS. 2I and 8) indicate the existence of high quality small diameter CNTs in the carpet.

The graphene quality was carefully checked before and after the CNT carpet growth. The Raman spectra of graphene, before and after CNT growth, are plotted as black and red curves in FIG. 2J, respectively. There is a slight increase in both the G and the D peaks after the nanotube growth. The TEM diffraction pattern (FIG. 2K) shows that the graphene is still monolayer after the CNT carpet growth. The increases of the G peak and D peak most likely result from a small amount of amorphous carbon deposition during growth. Additional Raman mapping experiments are shown in FIG. 7.

TEM images (FIGS. 2L-N) show the typical CNTs grown under the above conditions. Most CNTs in the carpet are single-walled, double-walled or triple-walled. The diameters of the CNTs are between 1 nm and 7 nm. The thin top alumina layer (3 nm) is the key factor in maintaining the small diameter of the CNTs. Without this alumina layer, the CNT diameters are usually larger than 20 nm and the carpet-like CNT forest does not form (FIG. 5). It is clear that the thin alumina layer effectively permits formation of small diameter CNTs in the carpet, even though deposited on top of the iron catalyst.

Example 1.2

Figure 3:
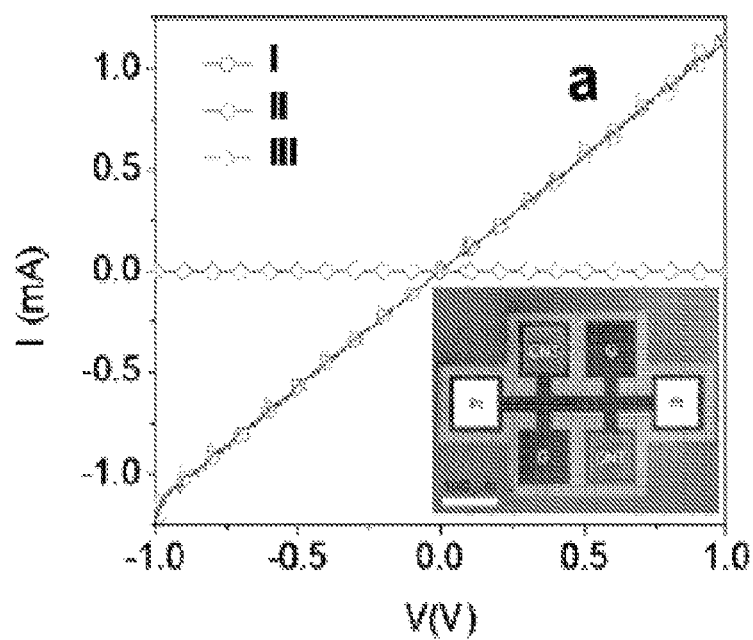
FIG. 3 provides the electrical properties and supercapacitor device characterization of the graphene and CNT carpet hybrid materials.
Figure 3:
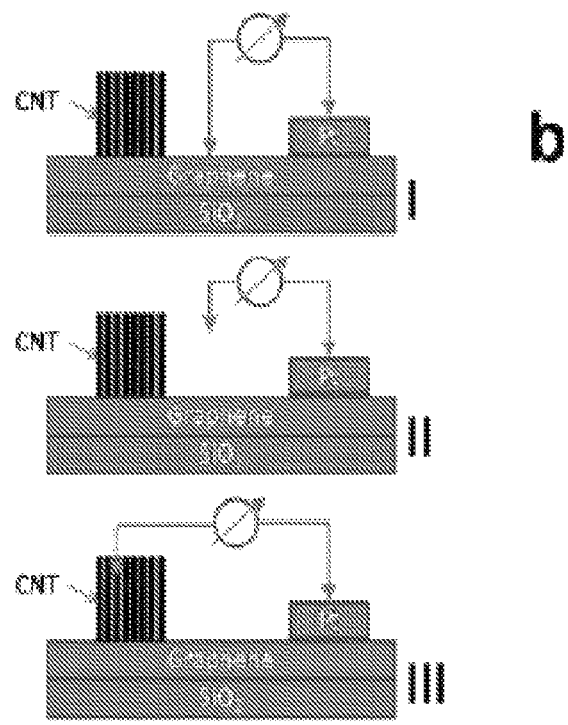
Figure 3:
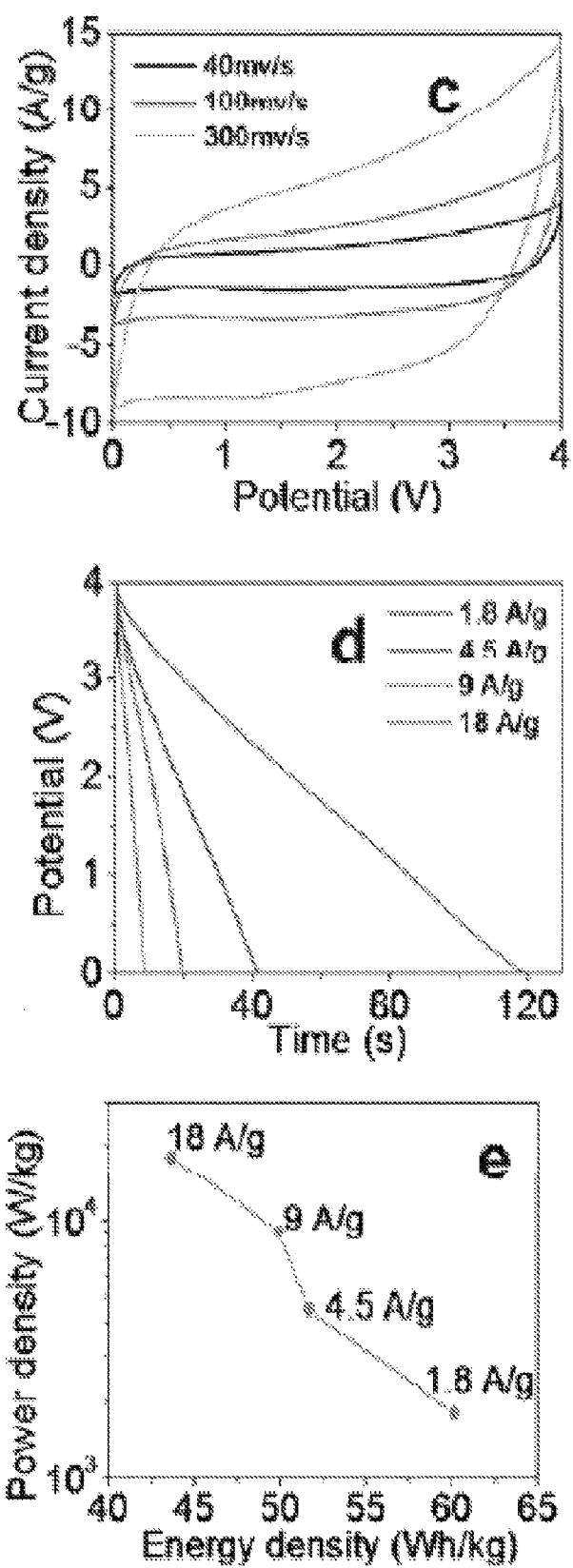
Figure 4:
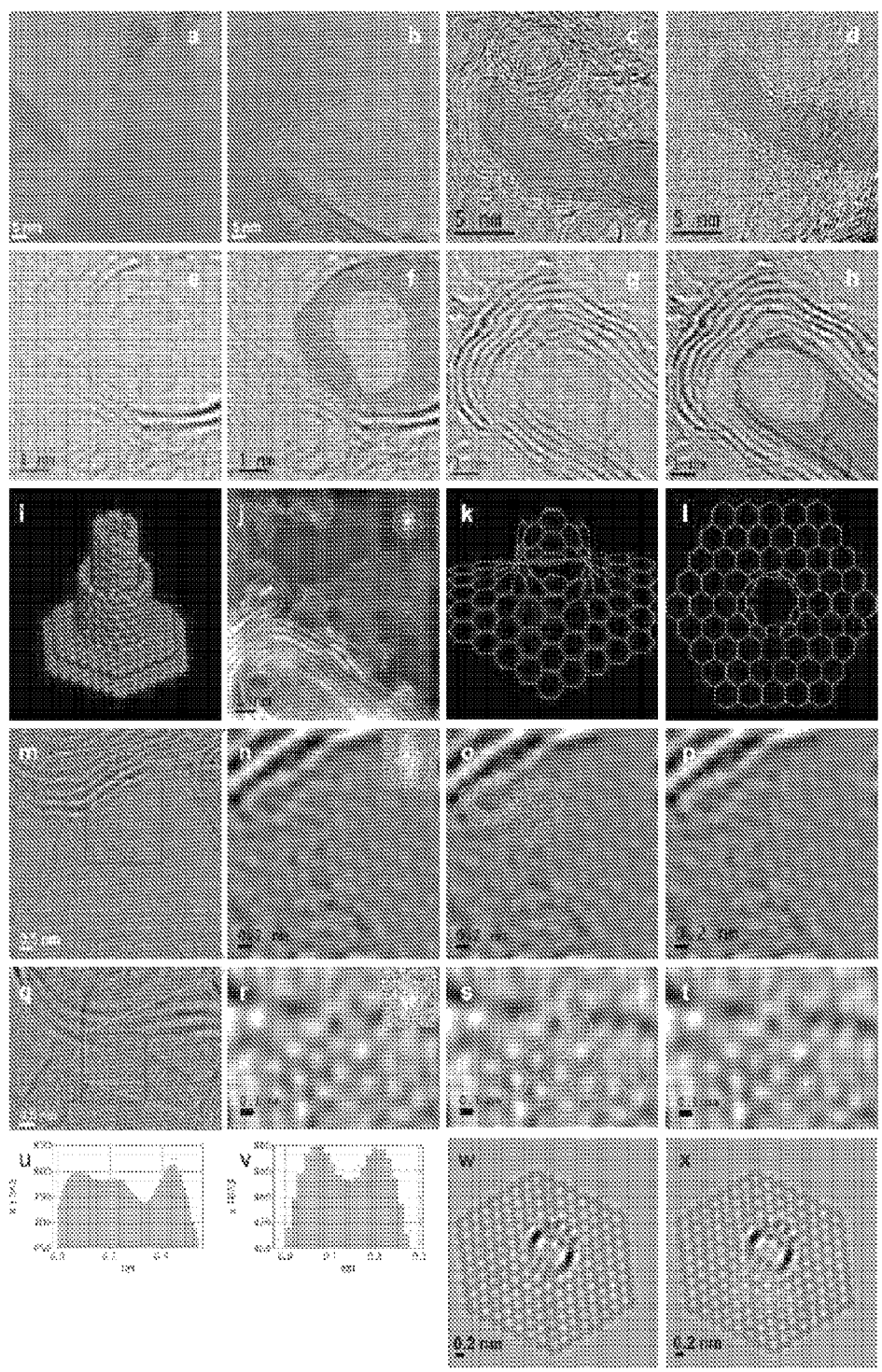
FIG. 4 provides TEM and scanning TEM (STEM) images of CNT-graphene junctions.
Figure 9:
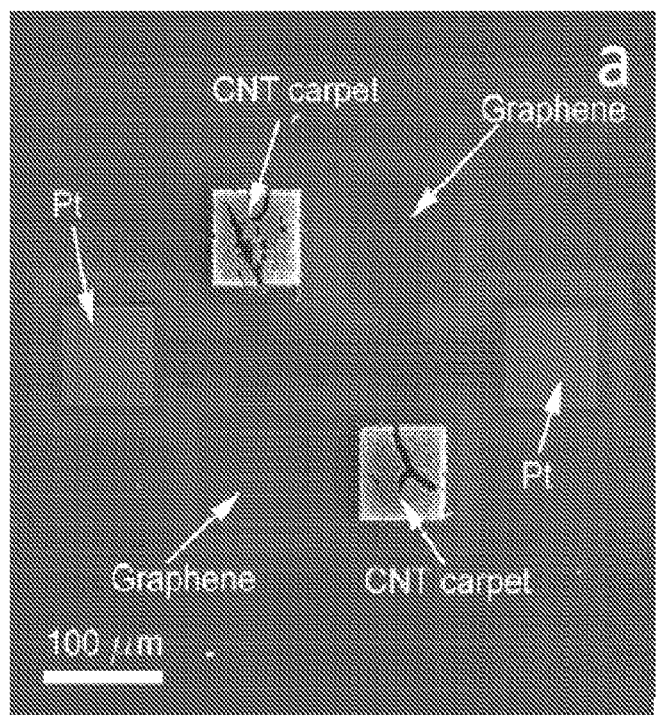
FIG. 9 shows device fabricated in this work for electrical measurements.
Figure 9:
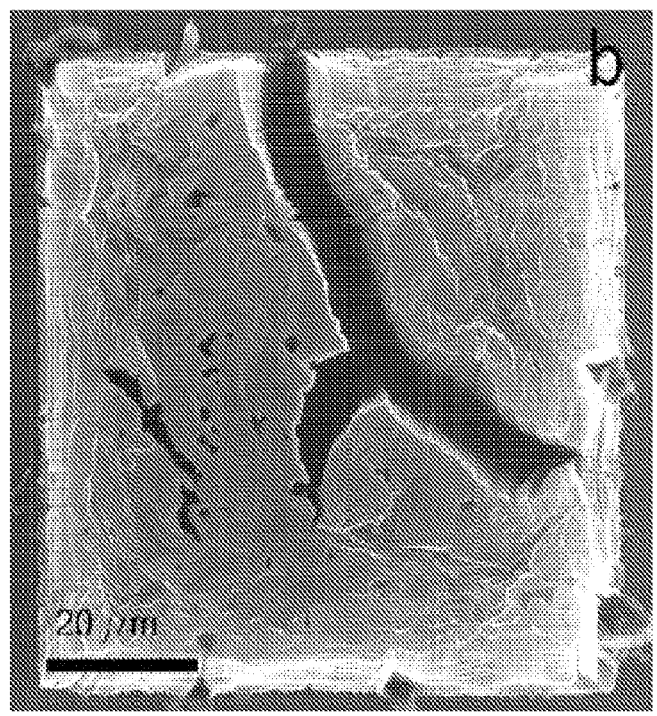

Design of High Surface Area Materials with Efficient Electrical Connections and Applications in Supercapacitors If there are indeed C—C covalent bonds formed between the CNTs and the graphene, it should lead to efficient electrical contact between the CNT carpet and the graphene plane. To evaluate the electrical behavior of CNT-graphene junctions, devices as seen in the SEM image in the inset of FIG. 3A were fabricated on a Si/SiO$_2$ wafer (FIG. 9). The Pt and CNT carpet electrodes were fabricated on the patterned graphene. The measurements were carried out as illustrated in FIG. 3B. One micro-manipulated probe tip was placed on the Pt electrode. The second tip was placed on the graphene electrode. Next, the I-V response was measured as curve I in FIG. 3A. The tip on the graphene electrode was then elevated and the I-V response indicated there was no current passing through the device (curve II in FIG. 3A). Since the probe station allows relatively precise horizontal movement of the probe tip, the elevated tip was shifted horizontally to the CNT carpet electrode. Although the probe tip was still suspended above the substrate plane, it contacted the sidewall of the carpet due to the height of the CNT carpet, and curve III in FIG. 3A was obtained. Such an ohmic contact was never before demonstrated and in the one case where it was investigated (Lee, D. H. et al., Adv. Mater. 22, 1247-1252, (2010)), there was shown not to be ohmic contact.

Curve III and curve I are almost identical except that there is more oscillation in III, originating from the loose contact between the tip and the side-wall of the nanotube carpet. This identical electrical response from CNTs or graphene to the metal electrode indicates an ohmic contact at the junction between the CNTs and graphene. Though the Ohmic contact by itself does not ensure a seamless junction, the Ohmic contact afforded is beneficial for device construction, and it has hitherto never been demonstrated.

Figure 10:
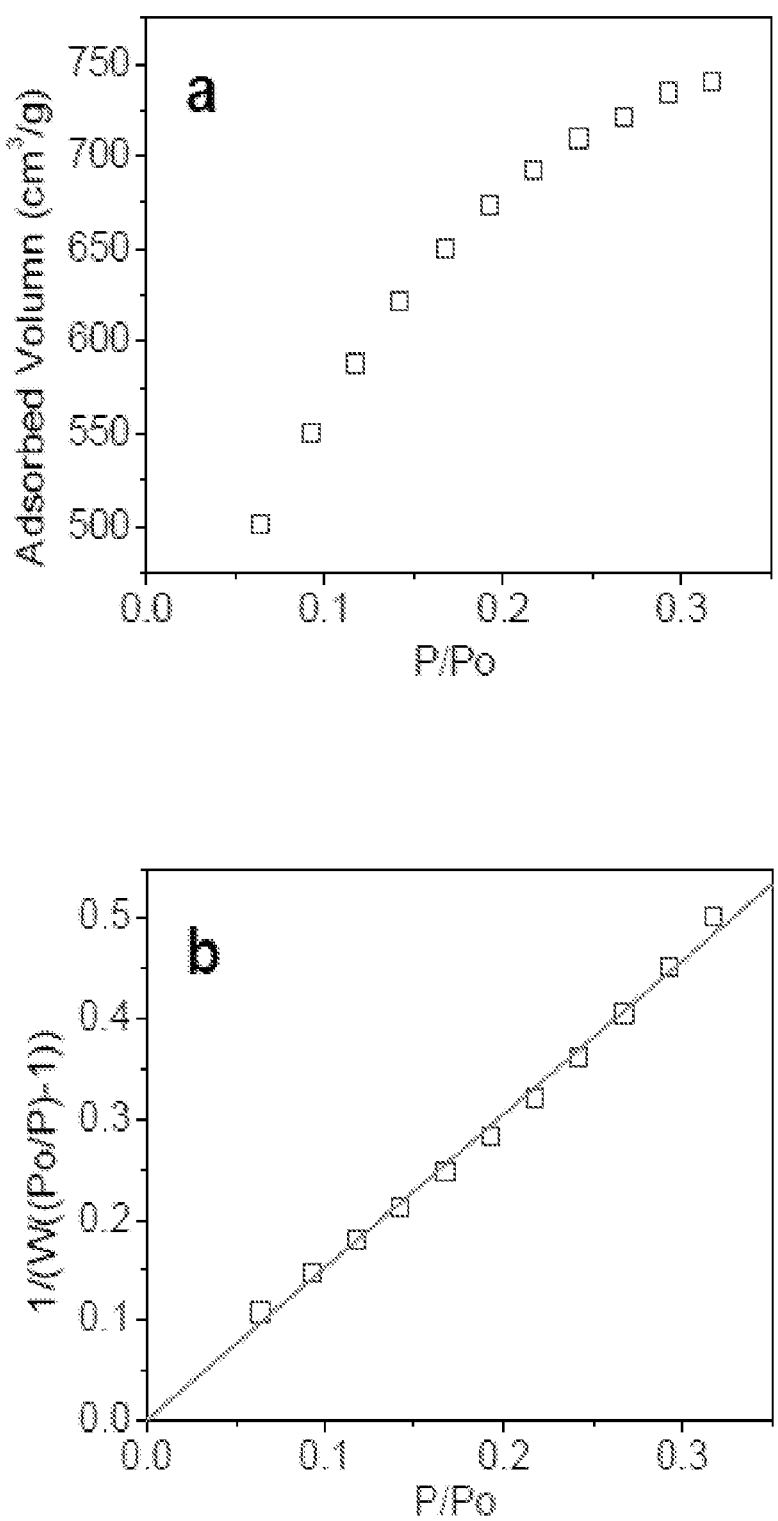

In addition to the efficient electrical connection, the new material also exhibits a large specific surface area (SSA) of 2,000 m$^2$/g to 2,600 m$^2$/g, depending on the sample batch. The Brunauer-Emmett-Teller (BET) surface area of one batch material is shown in FIG. 10. This sample has a BET SSA of 2285 m$^2$/g. The SSA of the graphene/CNT carpet hybrid material is comparable to the best reported values for open-ended CNTs (SSA 2,200 m$^2$/g) and graphene/graphene oxide (SSA 2000~3000 m$^2$/g). Considering the theoretical SSA limits of SWNTs (1315 m$^2$/g for closed tubes, 2630 m$^2$/g for open-ended tubes) and graphene (2630 m$^2$/g), the new material is attractive since it has a SSA close to the limits without sacrificing electrical properties. In reports of other nanotube/graphene hybrids, when surface area was reported, it ranged from 350 m$^2$/g (Zhang, L. L. et al., ACS Nano 4, 7030-7036, (2010)) to 612 m$^2$/g (Fan, Z. et al., Adv. Mater. 22, 3723-3728, (2010)), therefore much smaller than the values obtained here.

Supercapacitors based on this graphene/CNT hybrid material were fabricated. The performance of the devices was then tested. The results are shown in FIGS. 3C-E.

Figure 12:
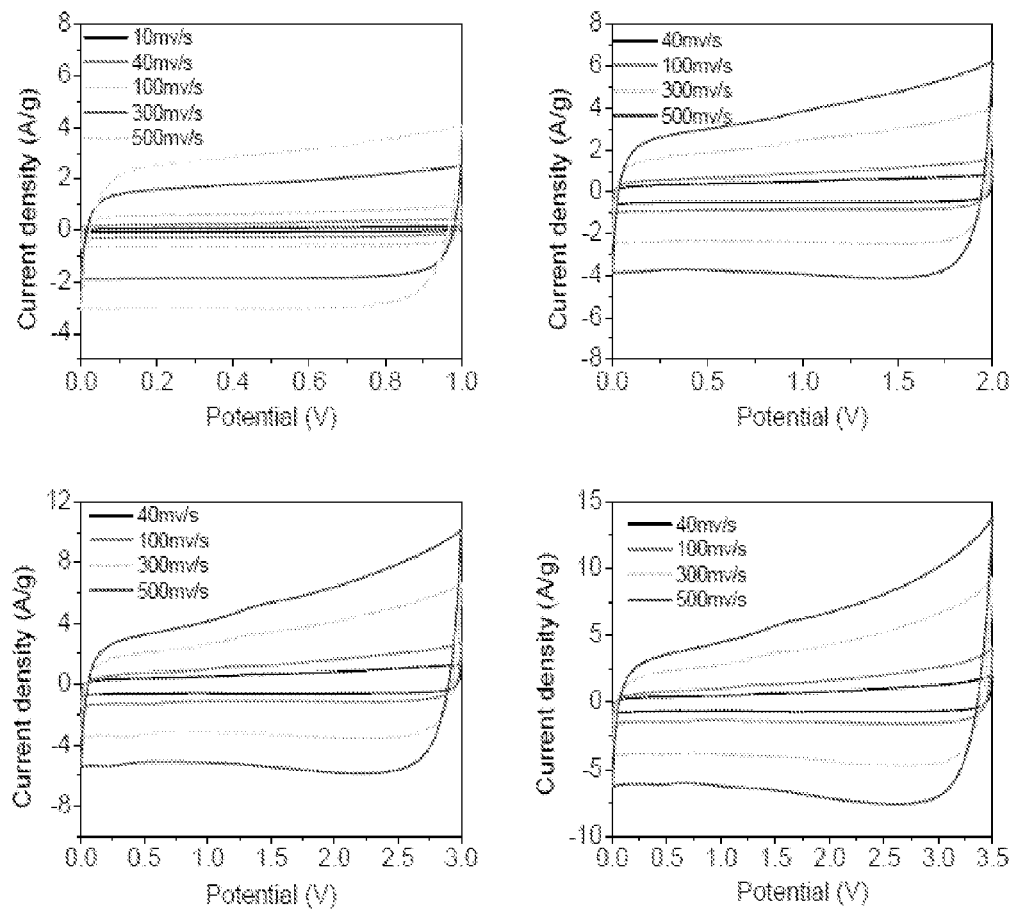
FIG. 12 shows cyclic voltammetry of EDLC under different scan rates and scan ranges.
Figure 13:
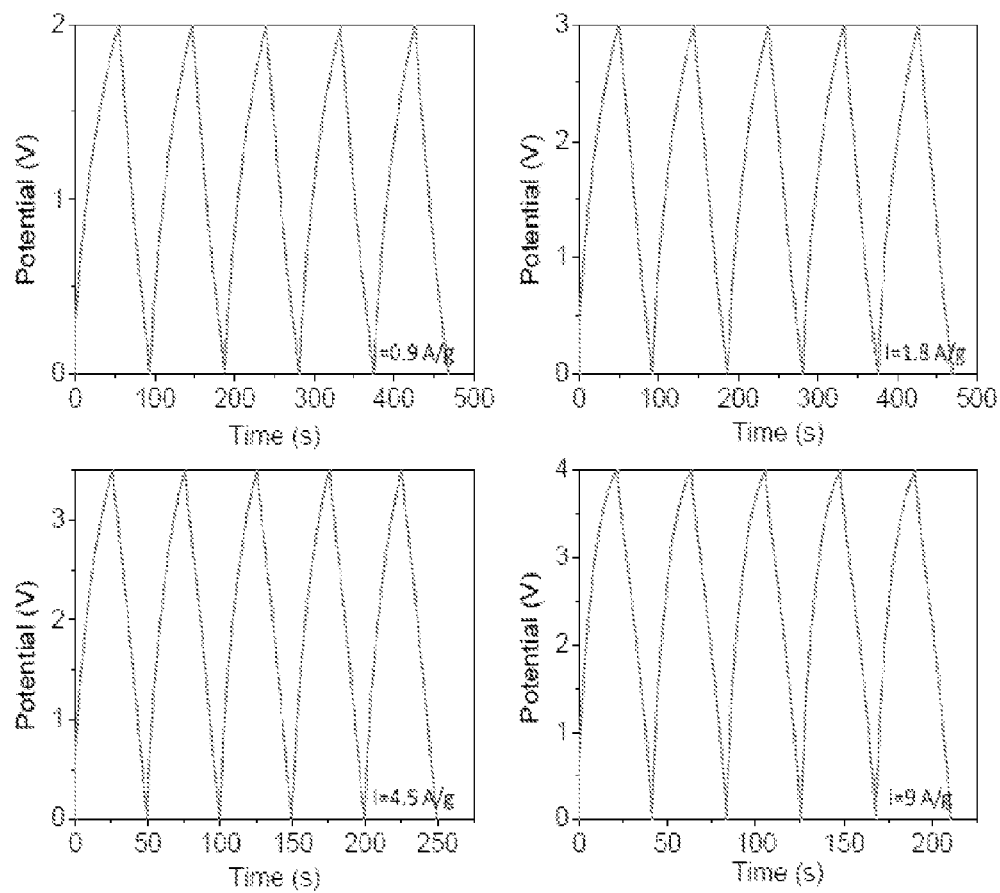
FIG. 13 shows the results of Galvanostatic charge-discharge experiments of EDLC under different current density and voltage range.
Figure 14:
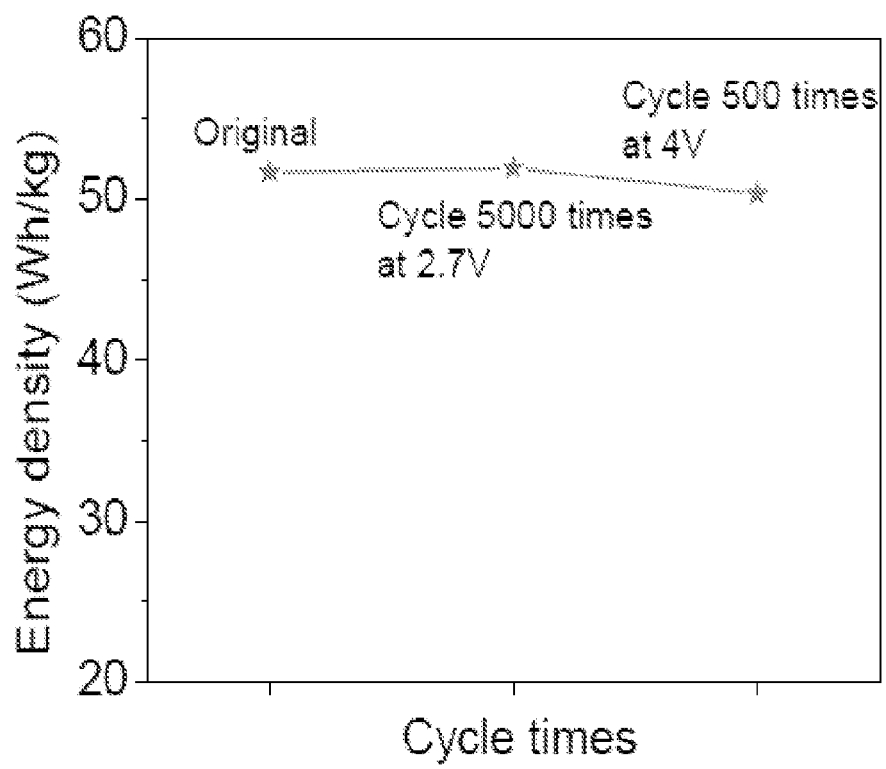
FIG. 14 shows the stability test of EDLC fabricated in Example 1 (discharge current density: 4.5 A/g).

Additional information of device fabrication and more tested results are shown in FIGS. 11-14. The supercapacitor devices work properly up to 4 V and the energy density reaches a value >60 Wh/kg, which is among the highest reported values for all carbon-based supercapacitors. The growth metal substrates are directly used as the current collector for the supercapacitor. This design can potentially decrease the total weight of the final device. The life times of the devices were tested and no retention of the energy density was observed after 5,000 cycles (FIG. 14). The high performance of the device here is based upon a far simpler fabrication procedure (FIG. 11) than used in most other similarly performing device. Under the fabrication conditions in this work, the active surface area of electrode materials in the supercapacitor is estimated to be 517 m$^2$/g. Without being bound by theory, it is envisioned that such performance can be attributed to the high active surface area and the electrically connected material.

Example 1.3

Characterization of a Covalently Bonded Graphene-CNT Junction

Figure 16:
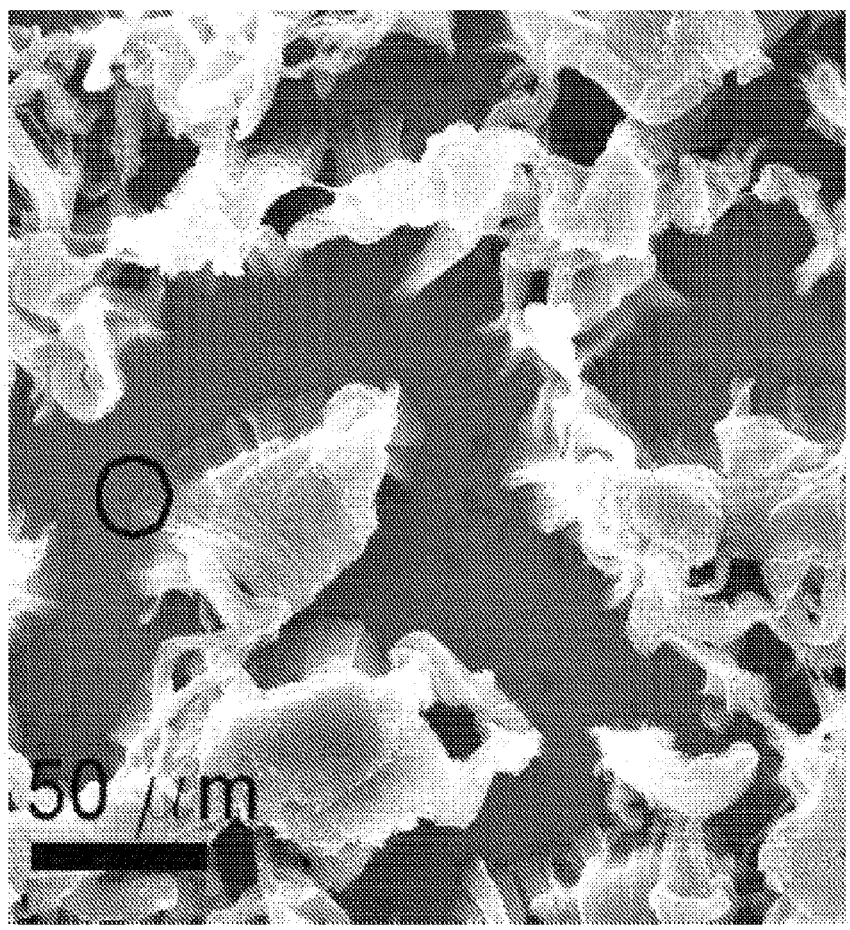
FIG. 16 shows an SEM image of graphene and CNT carpet hybrid material treated with ethanol. The circled root area is used further in the STEM experiments.

No previous studies of supposed nanotube-graphene junctions showed atomic resolution junction between the two carbon materials. In order to understand how the CNTs connected to the graphene layer, an aberration-corrected scanning transmission electron microscope (STEM) was used to investigate the atomic structure of the graphene-CNT junctions. A solvent induced bundling effect was used to prepare the sample in order to directly observe the junction (FIG. 16).

Figure 20:
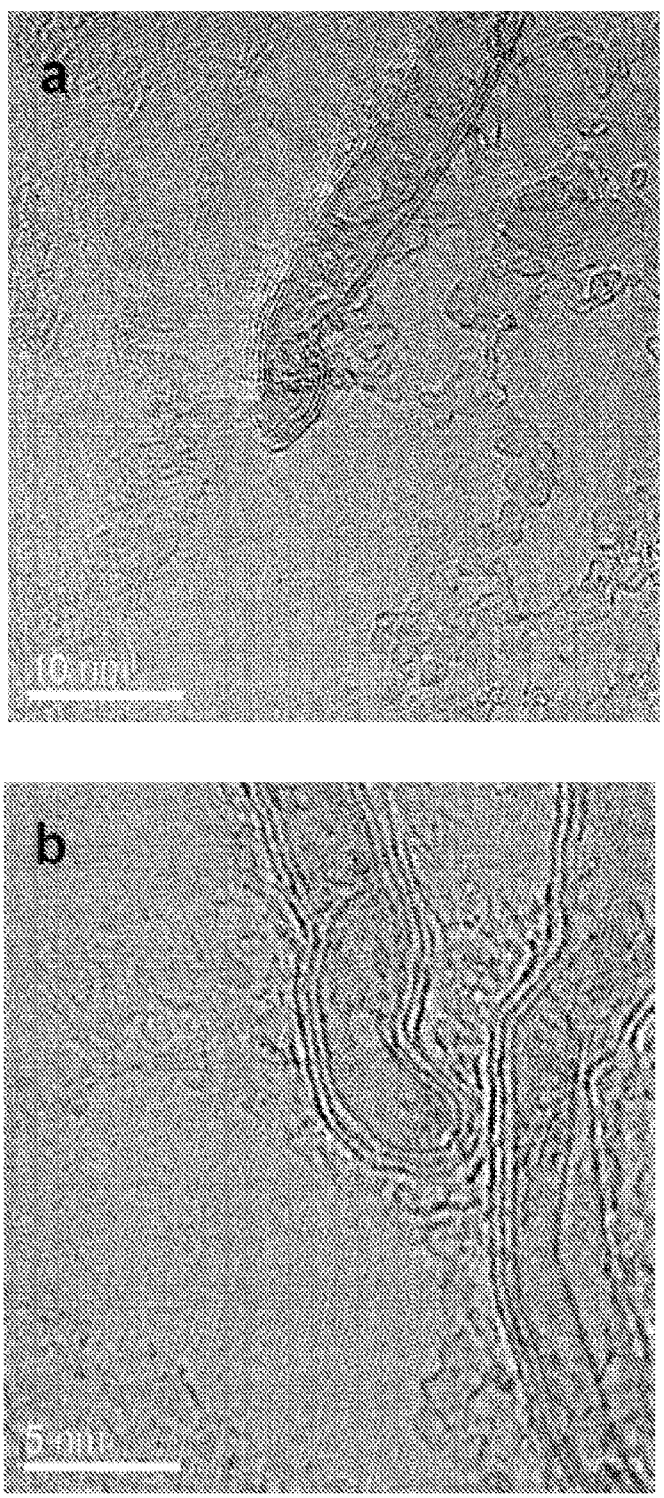
FIG. 20 shows BF STEM images showing the additional shells on the root of the CNTs grown on graphene substrate.

FIGS. 4A-B are conventional TEM images (taken at 200 KV) of the CNT root regions where they connect to the graphene plane. FIGS. 4C-D are the bright field (BF) STEM images (at 80 KV) of the roots of two CNTs. Interestingly, although the CNTs are few-walled tubes (FIG. 4C, triple-walled CNT; FIG. 4D, double-walled CNT), additional shells are often found at the roots. Additional images are shown in FIG. 20. The additional shells may produce a stronger CNT root that could in turn benefit the alumina lift process.

Figure 18:
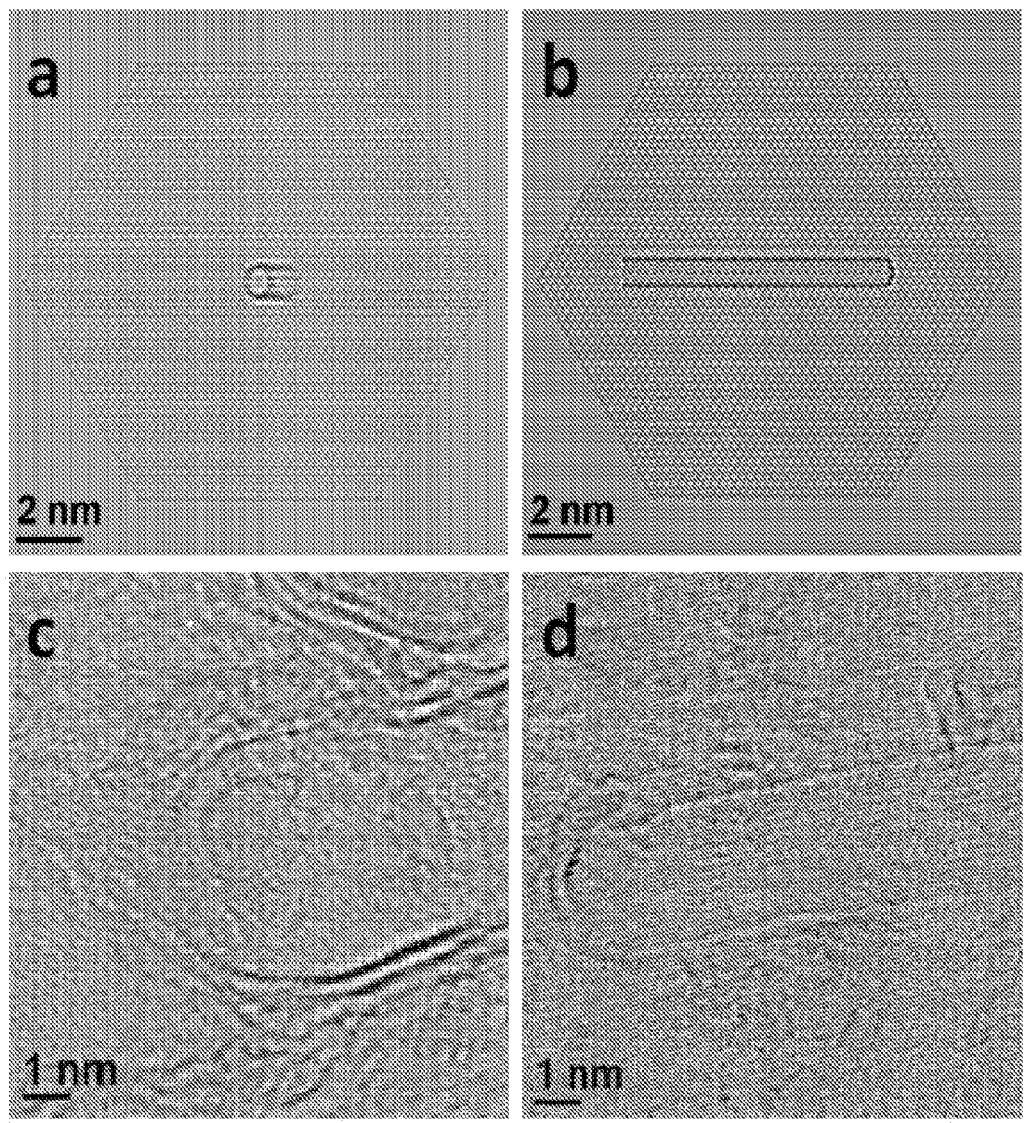
FIG. 18 shows a comparison of STEM images of CNT covalently bonded to graphene plane and CNT lying on the graphene plane.

In FIGS. 4E-F, the lateral layers inside the CNT (indicated by the cyan color in FIGS. 4F and 4H) are observed, which implies that the CNTs are open-ended at the bottom. This agrees with theoretical prediction that the CNT should be open-ended when it forms covalent bonds with the graphene base layer. The most inner rings of the indicated area (cyan color) in FIGS. 4F and 4H still have visible graphitic structure because of the upper walls of the CNT. The BET SSA results reported above also suggest that the CNTs are open-ended. The simulated STEM images and additional experimental STEM images (FIG. 18) confirmed that a ring-like structure is a characteristic property for covalent bonds between CNTs and graphene, and has not been observed in prior work. Based on those observations, a possible model of the CNT-graphene junction is proposed in FIG. 4I. The CNT is covalently bonded to the graphene plane and additional shells are formed in the CNT root region. This model implies that the most outer shell of the nanotube root will be bonded to the top-most layer of graphene, which was also directly observed in the dark field (DF) image in FIG. 4J. As in FIG. 4J, the left green circled area shows that a scrolled graphene layer and the outer-most shell of the CNT are the same layer. Previous theoretical work suggested the detailed atomic structure of the CNT and planar graphene transformations, which are shown in FIGS. 4K-L. A characteristic property of the junction is the existence of seven-member rings on the bonding region (indicated in red in FIG. 4K-L). From the projection drawing (FIG. 4L), the lower four benzene rings connected to the seven-membered ring should be mostly planar, and the upper three rings are more distorted.

Figure 19:
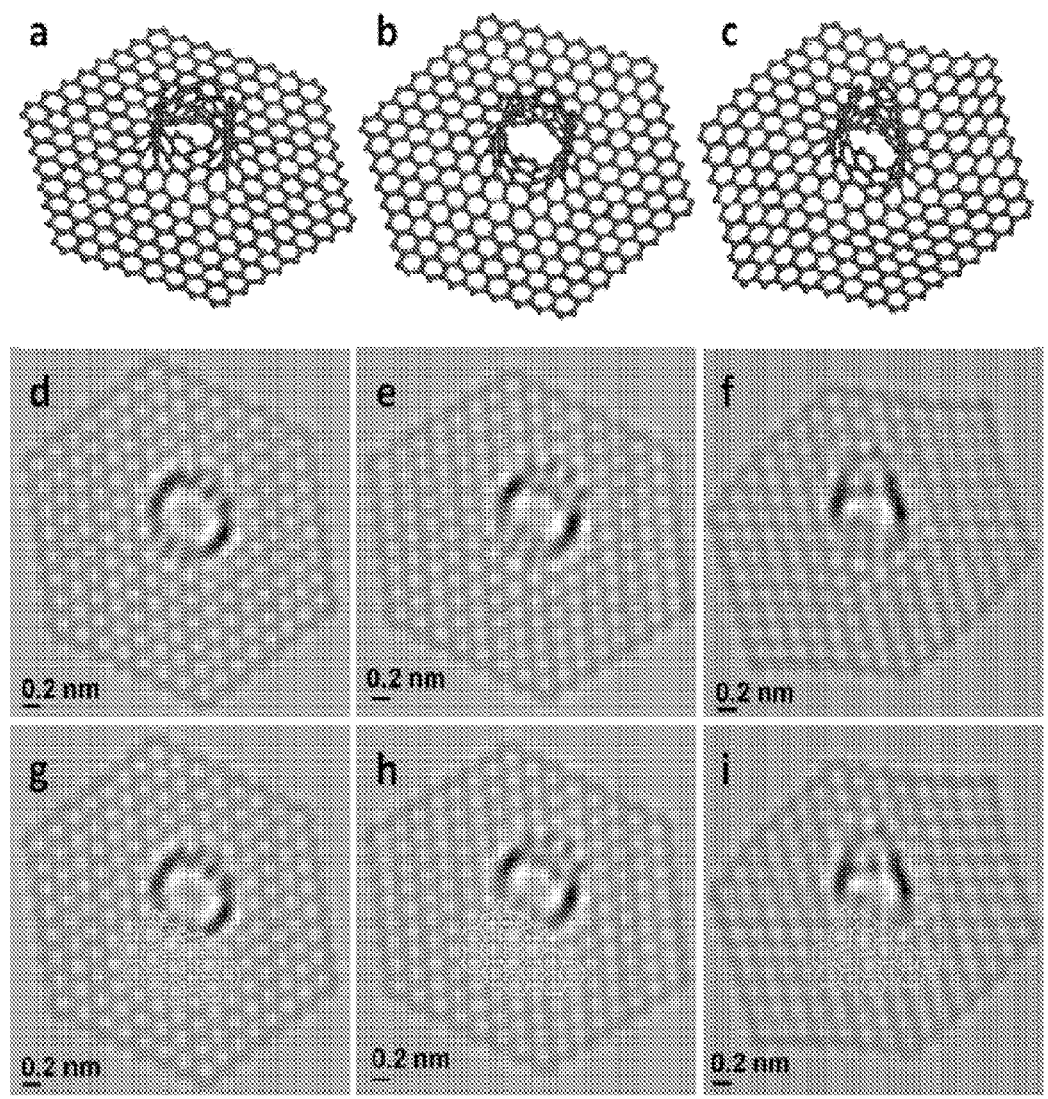
FIG. 19 shows simulated STEM images of graphene CNT junction structures.

FIGS. 4M-T show observed atomic structure of two junction regions. In the enlarged images (FIGS. 4N-P and FIGS. 4R-T), each white spot represent an aromatic ring. The number of edges for each ring can be identified by counting the adjacent white spots. As in FIGS. 4O and 4S, the seven member rings correspond to the junction region, as shown in the structure drawing. Their positions, with four rings in the graphene plane and three rings distorted due to their out-of-plane orientations, match the simulation results (FIGS. 4K and 4L). The intensity profiles (FIGS. 4P, 4T and 4U-V) are used to identify those close aromatic rings. The simulated STEM images of CNT graphene junctions based on structures proposed by the theoretical papers (FIGS. 17 and 19) are present in FIGS. 4W-X, which match the observed BF STEM images (FIG. 19). Taken together, the STEM images confirm the existence of covalent bonds between the CNTs and graphene in junction areas. This result is consistent with the conjugated 7-membered-ring-containing junctions suggested by theoretical studies. This structure further explains the high SSA and ohmic connections that were observed.

Discussion

In sum, Applicants have disclosed in this Example a method to build and microscopically confirm covalent bonds between graphene and CNT carpets. The aberration corrected STEM revealed the atomic structure of conjugated covalent bonds in the junction region, which is in agreement with previous simulation studies. In all previously reported experimental work on similar three dimensional graphene and CNT hybrid materials, the high quality single-and few-walled carbon nanotube carpets were not grown, nor were they shown with demonstrated seamless junction. To introduce the direct contact between a graphitic substrate and the CNTs, there was typically no buffer layer, which results in low surface area multi-walled CNT growth. The key step in this work is to introduce the floating buffer layer. The direct Odako tip-growth of the CNT forest on the graphene substrate was promoted when the catalyst could be raised with the buffer layer, resulting in covalent bonding between the graphene substrate and the CNT roots. If the catalyst remains at the surface, consumption of the graphene will ensue as the graphene will be used as a nanotube carbon growth source.

Example 1.4

Synthesis of Graphene and Carbon Nanotube Carpet Hybrid Materials

Graphene was grown on copper foil (25 μm thick) using previously reported methods. See, e.g., Nature 457, 706-710 (2009); Science 324, 1312-1314 (2009); Nano Lett. 9, 30-35 (2008); and Nature 468, 549-552 (2010). The catalyst (1 nm iron) and buffer layer (3 nm $Al_2O_3$) were deposited in series on the graphene-covered copper foil by ebeam evaporation. The growth of the CNT carpet can be done at either atmospheric or reduced pressure. When the experiment was done at atmospheric pressure, the flow-rates of ethylene, hydrogen and argon were 100 sccm, 400 sccm and 500 sccm, respectively. A bypass channel was used to bubble water vapor into the system and hydrogen was used as the carrier gas. The flow-rate for the bubbling hydrogen is 10 sccm. Before starting the carbon source flow, the assembled sample was annealed in the furnace under the same environment except the carbon source was closed. The annealing was performed at 750° C. for 3 min. After annealing, the carbon source was introduced and the growth time depended on the carpet growth height that was sought. Typically, a 10 min growth will yield a carpet with a height ~120 μm. When the experiment was done at reduced pressure, a water-assisted hot filament furnace was used. Nano Res. 2, 526-534, (2009). The flow rate of acetylene and hydrogen were 2 sccm and 210 sccm, respectively. The flow-rate for the bubbling hydrogen was 200 sccm. The sample was first annealed at 25 Torr for 30 s, during which a tungsten filament was activated by tuning the working current to 9-10 A and a power of 45 W to reduce the catalyst. Then, the pressure was reduced to ~5 Torr and the hot filament was switched off immediately to start the nanotube growth for additional 1-10 min depending on the carpet height sought. Typically, a 10 min growth period will yield carpet with a height ~60 μm.

Example 1.5

Characterization Methods

SEM images were taken using a JEOL6500 scanning electron microscope and a FEI Quanta 400 field emission gun scanning electron microscope. TEM images were taken using a 200 kV JEOL FE2100 transmission electron microscope. Atomic resolution STEM images were collected with a JEOL JEM-ARM200F operated at 80 kV equipped with a Cs probe corrector. Collection angles for the annular dark field were set to 33 and 125 mrad for the inner and outer semi-angles. For the bright field images the collection angle was 7.5 mrad. The convergence angle was set to 24 mrad. Dwell pixel time was set at 64 μs. Aberrations up to third order were corrected through a dodecapole corrector aligned through the CESCOR software. After the samples were transferred to the STEM chamber, they were beam-showered for 10 min to decrease the charging effect. The BET experiment was done using a Quantachrome Autosorb-3B surface analyzer and the sample was dried at 110° C. under vacuum for 16 h before the experiment. The Raman spectra of the samples were recorded with a Renishaw Raman RE01 scope using a 633 nm and a 514 nm argon laser.

Example 1.6

Growth Condition Optimization

Alumina Buffer Layer Thickness

The thickness of the alumina layer plays an important role in this Example. In a recent study (Nano Research 2, 526-534, (2009)), a similar catalyst stacking order was proposed. However, using their parameters (1 nm iron and 10 nm alumina), Applicants' carbon nanotube (CNT) carpet did not grow well on the graphene covered copper foil. Different alumina layer thicknesses were tested in the present work, with a fixed amount of catalyst (1 nm iron). When the thickness of the alumina was between 1 nm and 5 nm, the CNT carpet grew well. When the alumina thickness was thinner (e.g., FIGS. 5A-B, where images of the sample using 0.3 nm alumina are shown), there was only isolated carbonaceous material formed. No CNTs were found after growth. When the thickness of the alumina buffer layer is large, such as 10 nm, apparently the lifting process is more difficult and usually there is no carpet-like CNT forest formed.

FIGS. 5C-D are images of the sample with 10 nm alumina. In these images, there are only discrete CNTs on the substrate. Therefore, if the alumina layer is too thin, it does not effectively promote the CNT growth, leading to the formation of carbon structures with large features. On the other hand, the alumina buffer layer is difficult to lift when it is too thick. The optimal thickness settings found in this work were 3 nm of alumina and 1 nm of iron.

Iron Catalyst

Without being bound by theory, Applicants envision that the iron permits the growth of the nanotube seamlessly from the graphene, as it uses the graphene as a carbon source first then starts using the gas feedstock for the continued growth. The iron then rises up in a tip growth mechanism. It is no longer near the connection point of the graphene. So the iron paves the way for the seamless connection, but then its role is solely to grow the nanotube. Different thicknesses of iron catalyst are also tested, as shown in FIGS. 2A-H. Homogeneous CNT growth was optimized when the catalyst thickness was 1 nm. When less iron was used, such as 0.3 nm or 0.5 nm thicknesses of iron, as shown in FIGS. 2A-D, the CNT carpet only grew in sporadic regions.

Effect of Graphene

In this Example, the graphene layer is desired for the CNT growth on the copper foil. FIG. 6 shows the copper foil samples without graphene. The catalyst is 1 nm-thick iron, and the buffer layer is 3 nm-thick alumina. Using the same growth conditions as when graphene was present, no CNT carpet formed on the substrate. The existence of graphene is thought to block the formation of an alloy between the iron catalyst and the copper substrate. The alloy is not a CNT growth catalyst.

Example 1.7

Raman Mapping of Graphene and CNT Carpet

Raman Spectra Mapping of Graphene

Because the CNT carpet is grown directly from the graphene surface, it is difficult to observe the Raman spectrum of the graphene after growth. To solve this problem, the graphene sheet was transferred to a Si/SiO$_2$ wafer and the catalyst was patterned on the graphene surface using ebeam lithography. The same growth parameters that were used on the copper foil were used for the graphene on Si/SiO$_2$, and the CNT carpet only grew on the area where there was catalyst. Raman spectra of graphene were obtained on the regions near the catalyst area before and after growth. The Raman mapping results from a 50 μm×50 μm graphene area (step size: 5 μm) are shown in FIG. 7. The 2D/G ratio is ~2 before the CNT carpet was grown (FIG. 7A); it was ~1.2 after the growth (FIG. 7B). The G/D ratio of graphene is ~4-6 before the CNT carpet was grown (FIG. 7C) and was ~3-4 after the growth (FIG. 7D). Hence, the structure of graphene did not change during the CNT growth. The increase in the G and D peaks likely resulted from a small amount of amorphous carbon deposition on the graphene plane.

Raman Spectra of CNTs Along the Carpet Height

Figure 8:
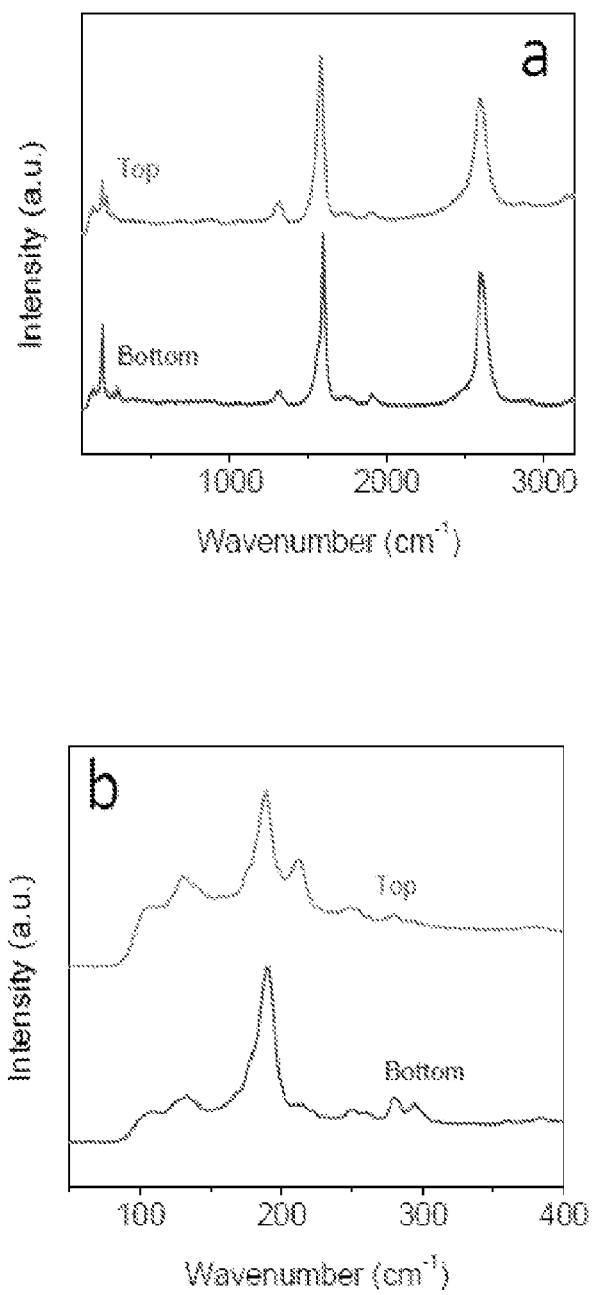
FIG. 8 shows Raman spectra of CNTs on the carpet top and bottom.

The Raman spectra of CNTs on the top and bottom of the carpet are compared here. FIG. 8 shows the Raman spectra. The top and bottom of the carpet are almost identical except for slightly stronger radial breathing mode signals for the bottom, where the CNTs would be least defective.

Example 1.8

Device Fabrication for Electrical Measurement

The monolayer graphene sheet was transferred to a Si/SiO$_2$ wafer and patterned into a Hall-bar like structure using ebeam lithography and reactive ion etching (RIE). The platinum electrode was defined using ebeam lithography and ebeam evaporation. The thickness of the platinum electrode was 30 nm. Then the catalyst (1 nm-thick layer of iron and 3 nm-thick layer of alumina) was defined using ebeam lithography and ebeam evaporation. The sample was then used to grow a CNT carpet under the same conditions as used for the copper foil substrate. The height of the CNT carpet was controlled to 40 μm to 100 μm. FIG. 9 shows the devices fabricated in this work.

Example 1.9

Brunauer-Emmett-Teller (BET) Specific Surface Area Measurements

The BET experiment was done using a Quantachrome Autosorb-3B surface analyzer. The sample was dried at 110° C. under vacuum for 16 h before the experiment. The standard 11-point BET measurement was applied. The results for a sample with SSA=2285 m$^2$/g are shown in FIG. 10.

Example 1.10

Supercapacitor Device Fabrication and Test

Figure 11:
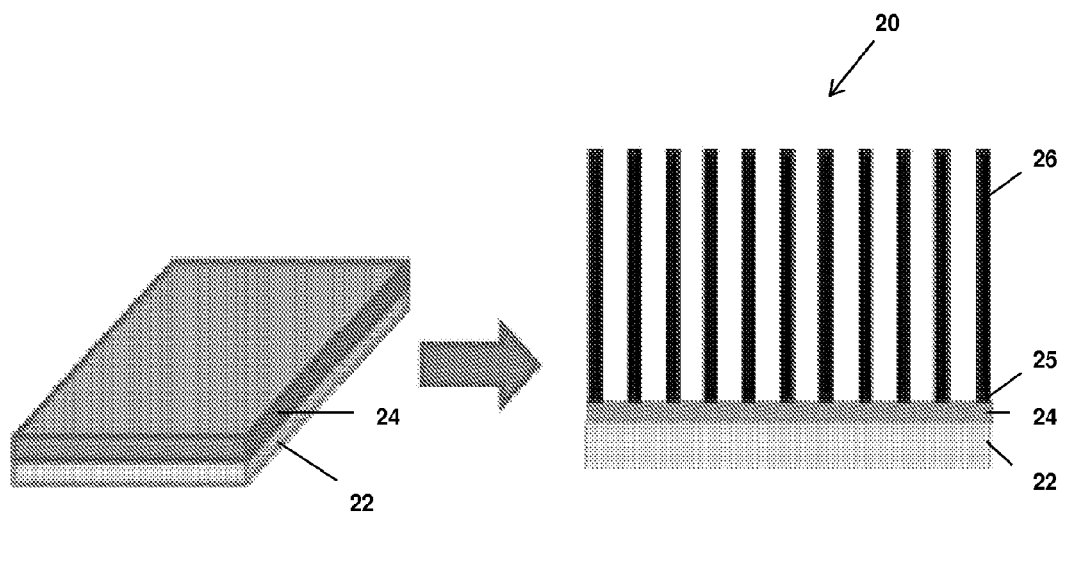
FIG. 11 shows a scheme for fabricating two-electrode electric double-layer capacitors (EDLC), where the current collector and the electrode are prepared directly during the growth.
Figure 11:
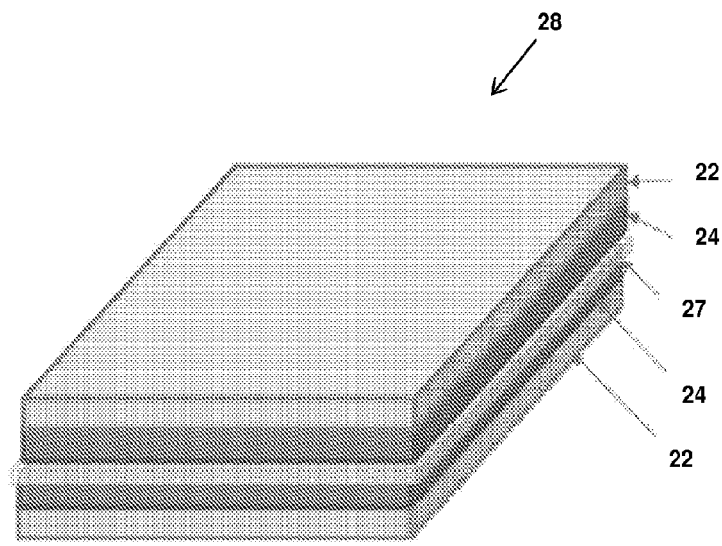

Two-electrode electric double-layer capacitors (EDLC) were fabricated with the as-grown hybrid materials. To prepare the materials used in EDLC devices, a nickel foil (thickness: 25 μm, purity: 99.99%) was used as the growth substrate. A graphene film was grown on the nickel foil and then CNT carpet was grown on the graphene film using the method described herein. The CNT carpet growth time was 60 min to ensure good coverage. The EDLC device scheme is shown in FIG. 11. The nickel foil was directly used as the current collector and graphene CNT carpet hybrid material was used as the electrode. There was no further treatment of the electrode materials and no binder materials were necessary. Conventional filter paper (Whatman generalpurpose filter paper grade 595) was used as the separator. The electrolyte solution was a 1:1 (volume:ratio) mixture of 1 M lithium hexafluorophosphate (LiPF$_6$, Sigma-Aldrich) in acetonitrile and 1-butyl-3-methylimidazolium tetrafluoroborate (BMIMBF$_4$, Sigma-Aldrich). The weight of the electrode materials was usually 0.3~1 mg depending on the size of the samples.

The cyclic voltammetry of the EDLC was measured using a CHI electrochemical workstation (CHI 608D). The CV diagrams for difference scan rates and voltage ranges are shown in FIG. 12 (the voltage range of 4 V is shown in FIG. 3C). The typical capacitor behaviors are observed for the all tested scan rates and voltage ranges. The galvanostatic charge-discharge experimental results are shown in FIG. 13, which indicate a linear behavior for both charging and discharging curves. The specific capacitance C (per mass) of the EDLC was calculated from the discharge curve based on Eq 1:

$$C = \frac{4I}{m\frac{dV}{dt}} \quad \text{Eq 1}$$

In Eq 1, I is the current and m is the total mass for both electrodes (carbon materials), and dV/dt is the slope from the discharge curve. The energy density E (per mass) was calculated using Eq 2:

$$E = \frac{CV^2}{s} \quad \text{Eq 2}$$

In Eq 2, V is the maximum voltage. The power density P (per mass) of the EDLC is calculated using Eq 3:

$$P = \frac{E}{t} \quad \text{Eq 3}$$

In Eq 3, t is the discharge time. At a current density of 1.8 A/g, the specific capacitance and energy density of the device are 108.2 F/g and 60.1 Wh/kg, respectively. At a high current density of 18.2 A/g, the power density of the device reaches 18 kW/kg with an energy density of 32.3 Wh/kg. Using simple fabrication procedures, the performance of the EDLC is close to the best reported carbon-based EDLCs, which are optimized by using multi-step activation processes. The direct seamless assembly of electrode material and current collector in a flexible sheet form renders this a promising technique for fabricating larger devices. The stability of the device was tested with the results shown in FIG. 14. The device was charge-discharged 5,000 times to 2.7 V (typical commercial EDLC operation range) and showed no energy density retention. The device was then charge/discharged 500 times to 4 V (the maximum operation voltage for the EDLC in this work), and the energy density decreased only 2.5%.

The specific capacitance $C_A$ (per area) of the EDLC was calculated from the discharge curve based on Eq 4:

$$C_A = \frac{I}{A\frac{dV}{dt}} \quad \text{Eq 4}$$

In Eq 4, I is the current and A the area of the electrode, and dV/dt is the slope from the discharge curve. The energy density Ev (per volume) was calculated using Eq 5:

$$E_V = \frac{\frac{C_A}{T}V^2}{2} \quad \text{Eq 5}$$

In Eq 5, V is the maximum voltage and T is the thickness of the device. The power density Pv (per volume) of the EDLC is calculated using Eq 6:

$$P_V = \frac{E_A}{t} \quad \text{Eq 6}$$

In Eq 6, t is the discharge time. For the same device measured above, the electrode surface is 0.16 cm², The height of the device (including the nickel electrodes, 2×25 µm; filter paper, ~100 µm and active materials ~50 µm after pressed in the devices) is about 200 µm. The volume of the entire device is then 0.0032 cm³. At a current density of 1.8 A/g, the per area specific capacitance and per volume energy density of the device are 37.2 mF/cm² and 4.14 mWh/cc, respectively. The per volume energy density is 3 times higher than other state-of-the-are thin film graphene. At a high current density of 18.2 A/g, the per volume power density of the device reaches 1.25 W/cc with an energy density of 2.2 mWh/cc.

Figure 15:
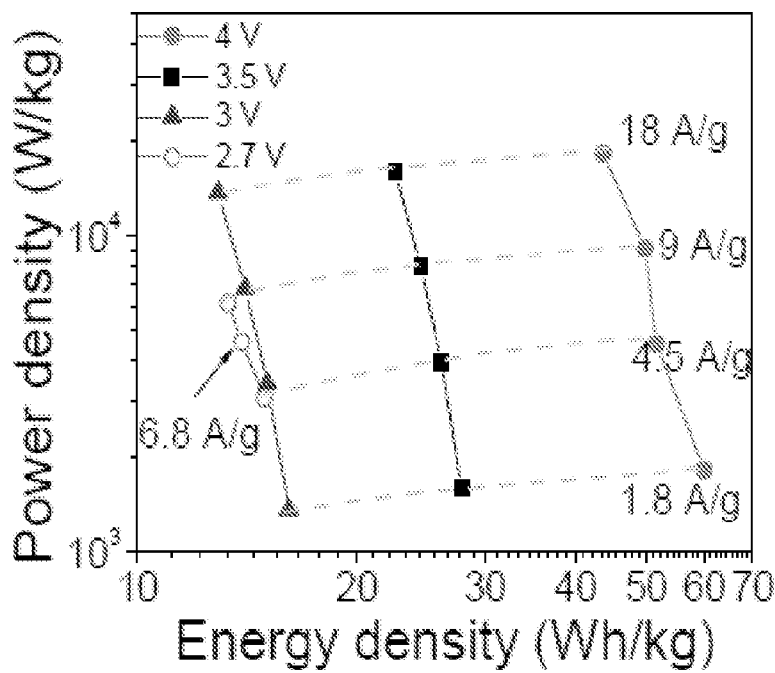
FIG. 15 shows Ragone plots under different operation voltage windows.
Figure 15:
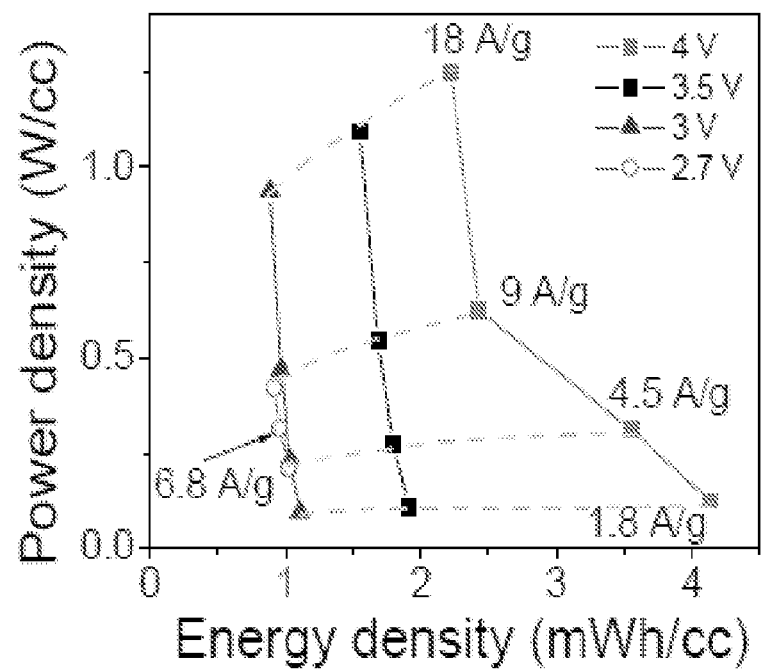

In order to compare with other works, the energy densities and power densities of the supercapacitors operated under different voltage windows were measured. Those data are presented in the Ragone plot in FIG. 15. The active surface area is usually smaller than the SSA from the BET method since the electrolyte molecules are larger than nitrogen molecules. The active surface area is estimated in this work using the following method. The intrinsic capacitance of graphene (sp² carbon) was recently determined to be 21 µF/cm. Given the theoretical SSA of 2630 m²/g, the upper limit of sp² carbon electrode capacitance is 550 F/g. The specific capacitance in this work is 108.2 F/g. Based on this value, the active surface area is about 517 m²/g.

Example 1.11

TEM/STEM Sample Preparation

The direct observation of the connection of a CNT to graphene using STEM is difficult because the CNT carpet is too thick. Fortunately, the CNT forest forms tight bundles due to the capillary effect when it is treated with solvents. Applicants also observed this for the CNT carpet grown on graphene after the sample was treated with ethanol. FIG. 16 is the ethanol-treated graphene/CNT carpet sample that was picked up on a Si/SiO₂ wafer after etching the copper catalyst away using a copper etchant (made with CuSO₄.5H₂O (15.6 g), conc. HCl (50 mL), and H₂SO₄ (2 mL)). The CNTs on the outer shell of the bundles are pulled to the center of the bundle, and the roots of those CNTs were forced to lay on the substrate due to the strong connection between the graphene and CNT. Since the top of the CNTs are bundled, the roots are exposed and can be observed directly using STEM.

To prepare the sample on a TEM grid, the hybrid material was grown on copper foil. Then a small sample (~2 mm×2 mm) was placed on a QUANTIFOIL substrate having an orthogonal array of 1.2 µm diameter holes with ~1.3 µm separation, all mounted on a 200-mesh gold grid. A drop of ethanol was used to gently wet the sample and then the sample was dried in air to induce the bundling effect. The entire TEM grid was then floated on a copper etchant to remove the substrate. The sample was finally cleaned by floating the grid on a fresh water bath several times and was annealed in an argon/hydrogen (4:1) vacuum (5-10 Torr) at 300° C. for 1 h.

Example 1.12

STEM Image Simulation

STEM images are obtained using a HREM Simulation Suite (HREM Research Inc.). The multislice simulations are carried out using the software with the Weickenmeier-Kohl scattering factor. The parameters used are same as for the experimental images. Convergence angle is set to 24 mrad. The inner and outer collection angles for the dark field images are set to 33 and 125 mrad. For the bright field images, the collection angle is set to 7.5 mrad. The accelerate voltage is set to 80 kV and the spherical aberration is set to 1 µm. A defocus value of 1.5 nm is used. The structures of the graphene/CNT junction are based on a model proposed in theoretical studies. The structures are built in Materials Studio (Accelrys Inc.). Energy minimization is applied to optimize the structures. The default force field (Compass) in Discover model is used for calculation. The nanotubes are also bent vertically 30~60° relative to the graphene plane and then the structures are energy-minimized to simulate the states of bended nanotube on graphene, which are close to the real states of the STEM samples. The optimized structures of CNT/Graphene junction are listed in FIG. 17.

Figure 17:
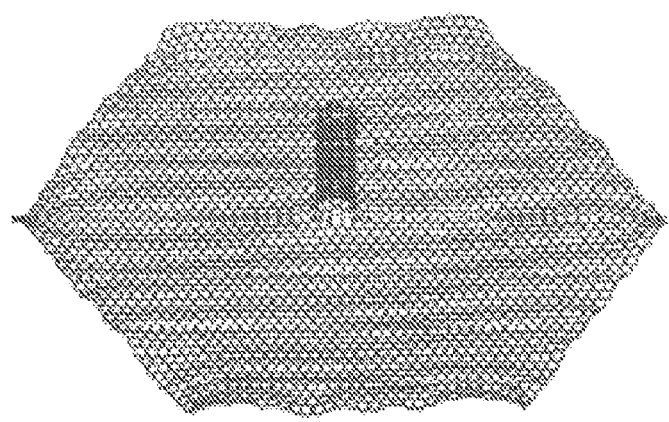
FIG. 17 shows energy-minimized graphene CNT junction structures.
Figure 17:
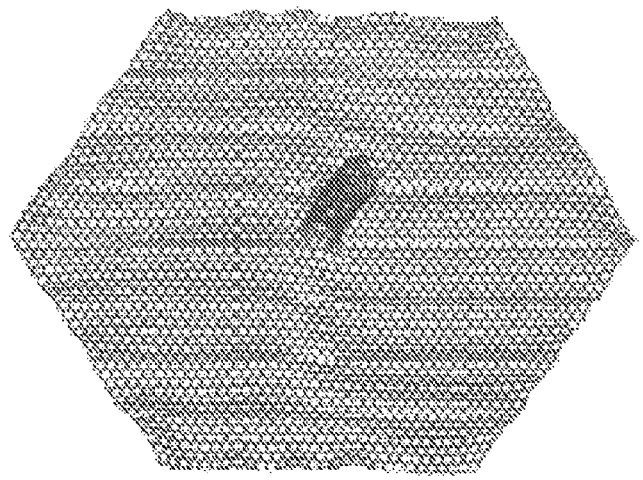
Figure 17:
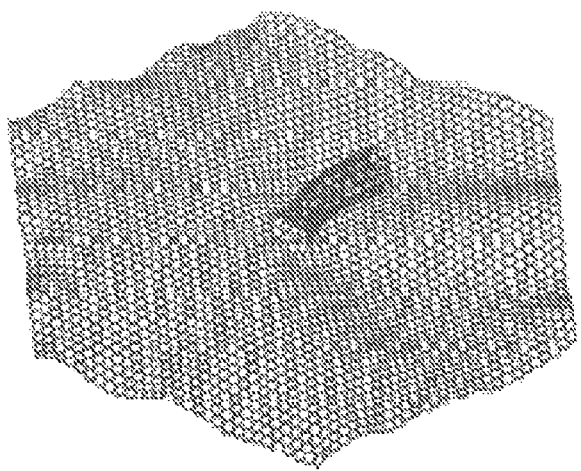

The STEM images of CNT covalently bonded to graphene plane (FIG. 18) and CNT lying on the graphene plane (FIG. 18B) are shown. The covalently bonded structure show a characteristic ring-like structure on the root, which is not observed for either close-end or open-end CNT lying on the graphene plane. Experimental STEM images showing a CNT covalently bonded to the graphene (FIGS. 18C and 4E-H) and a close-end single walled CNT lying on the graphene plane (FIG. 18D) are compared. The results agree well with the simulated STEM images. The simulated STEM images based on the structures in FIG. 17 are shown in FIG. 19. The structures in FIGS. 19A-C are sub-structures of FIGS. 17A-C, respectively. The simulated STEM images are similar to the images recorded in the STEM experiments. The locations of 7-member ring are comparable to the experimental data (FIG. 4S).

Example 2

Synthesis of 3D Metal-Graphene-Nanotube Multifunctional Hybrid Materials

In this Example, graphene was grown directly on porous nickel films. This was followed by the growth of controlled lengths of vertical carbon nanotube (CNT) forests that seamlessly emanate from the graphene surface. The metal-graphene-CNT structure was then used to directly fabricate field-emitter devices and double-layer capacitors without the need for any post-transfer processes. In particular, Applicants report in this Example the direct growth of graphene on porous nickel films followed by the growth of controlled lengths of vertical CNT forests that seamlessly emanate from the graphene surface to form 3D hybrid structures.

Example 2.1

Growth and Characterization of CNT-Graphene Hybrids

Figure 25:
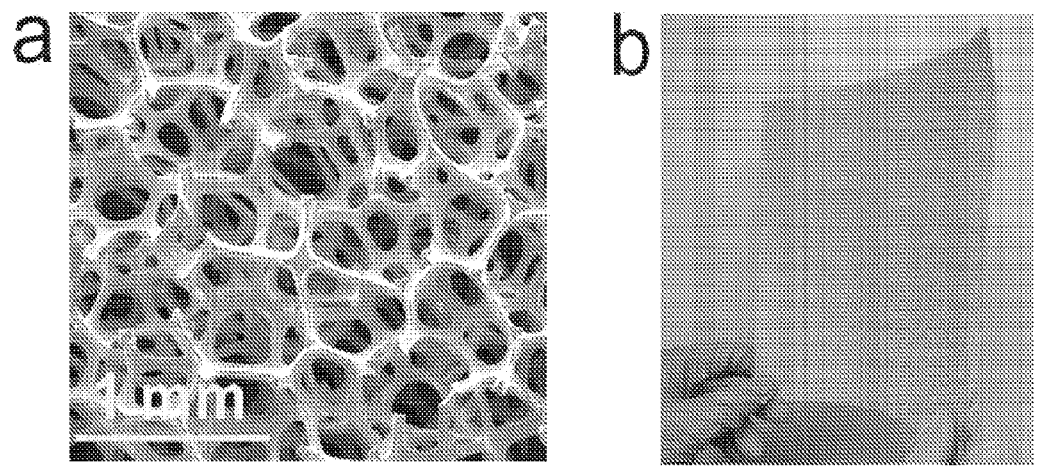
FIG. 25 shows images of the porous nickel films.
Figure 26:
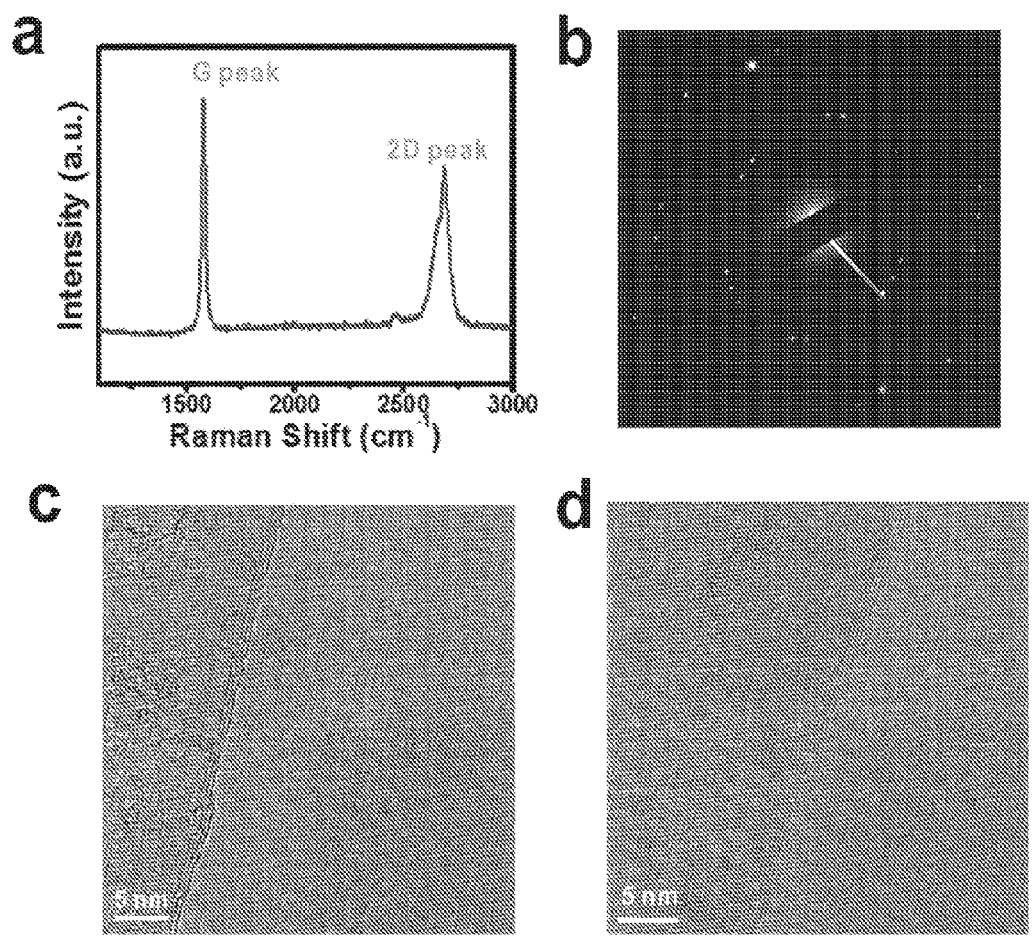
FIG. 26 provides Raman and TEM characterizations of graphene grown on porous nickel.

FIG. 21 shows the procedures for the growth of CNT-graphene hybrids on porous nickel substrates. The porous nickel substrate used in this research is a foam-like 1.2-mm-thick nickel film, a widely used commercial battery material (FIG. 25). Although the entire procedure can be done using a single layer of graphene, in the optimal procedure here for devices, few-layer graphene was grown on the porous nickel films using a chemical vapor deposition (CVD) method. The obtained graphene were characterized by Raman spectroscopy and transmission electron microscopy (TEM, FIG. 26), demonstrating the few-layered structure and the high crystallinity of the graphene. A 1.5 nm-thick layer of catalytic Fe was deposited on the surface of the graphene using e-beam evaporation, followed by the deposition of a 10 nm-thick $Al_2O_3$ as the buffer layer to ensure the catalytic activity of the Fe. Ethylene was used as the carbon source to grow CNTs at 750° C. Water was also introduced during the CNT-growth process to remove amorphous carbon.

Using this protocol, the CNT forests raise the Fe/$Al_2O_3$ catalyst layer during the growth process while the vertically grown CNTs connect to the graphene layer through covalent bonds, leading to seamless high-quality CNT-graphene-metal interfaces. The Fe/$Al_2O_3$ catalyst layer was deposited on both sides of the porous nickel films to increase the amount of CNTs attached to the substrates.

Figure 22:
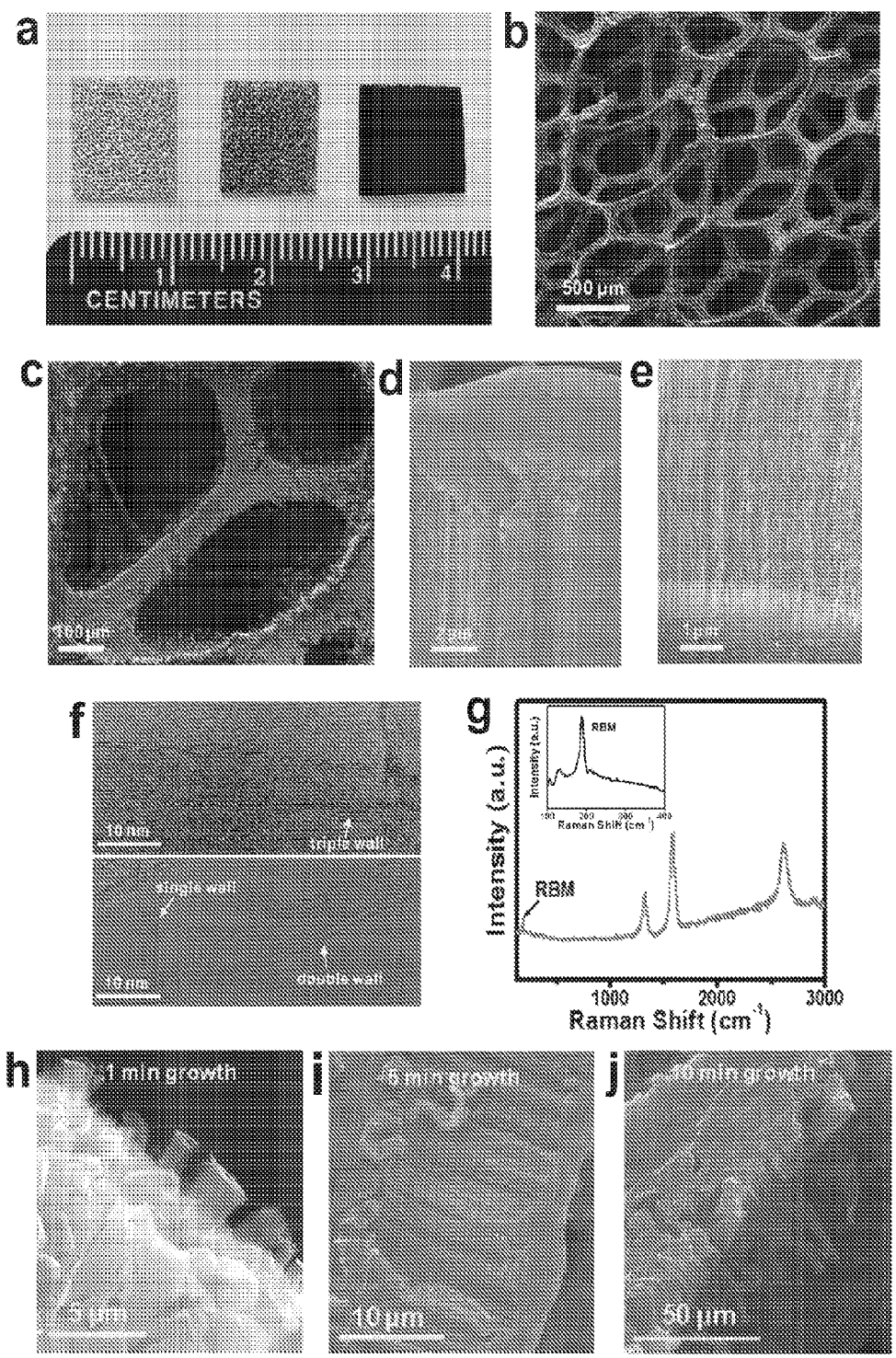
FIG. 22 provides data relating to the characterization of CNT-graphene hybrids synthesized on porous nickel films.

FIG. 22A shows optical images of porous nickel, graphene-porous nickel and CNT-graphene-porous nickel, respectively. Scanning electron microscopy (SEM) images of CNTs grown on graphene-porous nickel are shown in FIGS. 22B-E. FIGS. 22B-C are the overviews of the as-grown three-dimensional material, demonstrating an interconnected network structure. The surface region of FIG. 22D is the Fe/$Al_2O_3$ catalyst layer that was lifted off during the growth of CNTs. FIG. 22E shows the CNT-graphene interface, which is also an enlarged view of the CNT forests. The high-resolution transmission electron microscopy (HR-TEM) image in FIG. 22F indicates that most of the as-grown CNTs are single-walled, double-walled or triple-walled, and the diameters are between 3 nm and 7 nm.

The high degree of crystallinity of the CNTs was verified by Raman spectroscopy in FIG. 22G, showing a strong G peak at ~1580 $cm^{-1}$ and a 2D peak at ~2620 $cm^{-1}$. The G/D ratio of the CNTs is ~3:1, suggesting the presence of few defects. The defects in CNTs are mainly $sp^3$ carbon atoms, which were introduced during the growth process and can be evaluated by D peak. The G peak arises from $sp^2$ carbon atoms in CNTs. Thus, comparing the ratio of intensities between the graphitic G peak and the defect-induced D peak is an efficient way to evaluate the quality of carbon nanotubes. The strong radial breathing mode (RBM) signals in the inset of FIG. 22G suggest that the diameters of the CNTs are small, corresponding to the HRTEM observation. The 3D hybrid material is hydrophobic. The measured water contact angle was ~135°.

Figure 27:
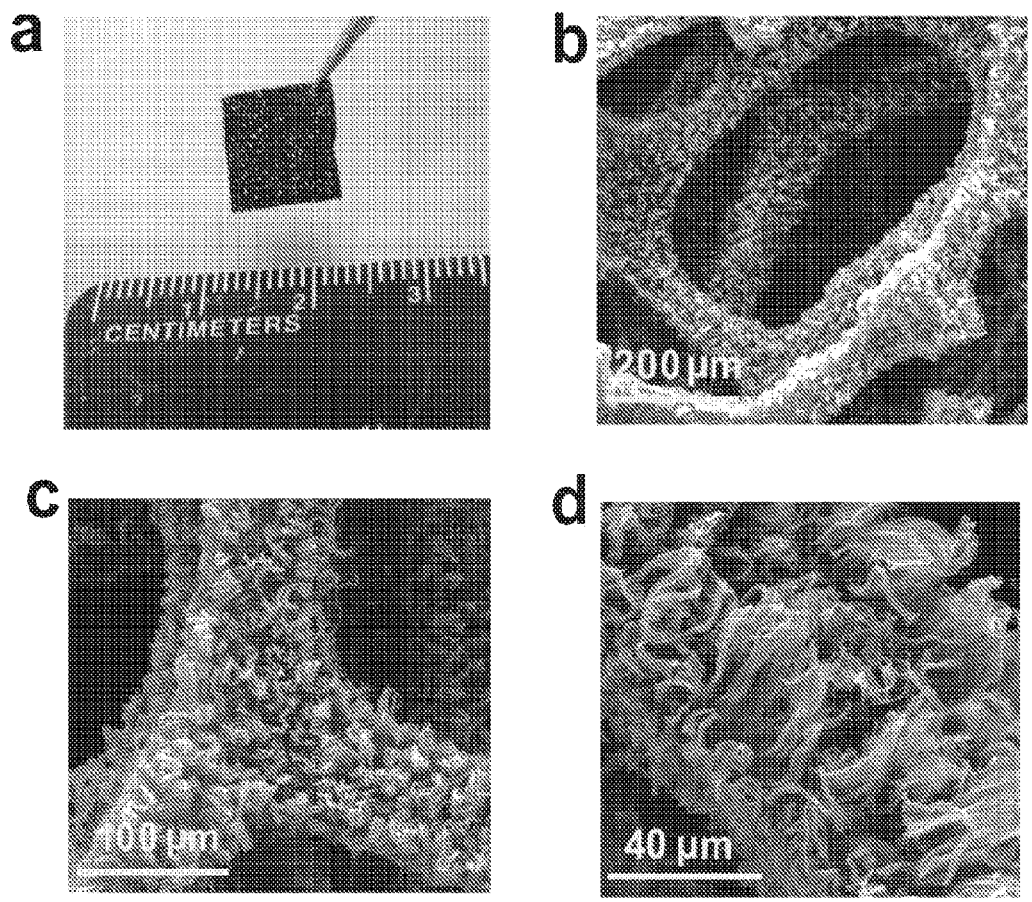
FIG. 27 shows images of CNT-graphene hybrids after etching porous nickel films.

After etching and removal of the porous nickel films using a mixture of HCl and $FeCl_3$, free-standing 3D CNT-graphene networks were obtained (FIG. 27). The thickness of the sample decreased to ~0.8 mm from ~1.2 mm after the etching step. The CNTs bundled together due to the solvent-induced bundling effect (FIGS. 27B-D). Throughout the etching process, CNTs were not washed away. This further confirmed that the CNTs were chemically attached to graphene.

Figure 28:
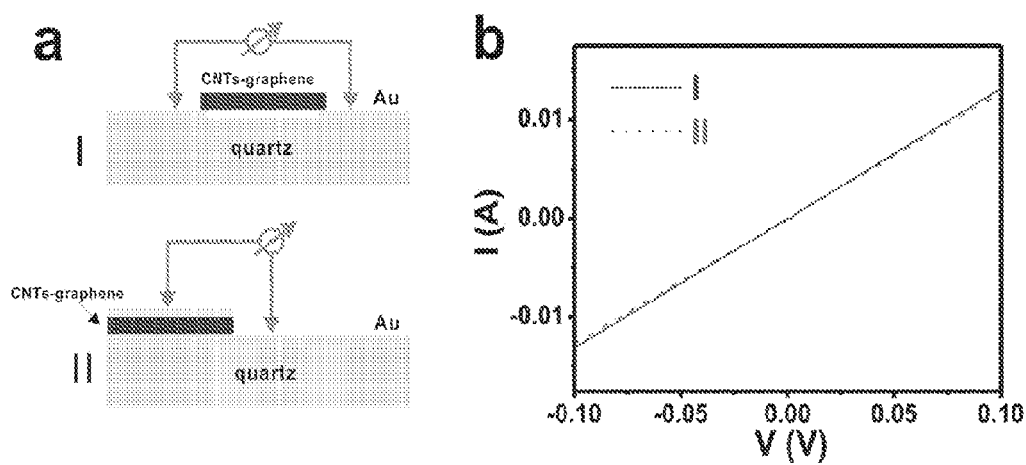
FIG. 28 shows electronic properties of CNT-graphene hybrids after etching porous nickel.

Ohmic contact at the junction between the CNTs and graphene was observed, suggesting the high-quality CNT-graphene interface. In contrast, in most of recently reported CNT-graphene hybrids, CNTs and graphene were physically combined together with poor junctions that in turn limit their potential applications in electronics. FIG. 28 shows that CNT-graphene hybrids exhibit isotropic electrical properties. This identical electrical response from CNTs or graphene to the metal electrode indicates an ohmic contact has indeed been established.

Figure 29:
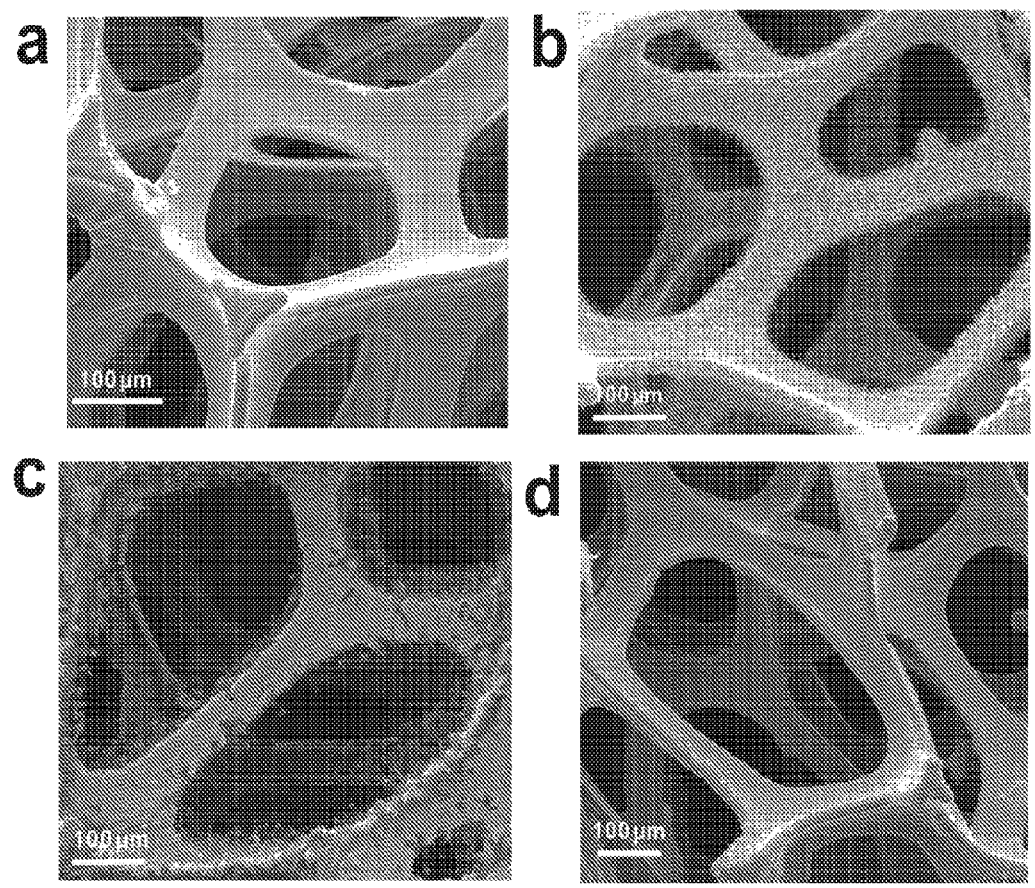
FIG. 29 shows the effects of the thickness of catalysts and graphene on the CNT growth.

In addition, the effects of the catalyst thickness and graphene on CNT growth were studied. For a convenient comparison, similar growth conditions were used to prepare the four samples shown in FIGS. 29A-D. FIGS. 29A-C are the SEM images of the samples grown on graphene-porous nickel films, separately using 0.5 nm Fe/3 nm $Al_2O_3$, 1 nm Fe/3 nm $Al_2O_3$ and 1.5 nm Fe/10 nm $Al_2O_3$ as the catalysts. Few CNTs were observed when the 0.5-nm-thick Fe layer was used as the catalyst (FIG. 29A). This is due to the rapid deactivation of the catalyst layer. The problem was solved by increasing the thickness of the Fe layer from 0.5 nm to 1 nm (FIG. 29B). However, when using 1 nm-thick Fe as the catalyst, CNTs became bent during the growth process due to the instability of the $Al_2O_3$ catalyst layer. For well-aligned growth of CNTs on graphene-porous nickel, the optimized catalyst thickness was 1.5-nm-thick Fe with 10-nm-thick $Al_2O_3$ (FIG. 29C). FIG. 29D shows that it was difficult to grow the CNTs directly on the porous nickel without the graphene layer. Without graphene as the buffer layer on the nickel, the thin catalyst layer would likely deactivate due to alloying with nickel.

Example 2.2

Control of CNT Length by Growth Time Adjustment

Figure 30:
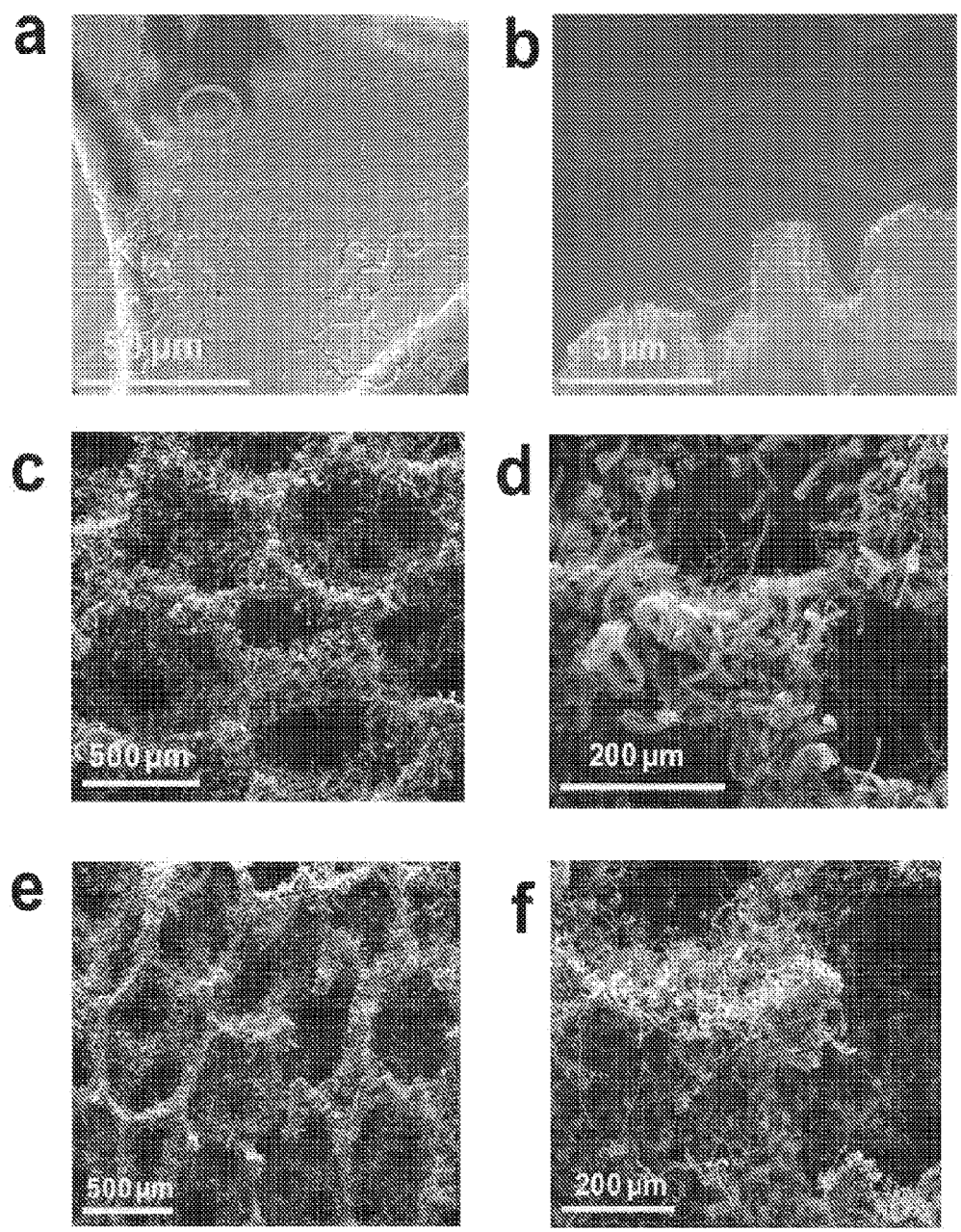
FIG. 30 shows images of obtained CNTs at different growth times.

For some applications, the properties of the devices are closely related to the length of the CNTs. In this Example, the CNT length can be controllably adjusted from 3 μm to 250 μm by changing the growth time (FIGS. 22H-J and FIG. 30). FIGS. 22H-J show the SEM images of the obtained samples after separately growing for 1 min, 5 min or 10 min using 1.5 nm Fe/10 nm $Al_2O_3$ as the catalysts. FIGS. 22H and 30A-B show that the CNTs rapidly grow to ~3 μm in 1 min. After 5 min and 10 min growth, the lengths of the CNTs were ~15 μm and ~35 μm, respectively (FIGS. 22I-J). If the growth time was further extended to 30 min, ~120 μm-length CNTs were obtained (FIGS. 30C-D). However, during a 30 min growth, the catalyst layer broke and CNTs were bent due to losing support from the $Al_2O_3$ layer. After 60 min growth, the catalyst was still active and the length of obtained CNTs was ~250 μm (FIG. 30E). If the growth time was extended to 120 min, no obvious change in CNTs length was observed and much amorphous carbon was produced (FIG. 30F). Apparently after 60 min of growth, the catalyst layer lost activity and the carbon sources were mainly transformed into amorphous carbon.

Example 2.3

Electrical Applications of CNT-Graphene Hybrids

CNTs are known for their applications in field-emission devices. In this Example, Applicants used the CNT-graphene-porous nickel to fabricate field-emission devices without needing any etching or post-transfer processing. As shown in FIG. 23A, porous nickel serves as the cathode, graphene serves as the linking surface, CNTs are the field-emission emitters and indium tin oxide (ITO)-coated glass is used as the anode. FIG. 23B shows the test setup. The inset in FIG. 23B is an optical image of a field-emission device. FIG. 23C presents the emission current density as a function of applied voltage in three different devices, S1 (CNT, 60 min), S2 (CNT, 5 min) and S3 (CNT, 2 min), which are, respectively, made using CNTs obtained after 60 min, 5 min and 2 min of growth. The related lengths of CNTs are ~250 μm, ~15 μm and ~7 μm. From FIG. 23C, both the emission current density and the turn-on field are strongly affected by CNT lengths. The device fabricated using 60 min of CNT growth had the best field emission properties, the lowest turn-on field and the highest emission current. The turn-on field for S1 (CNT, 60 min), measured at a current density of 0.01 mA/cm$^2$, is 0.26 V/μm, one of the lowest values reported. For the same device, the current density at a field of 0.87 V/μm is 12.67 mA/cm$^2$, one of the highest reported values, to date. Fowler-Nordheim plots are shown in FIG. 23D. At least two distinct slopes are observed in the plots, often seen in carbon nanotubes and attributed to a non-metal-like emission process from discrete energy states. The corresponding field-enhancement factors (β) were estimated for high operation conditions from Fowler-Nordheim plots (FIG. 23D), ranging from 2700 to 7200.

Figure 31:
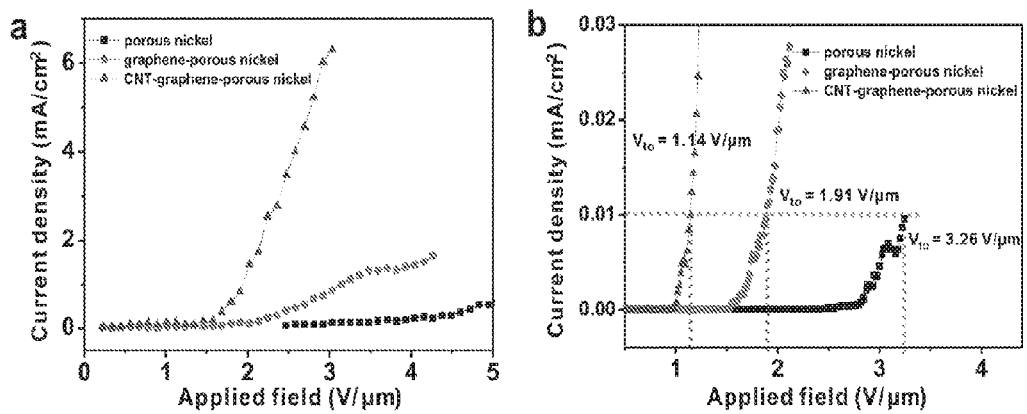
FIG. 31 shows field-emission characteristics of the CNT-graphene-porous nickel, graphene-porous nickel and porous nickel electrodes.

The emission properties are also related to the number of CNTs attached to the porous nickel through the graphene. When CNTs were grown on only one side of the porous nickel instead of both sides, the as-made device demonstrated poorer field-emission properties (sample CNT-graphene-porous nickel, blue curves in FIG. 31) as compared to those of the device made by growing CNTs on both sides of the porous nickel (sample S2, CNT, 5 min, red curves in FIG. 23C). The growth conditions for these two samples were the same. Surprisingly, pristine porous nickel also showed some field-emission responses (black curves in FIG. 31). Nickel nanowires are known for their field-emission properties. Hence, porous nickel surface protrusions may be the source of the field emission. After coating the porous nickel with graphene, better field-emission properties were observed (red curves in FIG. 31). However, the contributions of the porous nickel and the graphene to the field-emission response of CNT-graphene-porous nickel samples are almost negligible in the applied field regime of the field-emission test here. Hence, the CNT-graphene-metal hybrid is indeed unique in its functionality.

Figure 24:
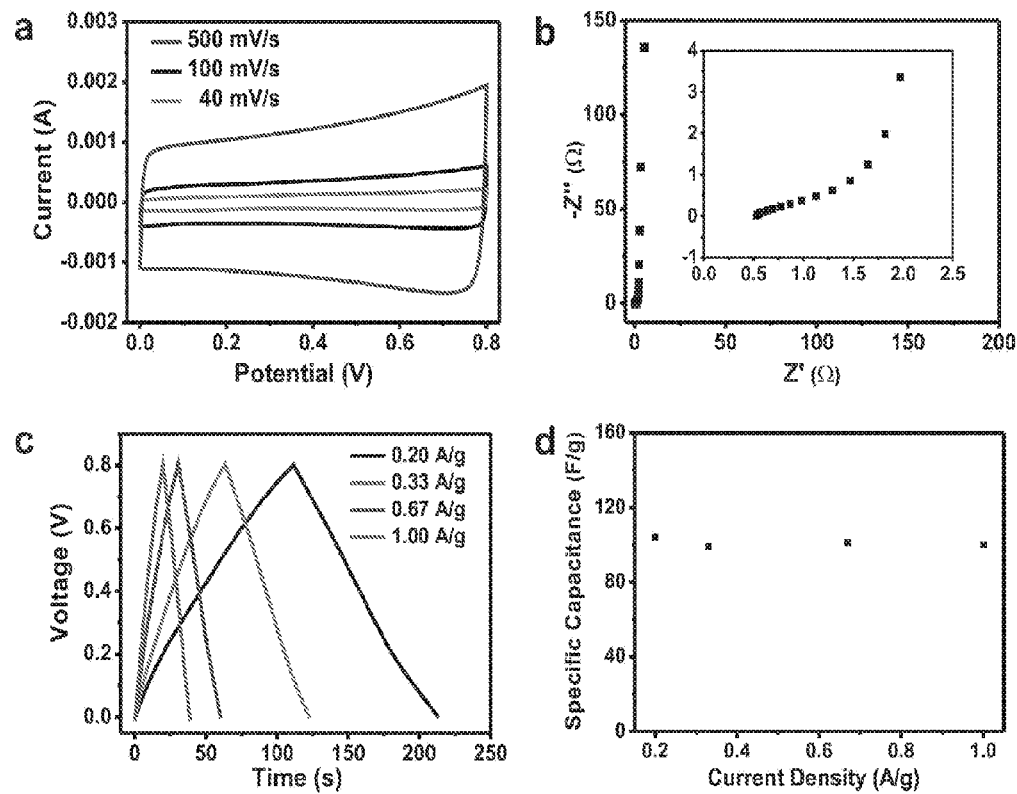
FIG. 24 provides double-layer capacitor performances of the devices fabricated using CNT-graphene-porous nickel.

To demonstrate the high-quality of the CNT-graphene-porous nickel contact interface, the capacitive properties were measured (FIG. 24). Porous nickel was used as the current collector to fabricate an electrochemical double-layer capacitor (EDLC) without the need of any post-transfer or post-etching processes. Aqueous KOH (6 M) was used as the electrolyte in the measurements. FIG. 24 demonstrates that the EDLC made by this CNT-graphene-porous nickel structure exhibited optimal double-layer electrochemical performance and high-rate performance. FIG. 24A shows the cyclic voltammograms (CVs) of EDLC at different scan rates. With an increase in scan rate, the current response increased accordingly, without any significant changes in the shape of the CV curve, indicating a good rate performance. The rectangular and symmetric shape of the CVs was also observed at high scan rates of 500 mV/s, supporting the suggestion of low contact resistance for the CNT-graphene-porous nickel interface.

FIG. 24B is the Nyquist plot based on a frequency response analysis of the frequency range from 1 MHz to 10 mHz. The Nyquist plot is almost a vertical line, indicating a nearly ideal capacitive behavior of the EDLC. The inset in FIG. 24B is the magnified data in the high-frequency range and the obvious transition between the RC semicircle and the migration of electrolyte corresponds to a resistance of 1.25Ω. FIG. 24C shows the galvanostatic charge-discharge curves at four different current densities. The specific capacitance was calculated from the discharge curves with values of 104, 99, 101, and 100 F/g obtained at current densities of 0.2, 0.33, 0.67 and 1.00 A/g, respectively (FIG. 24D). The calculated value is about five times higher than that of the EDLC fabricated by directly growing CNTs on Inconel without graphene as the linking surface and is also comparable with the best recently reported values of the EDLC made with graphene oxide.

In sum, Applicants have shown in this Example the controlled growth of 3D CNT-graphene seamless hybrids on porous nickel substrates. This metal-graphene-nanotube structure overcomes several obstacles that previously hindered the further applications of CNTs, including inadequate CNT-metal-electrode contact, low surface-area-utilization-efficacy of bulk metals, and post-transfer difficulties. High performance field-emission and double-layer capacitor properties were observed for these new 3D-structures.

Example 2.4

Synthesis of 3D CNT-Graphene Hybrids on Porous Nickel

The porous nickel was received from Heze Tianyu Technology Development Company. The thickness was 1.2 mm and the area density was 320 g/m$^2$. Graphene was grown using the recently reported chemical vapor deposition method (*Nature Mater.* 2011, 10, 424-428). The catalyst (1.5 nm Fe) and buffer layer (10 nm Al$_2$O$_3$) were deposited in series on the graphene-covered porous nickel by e-beam evaporation. The growth of the CNTs was done at atmospheric pressure. The flow rates of ethylene, hydrogen and argon were 100 sccm, 400 sccm and 500 sccm, respectively. Hydrogen was used as the carrier gas to introduce water vapor into the system at a hydrogen flow rate of 10 sccm. The assembled sample was annealed in the furnace under the same environment at 750° C. for 3 min before the carbon source was introduced. The growth time depended on the CNT forest height that was sought. Typically, a 10 min growth produced a CNT forest with a height of ~35 µm.

Example 2.5

Field-Emission Characterizations

Field emission response of the samples was characterized in a custom developed system, at a vacuum level of 10$^{-7}$ Torr. Test set-up for all the samples consisted of a parallel plate diode configuration, where CNT-graphene-porous nickel samples were made as the cathode and a flattened pure Cu sheet (99.99% purity and 0.6 mm thick) was used as the anode. The Cu sheet used as the anode was rectangular and twice the size of the cathode to ensure that all emitted electrons are collected by the anode. The distance between the anode and the top surface of the CNT-graphene-porous nickel substrate is 650 µm. Direct current (DC) voltage and current measurements involved a Keithley 248 high voltage supply and 2010 digital multimeter, respectively. Field emission tests in pulsed mode were conducted using an Agilent function generator (model 33220A) to generate an electrical field, attached a Trek high voltage amplifier (model 20/20C) and the current was measured through a PEARSON current monitor (model 4100, having 1.0 V/A), coupled with an Agilent oscilloscope (model MSO6034A). A sine-wave function was applied through the function generator and the frequency of the pulsed signal was kept constant at 1 kHz for all the tests. While capturing emission images from the devices, a green phosphor coated ITO glass replaced the flattened Cu sheet as the anode.

Example 2.6

Double-Layer Capacitor Characterizations

The capacitance measurements were studied in a two-electrode system using 6 M KOH solution as the electrolyte. The as-grown CNT-graphene-porous nickel structure (1×1 cm) was directly tested as the electrode. Galvanostatic charge-discharge measurements were done using Arbin instruments BT2043. The cyclic voltammetry and electrochemical impedance spectroscopy were done using an Autolab workstation (PGSTAT302N). The equation, $C=2 (I/m) \times (dt/dV)$, was used to calculate the specific capacitance from the slope of the charge-discharge curves (dV/dt), where I is the applied current and m is the mass of each electrode.

Example 2.7

Other Characterizations

The Raman spectra were recorded with a Renishaw Raman RE01 scope using a 633 nm excitation argon laser. SEM images were taken using a FEI Quanta 400 field emission gun scanning electron microscope. TEM images were taken using a 200 KV JEOL FE2100 transmission electron microscope.

Example 3

3-Dimensional Graphene Carbon Nanotube Carpet-Based Microsupercapacitors with High Electrochemical Performance In this Example, 3-dimensional (3D) graphene carbon nanotube carpets (G/CNTCs)-based microsupercapacitors (G/CNTCs-MCs) were fabricated in situ on nickel electrodes. The G/CNTCs-MCs show impedance phase angle of −81.5° at a frequency of 120 Hz, comparable to commercial aluminum electrolytic capacitors (AECs) for alternating current (AC) line filtering applications. In addition, G/CNTCs-MCs deliver a high volumetric energy density of 2.42 mWh/cm$^3$ in ionic liquid, more than two orders of magnitude higher than that of AECs. The ultrahigh rate capability of 400 V/s enables the microdevices to demonstrate a maximum power density of 115 W/cm$^3$ in aqueous electrolyte. The high performance electrochemical properties of G/CNTCs-MCs can provide more compact AC filtering units and discrete power sources in future electronic devices. Without being bound by theory, it is envisioned that these elevated electrical features are likely enabled by the seamless nanotube/graphene junctions at the interface of the differing carbon allotropic forms.

Increasing demand for portable electronics and miniaturized wireless sensor networks has spawned great interest among materials scientists in their quest for compatible energy storage devices. The microsupercapacitor has gained special attention due to the possibility of integration as discrete power sources for micro-electromechanical system (MEMS). Recently, great advancements in improving the power/energy density or rate capability of microsupercapacitors have been achieved through exploring a variety of materials such as carbide-derived carbon (CDC), onion-like carbon (OLC), laser reduced/scribed graphene, activated carbon (AC), and metal oxide/carbon composites. However, the investigation of materials for supercapacitors with capabilities compatible with 120 Hz AC-line filtering performance is still in its infancy.

120 Hz AC line filtering is the function that smoothes the leftover AC ripple on direct current (DC) voltage busses in power-line supply electronics. Filtering efficacy is usually characterized by the impedance phase angle when the input frequency is 120 Hz. Currently, AECs are widely used for this purpose, though AECs suffer from low energy density. Supercapacitors, also called electrical double-layer capacitors (DLC), can deliver much higher energy densities. However, due to slow, lossy internal response of the polarization, the phase angle for commercial supercapacitors at 120 Hz is close to 0°, not applicable in AC line filtering.

There is great interest in achieving high energy density while maintaining satisfactory AC response in a single device. In attempts to improve the AC frequency response, vertically aligned carbon nanotubes (VA-CNTs) have been explored as electrode materials for supercapacitors. Prior efforts did not yield the desired AC response because of a high interfacial resistance between VA-CNTs and the current collector, either caused by an insulating buffer layer or the transfer procedure used to place the tubes. Therefore, the in situ synthesis of CNTs directly on a highly conductive medium with good electrical connection is desired to produce supercapacitors with AC-line filtering performances. Recent advancement in the synthesis of CNTCs grown seamlessly from graphene to form the 3D hybrid material provides a possible route.

Here, Applicants show that graphene carbon nanotube carpets (G/CNTCs) can provide the desired electrochemical characteristics. In particular, Applicants report in this Example the fabrication of microsupercapacitors based on 3D G/CNTCs with seamlessly patterned CNTCs grown from the graphene. The 3D G/CNTCs hybrid materials are directly and intimately connected to nickel current collectors, providing good interfacial electrical conduction. The as-fabricated microdevices show an impedance phase angle as large as −81.5° at a frequency of 120 Hz, comparable to that seen in AECs. At the same time, the new devices offer specific capacitances up to 2.16 mF/cm$^2$ in aqueous electrolyte and 3.93 mF/cm$^2$ in ionic liquid, comparable with some of the best reported results in all supercapacitors. The measured discharge rate, up to 400 V/s, is hundreds of times higher than that shown in most supercapacitors, enabling the devices to deliver a theoretical maximum power density of 115 W/cm$^3$ even in aqueous electrolyte. A high energy density of 2.42 mWh/cm$^3$ was achieved in ionic liquid. All of these high electrochemical performance characteristics will enable G/CNTCs-MCs to act as more compact ac filtering units and discrete power sources in future electronics.

Figure 32:
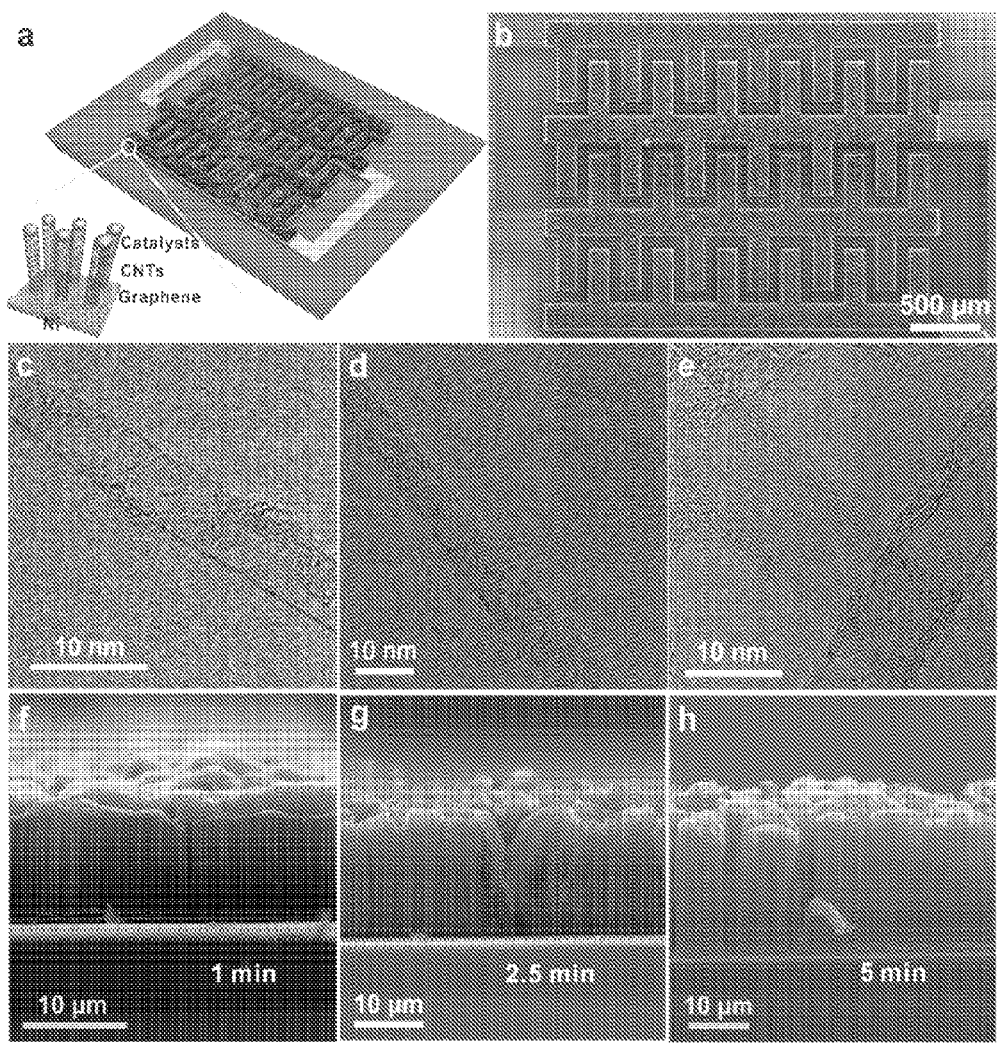
FIG. 32 shows the design of microsupercapacitors and material characterizations of CNT carpets (CNTCs).
Figure 36:
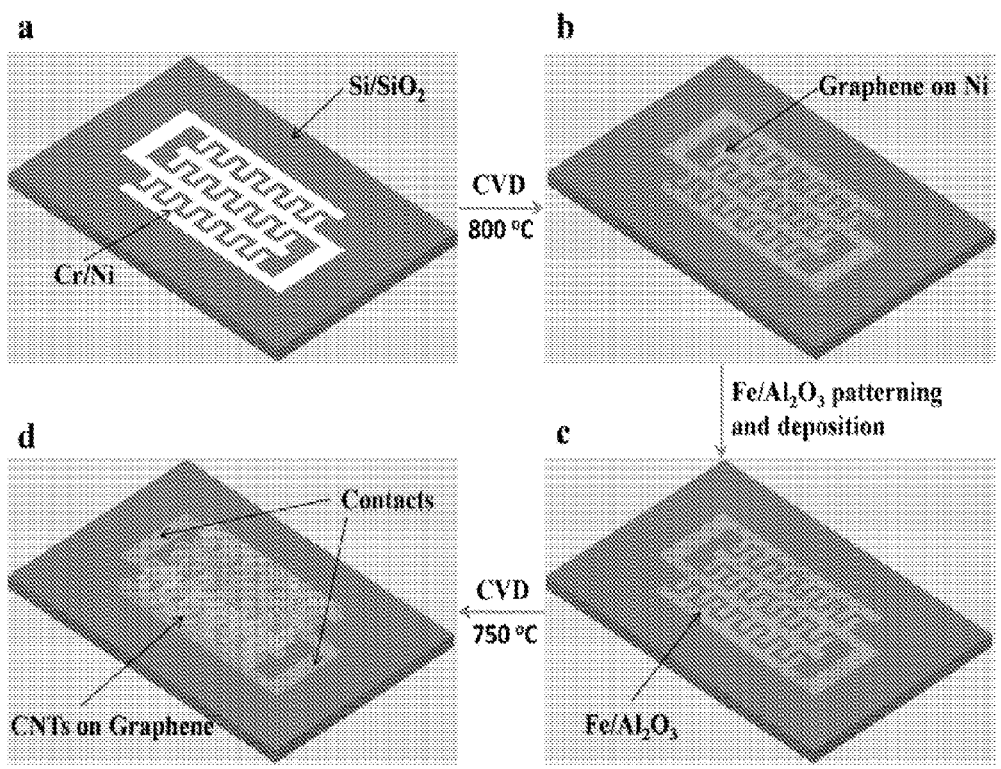
FIG. 36 provides a scheme of the fabrication procedure of microsupercapacitors. Standard photolithography and e-beam evaporation were employed to fabricate the microsupercapacitors.

The structure of the 3D G/CNTCs-MCs is schematically illustrated in FIG. 32A. The inset is the magnified structure, showing CNTCs-graphene-Ni pillars with catalysts (iron/alumina) on the top. The microdevices were fabricated as follows. First, the interdigital-finger geometry was patterned using conventional photolithography on Si/SiO$_2$ substrates, followed by the deposition of Cr (10 nm) adhesion layer and Ni (450 nm) graphene growth catalyst layer. Few-layer graphene (FLG) was then grown on the patterned Ni electrodes by chemical vapor deposition (CVD). After this, catalyst particles (Fe/Al$_2$O$_3$) were patterned and deposited on the FLG. In the final step, CNTCs were synthesized on FLG by CVD. The detailed process is illustrated in FIG. 36 and described further below.

Figure 37:
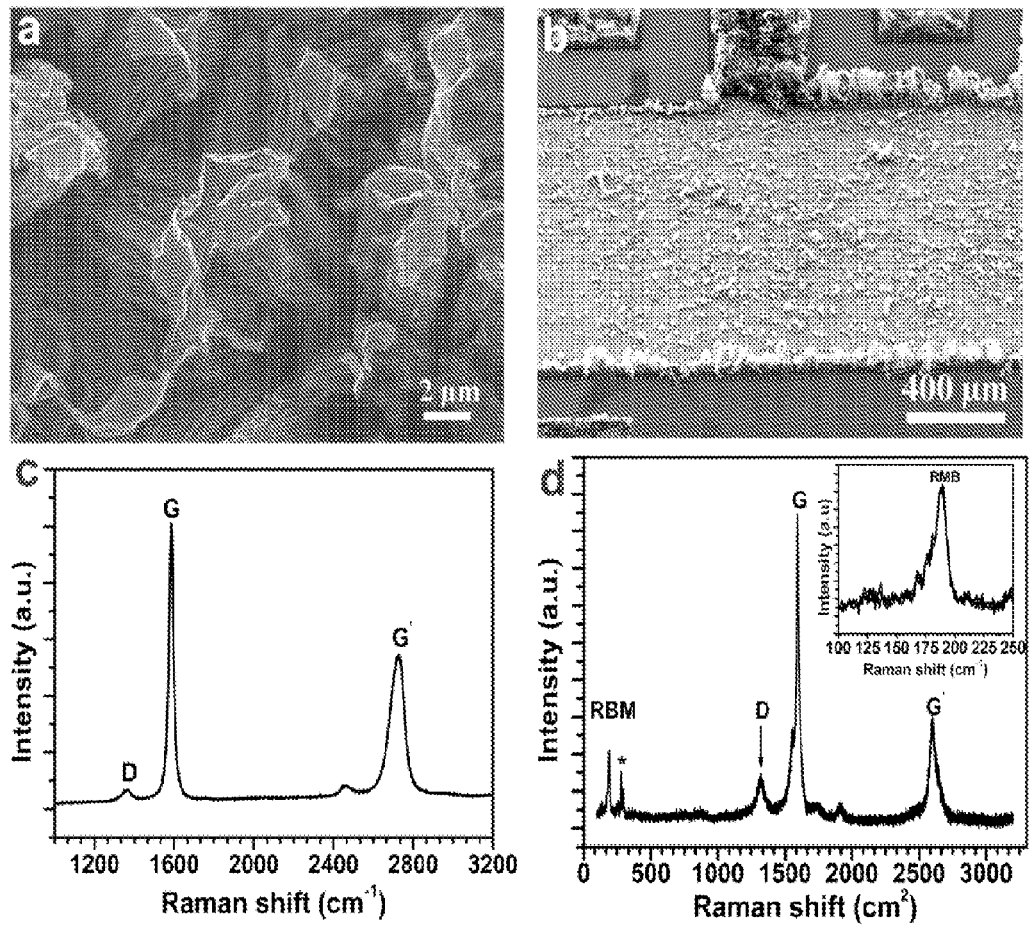
FIG. 37 provides additional characterizations of G/CNTCs-MCs.

FIG. 32B is a representative scanning electron microscopy (SEM) image of a fabricated G/CNTCs-MC. In general, the CNTCs are split into 1 to 2 μm of individual CNT pitches, whose exposed tip-ends are capped by Fe/Al$_2$O$_3$ (FIG. 37A). This nanotube tip-growth process has been called Odako growth. Using small, individual pitches allows the electrolyte to penetrate readily into the active CNTs, thus enhancing the specific capacitance and the frequency response. During the growth process, the role of the graphene is to prevent the iron catalysts from being alloyed with the Ni electrodes. This assumption is supported by the results of control experiments, showing that CNTCs were difficult to grow directly on the Ni electrodes without the previous coverage of graphene (FIG. 37B). The Raman spectrum of as-grown FLG exhibits a low defect peak (FIG. 37C), indicating reasonably high-quality growth. The characteristic Raman spectrum of as-grown CNTCs is shown in FIG. 37D. The low D/G band intensity ratio ($I_D/I_G$) of 1:9 likewise indicates the high quality of CNTs. The clear radial breathing mode (RBM) reveals the existence of high quality CNTs with small diameters, which is further depicted in the transmission electron microscopy (TEM) images (FIGS. 32C-E). From the TEM images, it can be observed that most CNTs in the carpets are single, double and few-walled with diameters varying from 4 to 8 nm. These dense CNTs with small diameters were reported to offer ultrahigh surface area. To investigate the influence of the heights of the CNTCs on the electrochemical performance of microsupercapacitors, CNTCs were grown for 1 min, 2.5 min and 5 min, affording heights of ~10 μm, 15 μm and 20 μm, respectively, as shown in FIGS. 32F-H. From the SEM images, it is evident that the CNTCs were grown vertically from the graphene surface, without any alumina buffer layer in between. This connection provides excellent electrical conduction between the active material and the current collectors.

Figure 33:
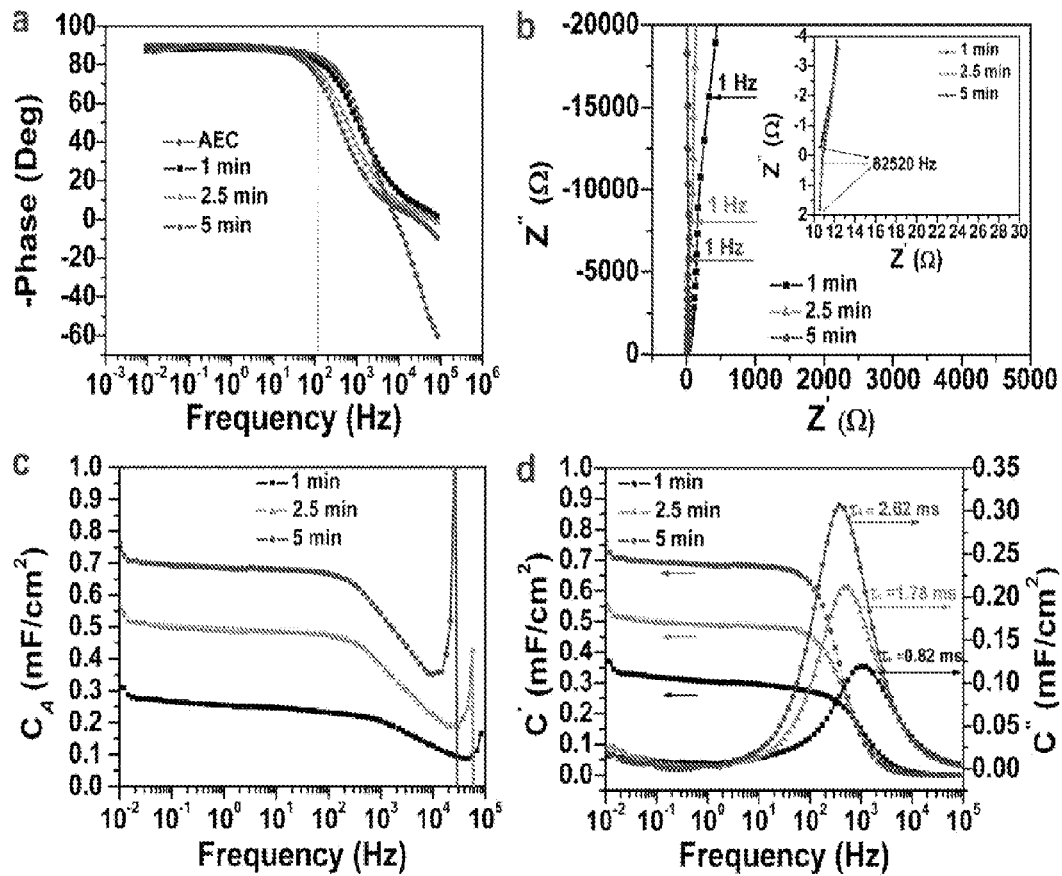
FIG. 33 provides AC impedance characterizations of microsupercapacitors with CNTCs grown for various durations (1 min, 2.5 min and 5 min) using 1 M $Na_2SO_4$.

To evaluate the AC response of the fabricated G/CNTCs-MCs, electrochemical impedance spectroscopy (EIS) measurements were performed. The impedance phase angles of microsupercapacitors constructed with CNTCs grown for various durations (1 min, 2.5 min and 5 min) are plotted as functions of frequency (FIG. 33A). The absolute phase angles of all the three microdevices at low frequency region (<50 Hz) are very close to 90°, which is indicative of near-ideal capacitive response. The absolute phase angle of the microdevice fabricated with 1 min-growth CNTCs is 81.5° at 120 Hz, which is comparable to commercial AECs (83.9°, FIG. 33A) and higher than hitherto reported values from CNTs)(<75°. As the growth duration increases to 5 min, the height of the CNTCs increases from ~10 μm to ~20 μm. This leads to a necessarily longer ion diffusion length as well as an increased electrical resistance between the tube base and tip. As a result, the absolute phase angle at 120 Hz decreases to 73.4° for the microdevice with 5 min-growth CNTCs. For the ease of comparison, one often studies the frequency when the impedance phase angle reaches −45°. The frequencies (f) at phase angle of −45° are ~1343 Hz, 754 Hz and 460 Hz for the as-fabricated microdevices with CNTCs grown for 1 min, 2.5 min and 5 min, respectively (FIG. 33A). These crossover frequencies are more than two orders of magnitude higher than activated carbon microsupercapacitors (AC-MCs, <5 Hz), and much higher than OLC microsupercapacitors (OLC-MCs, <100 Hz), laser reduced graphene microsupercapacitors (LRG-MCs, <5 Hz) or laser-scribed graphene double layer capacitors (LSG-DLC, 30 Hz).

Without being bound by theory, it is envisioned that supercapacitors outperform conventional electrolytic capacitors due to their porous nature. However, the confinement of ion flow due to this porous nature generally results in a poor AC response, which can be noted from the 45° line intersecting the real axis in their Nyquist plots. FIG. 33B shows representative Nyquist plots from microdevices constructed with CNTCs grown for 1 min, 2.5 min and 5 min, with the inset showing an expanded view at the high frequency region. The absence of a 45° line intersecting the real axis implies no features of a porous nature on the electrodes from the inset of FIG. 33B. The Nyquist plot for the supercapacitors usually shows a high-frequency semi-circle caused by an effective series resistance, which is attributed to the ionic conductivity at the electrode-electrolyte interface. Here, the absence of the semicircle in the Nyquist plots implies an ultrahigh ionic conductivity at the interface of the electrodes and electrolyte, consistent with the ultrahigh rate capability and high power performance. From the Nyquist plots, the series R-C model was employed to estimate the specific areal capacitance ($C_A$) using equations described in Eq. S1. The evolutions of $C_A$ of microdevices prepared with CNTCs grown for 1 min, 2.5 min and 5 min are plotted as functions of frequency in FIG. 33C. All of the microdevices show capacitive behaviors at up to $10^4$ Hz (FIG. 33C). At 120 Hz, $C_A$ are 230 μF/cm² for 1 min-growth, 470 μF/cm² for 2.5-min growth and 662 μF/cm² for 5 min-growth. These are some of the highest capacitances reported to date in supercapacitors that are demonstrated to have ac line filtering performance. The measured total resistances of 21.3 Ω, 17.3Ω and 15.2Ω at 120 Hz yield the RC time constants ($\tau_{RC}$) of 195 μs, 325 μs and 402 μs, respectively. These $\tau_{RC}$ values are comparable to AECs or vertical graphene DLC (VG-DLC, 200 μs), shorter than electrochemically reduced graphene DLC (ErG-DLC, 1.35 ms), and much shorter than 8.3 ms period required for 120 Hz filtering.

The real and imaginary capacitances, extracted from the impedance data, are important indicators of the performance of supercapacitors. FIG. 33D presents the evolution of specific real (C') and imaginary (C") capacitances versus the frequency (calculated in Eq. S2 and Eq. S3). C' of all the microdevices tend to be comparatively frequency independent until 120 Hz, suggesting optimal capacitive behavior. From the maximum frequency ($f_0$) of imaginary capacitance C, Applicants can derive the characteristic relaxation time constant $\tau_0$ ($=1/f_0$), which is the minimum time for discharging all of the energy with an efficiency >50%. The extra small $\tau_0$ (0.82 ms) for the microdevice with CNTCs grown for 1 min further confirms the ultrafast ion absorption/desorption. As the growth duration increases, $\tau_0$ increases (1.78 ms for 2.5 min-growth and 2.62 ms for 5 min-growth) arising from the elongation of the ion diffusion path. Nevertheless, these values are much smaller than AC-MCs (700 ms) and OLC-MCs (26 ms). Such short $\tau_0$ would enable G/CNTCs-MCs to deliver ultrahigh power density. In summary, to Applicants' knowledge, all of the above discussed AC performance characteristics (impedance phase angles at 120 Hz, frequencies at phase angle of −45°, $\tau_{RC}$, $\tau_0$) are more optimal than past microdevices. The comparisons of various capacitors are summarized in Table 1.

TABLE 1

Comparison of electrochemical performance of various capacitors built in different materials.

| Device | Reference | Material | −Phase at 120 Hz | f (Hz) at −45° | $\tau_{RC}$ (ms) | $\tau_0$ (ms) | $R_C$ (V/s) | $C_A$ (mF/cm²) | $P_V$ (W/cm³) | $E_V$ (mWh/cm³) |
|---|---|---|---|---|---|---|---|---|---|---|
| Microdevice | Current work | G-CNTCs | 81.5° | 1343 | 0.195 | 0.82 | 400 | 2.16 | 115 | 0.16 |
| | | | | | | | | 3.93 | 135 | 2.42 |
| | Pech et al.[8] | OLC | N/A | <100[a] | N/A | 26 | 100 | N/A | N/A | N/A |
| | | | | | | | | 0.9 | ~1000 | ~1 |
| | Gao et al.[9] | LRG | N/A | <5[a] | N/A | N/A | <0.1 | ~1.0 | ~100 | <1 |
| | | | | | | | | ~2.5 | <10 | ~5 |
| | Pech et al.[8, 10] | AC | <1°[a] | <5[a] | N/A | 700 | 1 | N/A | N/A | N/A |
| | | | | | | | | 2.1 | <30 | ~10 |
| Macrodevice | Commercial | AEC | 83.9° | 1600 | 0.14 | N/A | >400 | 0.3 | >100 | <0.01 |
| | El-Kady et al.[11] | LSG | <20° | 30 | N/A | N/A | 10 | 3.67 | <10 | <0.1 |
| | | | | | | | | 4.82 | 20 | 1.36 |
| | Miller et al.[14] | VG | 82° | 15000 | ~0.2 | N/A | N/A | <0.2 | N/A | N/A |
| | | | | | | | | N/A | N/A | N/A |
| | Sheng et al.[15] | ErGO | 85.5° | 4200 | 1.35 | 0.24 | 350 | <1 | N/A | N/A |
| | | | | | | | | N/A | N/A | N/A |
| | Du et al.[23] | CNTs | <75° | 636 | NA | 1.5 | 1 | N/A | N/A | N/A |

The abbreviations are as follows: G/CNTCs: graphene-carbon nanotube carpets; OLC: onion-like carbon; LRG: laser reduced graphene; AC: activated carbon; AEC: aluminum electrolytic capacitor; LSG: laser-scribed graphene; VG: vertical graphene; ErGO: electrochemical reduced graphene oxide; CNTs: carbon nanotubes. The rows labeled in green indicate an aqueous electrolyte; the rows labeled in yellow indicate an organic electrolyte. All of the data were based on the best result from each reference.
[a]means the values are estimated from the given impedance Nyquist plots in the references.

Figure 34:
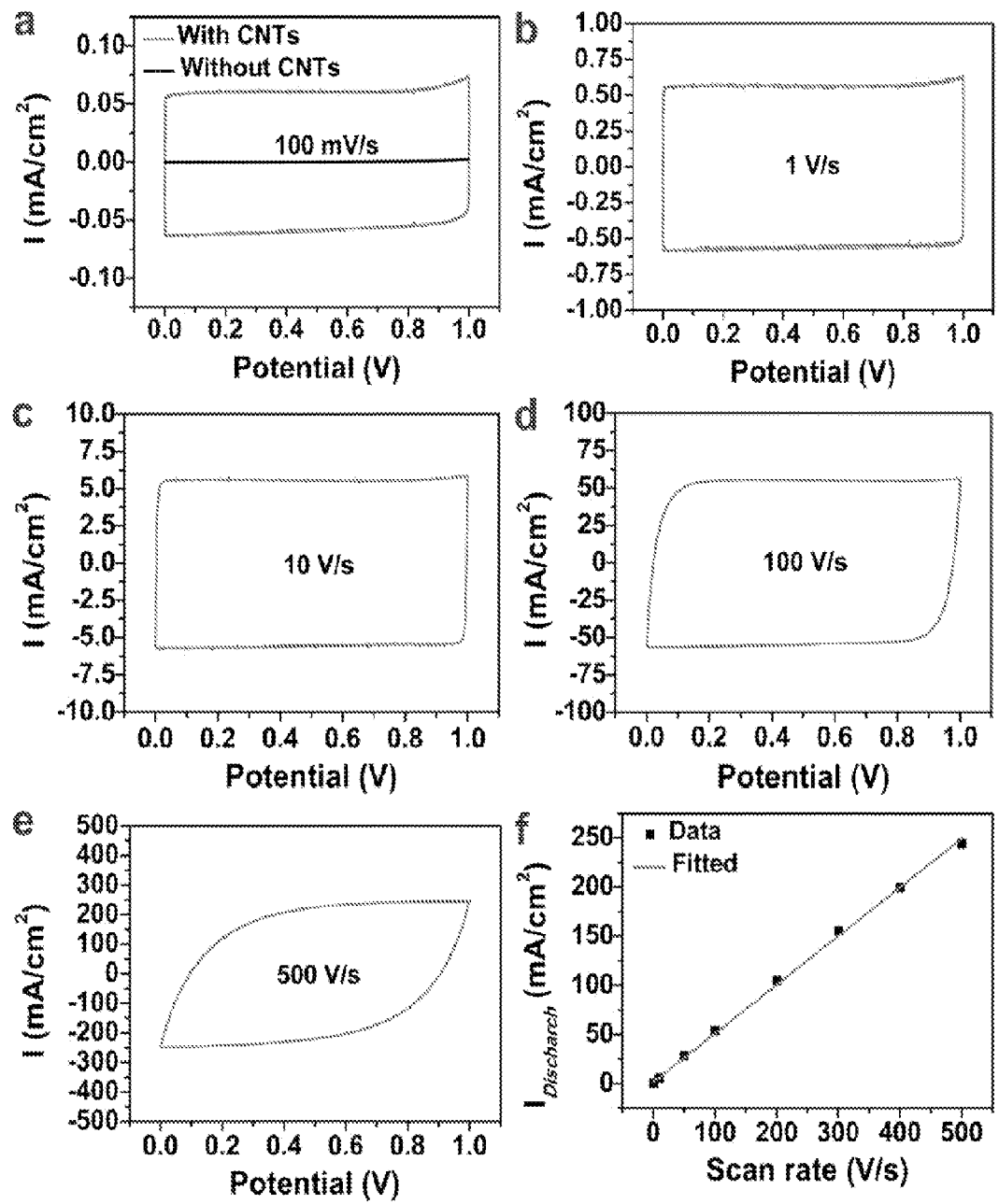
FIG. 34 provides cyclic voltammetry (CV) characterizations of G/CNTCs-MCs with CNTCs grown for 2.5 min and using 1 M $Na_2SO_4$ as the electrolyte.
Figure 38:
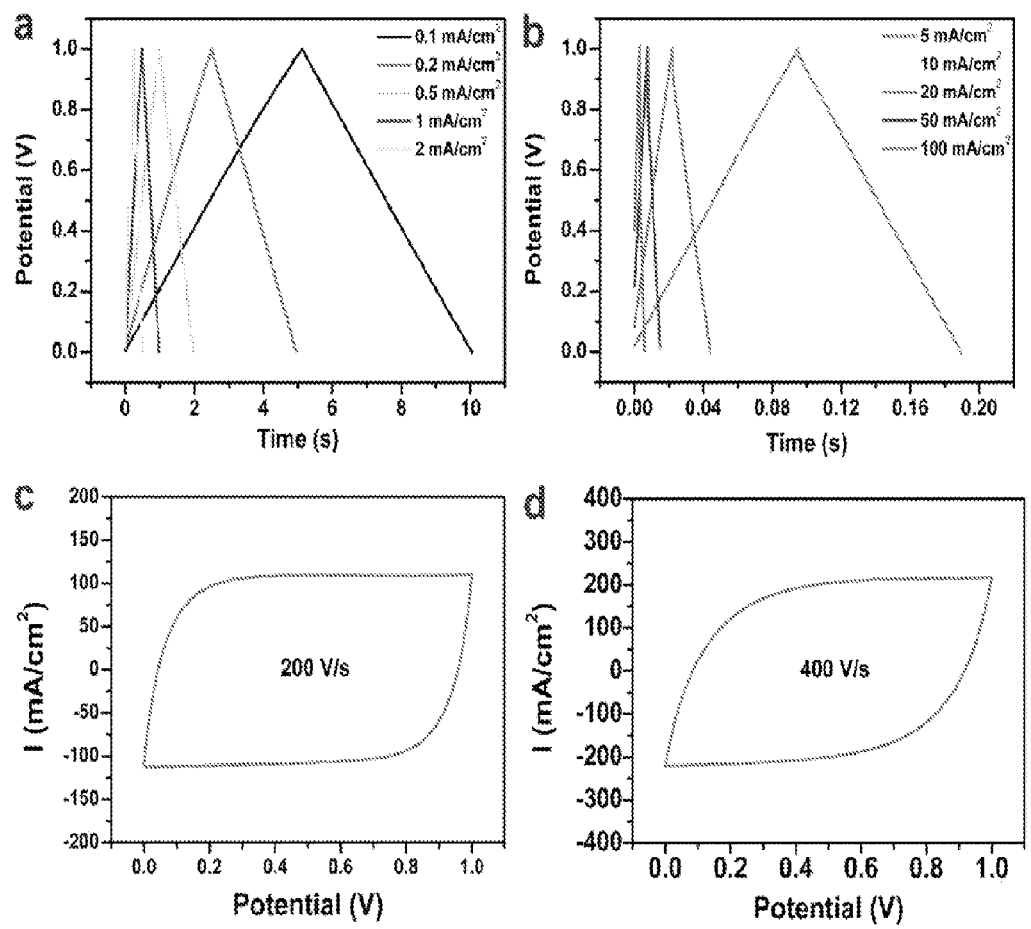
FIG. 38 shows galvanostatic charge/discharge (CC) curves and cyclic voltammetry (CV) curves of a microsupercapacitor with CNTs grown for 2.5 min using a 1M $Na_2SO_4$ electrolyte.

In general, supercapacitors are used to deliver energy or power operated at only a few tens of Hertz. Thus, investigation of the power performance of the fabricated G/CNTCs-MCs is desirable. Rate capability is an effective parameter to evaluate the power performance of supercapacitors, which can be obtained from cyclic voltammetry (CV) curves. FIGS. 34A-F exhibit CV curves at various scan rates from 0.1 to 500 V/s obtained in a microdevice constructed with CNTCs grown for 2.5 min using an aqueous electrolyte of 1 M $Na_2SO_4$. Compared to the microdevice with bare Ni contacts and graphene only, the microdevice constructed with added CNTCs exhibits significantly improved electrochemical performance, implying that the capacitance is mainly attributed to the ion absorption/desorption into the CNTCs, as expected (FIG. 34A). The CV curves maintain near-ideal rectangular shapes with symmetric charge and discharge current densities at a scan rate of up to 100 V/s (FIGS. 34A-D), suggesting near-perfect formation of electrical double layer. This is confirmed by the nearly triangular charge/discharge (CC) curves obtained at current densities from 0.1 to 100 mA/cm² (FIGS. 38A-B). Although the transient effect of rounded corners becomes apparent as the scan rate increases up to 400 V/s (FIGS. 38C-D), the specific capacitance, derived from the symmetric and constant steady-state current density, is still maintained. The quasi-rectangular shape with little variance even at the ultrahigh scan rate of 500 V/s is noteworthy (FIG. 34E). The evolved discharge current densities exhibit linear dependence scan rates from 0.1 to 400 V/s (FIG. 34F), which is higher than the recent record in ErG-DLC (350 V/s), much higher than OLC-MCs (100 V/s) or LSG-DLC (10 V/s), and hundreds of times higher than the those from AC-MCs (1 V/s). This ultrahigh rate capability underscores the enhanced power performance of G/CNTCs-MCs.

Figure 39:
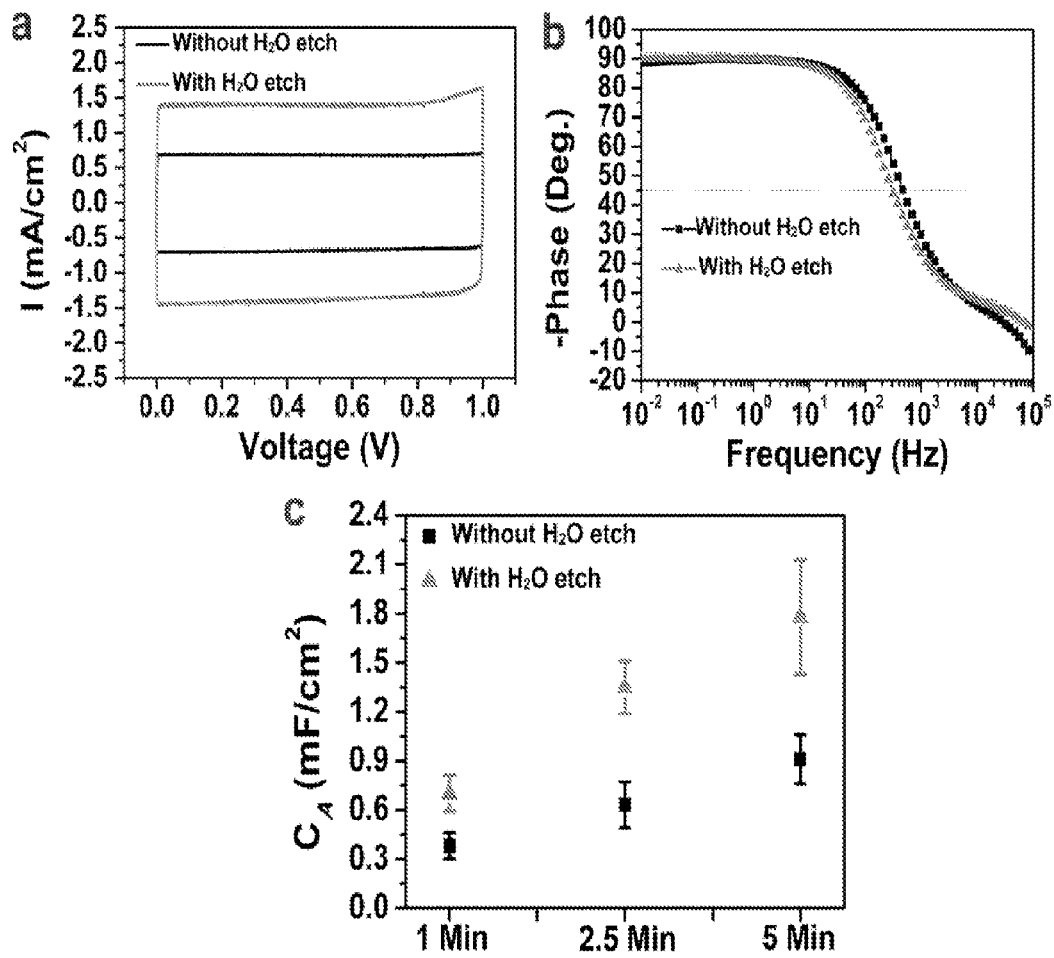
FIG. 39 shows the role of post-grown water etching on the electrochemical performance of microsupercapacitors.

Furthermore, Applicants found that high temperature water etching could significantly improve the capacitance of the fabricated microdevices. This is achieved by exposing the G/CNTCs-MCs to hydrogen and water vapor at 750° C. for 2 min. FIG. 39A shows the CV curves of the representative microdevices with and without water etching. $C_A$ increases by 103% from 0.70 mF/cm² to 1.42 mF/cm² after water etching (FIG. 39A, and calculated in Eq. S4). Without being bound by theory, it is envisioned that this enhancement may be due to two reasons: first, water could behave as the etching agent of amorphous carbon deposited on the surface of CNTs during their growth. This would lower the effective series resistance between the electrolyte and CNTs in the R-C model. Second, the water could attack the defect sites of the CNTs to produce oxygen or hydroxyl functional groups, which would improve the wettability of the CNTs and thus decrease the interfacial resistance. With the increased capacitance by water etching, the frequency at a phase angle of −45° decreases from 460 Hz to 320 Hz (FIG. 39B). If these frequencies are reversely proportional to the effective resistance times capacitance, the effective resistance after water etching decreases by 30%. In general, $C_A$, calculated from CC curves using Eq. S5, increases as the growth duration is elongated (FIG. 39C). Moreover, the water etching further enhances $C_A$ by 50%-110% (FIG. 39C). This water treatment provides further capability of G/CNTCs-MCs to offer high power and energy density, and strongly suggests that it is the residual effective series resistance of the electrolyte interface that limits high frequency performance.

Figure 35:
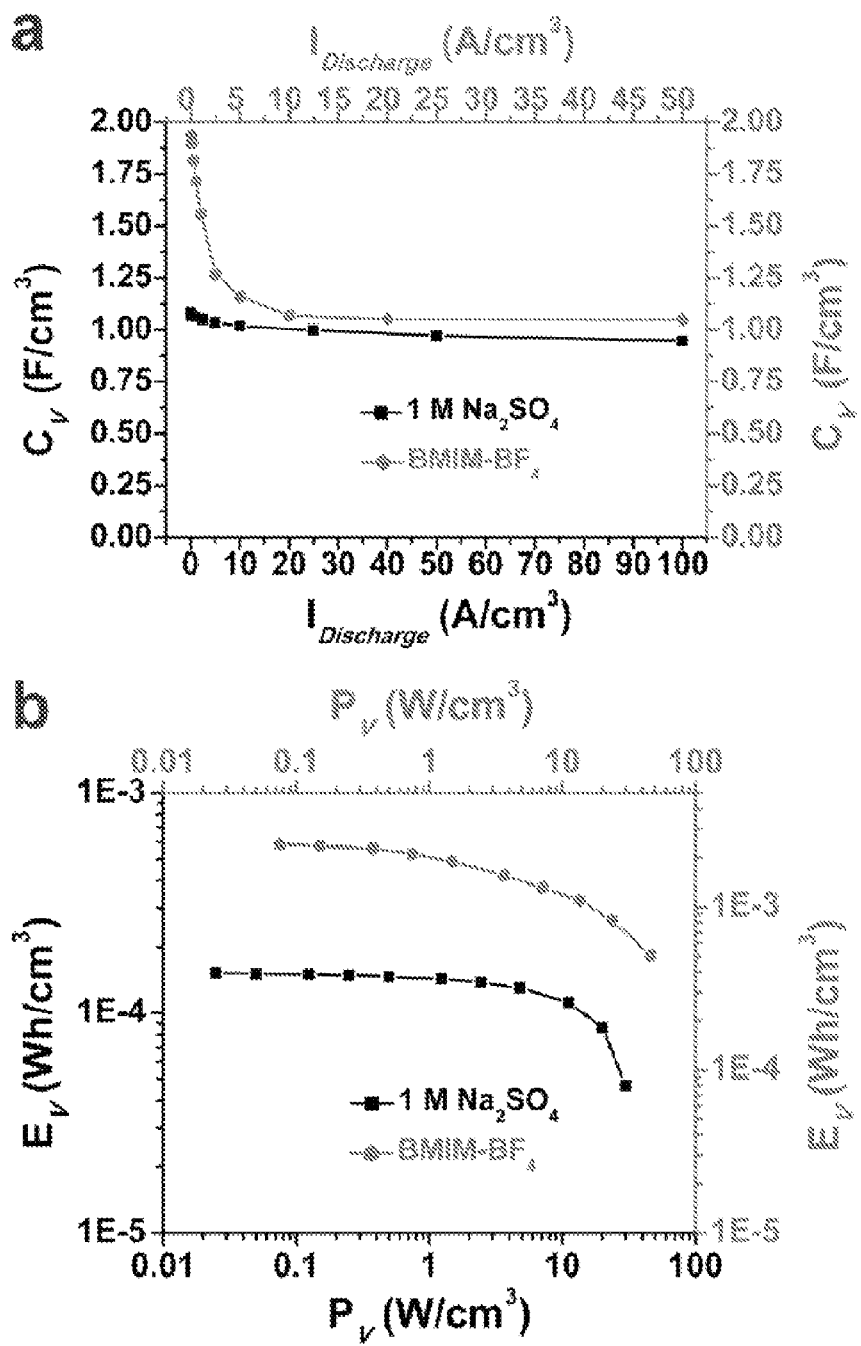
FIG. 35 provides comparison of electrochemical performance of G/CNTCs-MCs with CNTCs grown for 5 min followed by water etching for 2 min, and using 1 M $Na_2SO_4$ and $BMIM-BF_4$ as electrolytes.
Figure 40:
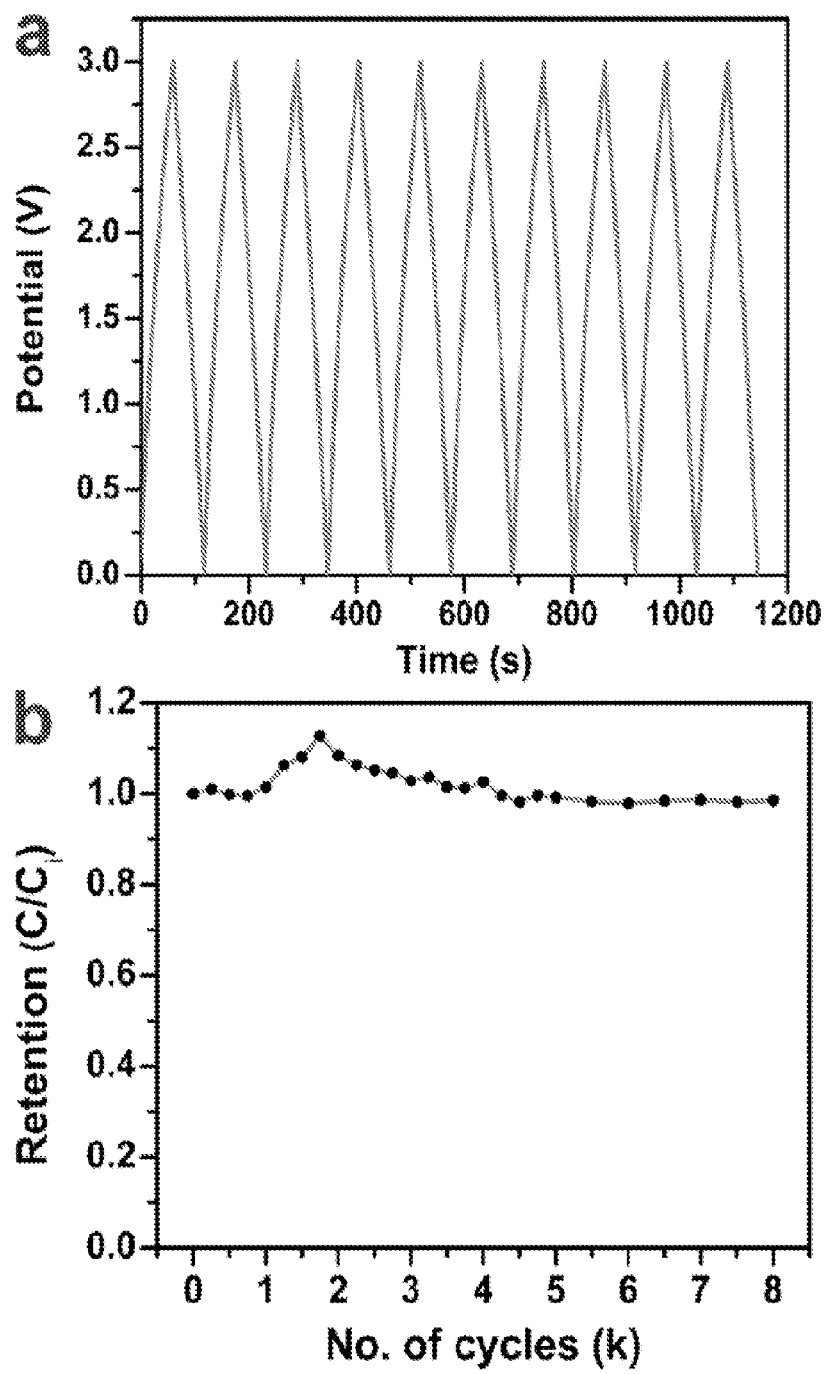
FIG. 40 shows the electrochemical performance of a microsupercapacitor with CNTCs grown for 5 min using a BMIM-BF$_4$ ionic liquid electrolyte.
Figure 41:
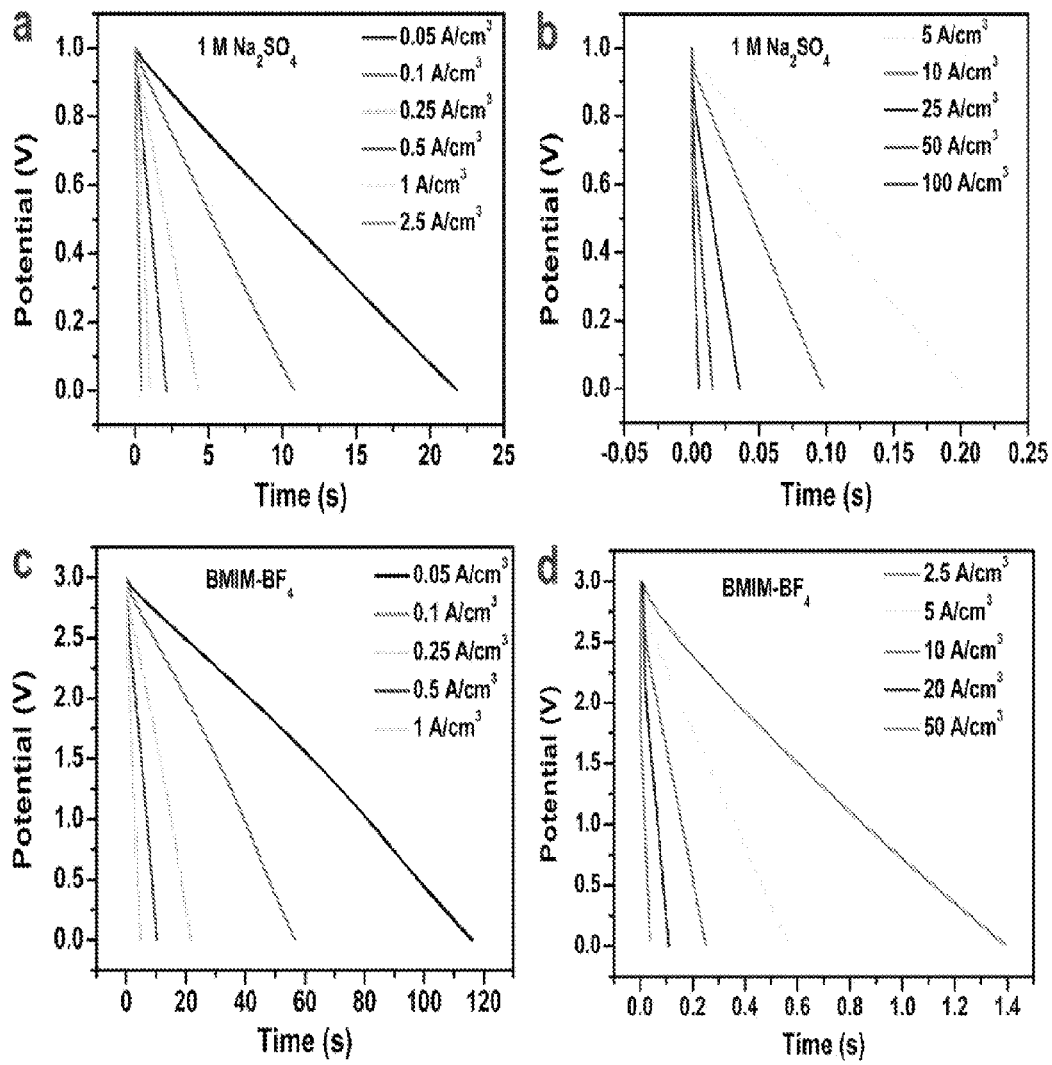
FIG. 41 shows galvanostatic CC curves of microsupercapacitors constructed with CNTCs under the same dynamic conditions (5 min growth and 2 min post-growth water etching) using 1M Na$_2$SO$_4$ and BMIM-BF$_4$ ionic liquid electrolyte.

Applicants also examined the electrochemical performance of the fabricated microdevices in an organic electrolyte. The microdevice was fabricated using 5 min-growth CNTCs followed by post-water-etching for 2 min. 1-Butyl-3-methylimidazolium tetrafluoroborate ($BMIM-BF_4$) was used as the organic electrolyte. The galvanostatic CC curve in FIG. 40A exhibits a nearly triangular shape, implying optimal double layer capacitive behaviors. Additionally, the cyclability test shows that the capacitance was retained at 98.4%, even after 8,000 cycles (FIG. 40B). From the CC curves in FIG. 41, Applicants can further assess the electrochemical performance of G/CNTCs-MCs in terms of their specific capacitances, power densities and energy densities. FIG. 35A exhibits the comparison of specific volumetric capacitance ($C_V$) of the microdevices made by the same growth conditions (CNTCs grown for 5 min and 2 min water etching). The microdevices using 1 M $Na_2SO_4$ afford a $C_V$ of 1.08 F/cm³ volume (or $C_A$=2.16 mF/cm²) and this is decreased by 12% to 0.9 F/cm³ volume (or $C_A$=1.90 mF/cm²) at ultrahigh current density of 100 A/cm³ volume (or 200 mA/cm²), indicating the optimal rate capability. The microdevices using $BMIM-BF_4$ exhibit a $C_V$ up to 1.96 F/cm³ volume (or $C_A$=3.93 mF/cm²) and retain 1.05 F/cm³ volume (or $C_A$=2.10 mF/cm²) at the ultrahigh current density of 50 A/cm³ volume (or 100 mA/cm²). When compared to the microdevices using $Na_2SO_4$, the devices using $BMIM-BF_4$ show a relatively higher degradation because of the much larger ionic size than that of $Na_2SO_4$. Nevertheless, the devices using $BMIM-BF_4$ still exhibit higher retention, even at much higher stack current density, than LSG-DLCs which degrades from 4.82 mF/cm² to 2.07 mF/cm² at a current density <10 A/cm³ volume.

A Ragone plot of a G/CNTCs-MC's energy density versus power density presents the device's operational range and provides information for optimizing the working point. The Ragone plots in FIG. 35B show the performance comparison of microdevices using 1 M $Na_2SO_4$ and 1 M $BMIM-BF_4$ as the electrolytes. The specific volumetric energy ($E_V$) and volumetric power density ($P_V$) were derived from CC curves (FIG. 41) by using Eq. S6 and Eq. S7. The microdevices using $BMIM-BF_4$ exhibited much higher $E_V$ (2.42 mWh/cm³) than the devices using $Na_2SO_4$ (0.16 mWh/cm³), mainly resulting from the wider operation potential window of 3 V in $BMIM-BF_4$. It should be noted that the $E_V$ values, compared individually with the devices either using aqueous or organic electrolytes, are higher than LSG-DLC or OLC-MCs, and more than two orders of magnitude higher than AECs. In addition, the G/CNTCs-MCs deliver $P_V$ of 30 W/cm³ in aqueous electrolyte and 46 W/cm³ in $BMIM-BF_4$, which are comparable to OLC-MCs, higher than LRG-MCs or LSG-DLC. The theoretical maximum $P_V$, obtained from Eq. S8, is as high as 115 W/cm³ in $Na_2SO_4$ and 135 W/cm³ in $BMIM-BF_4$, which are comparable to AECs or OLC-MCs. The detailed comparisons are summarized in Table 1.

In sum, Applicants have developed microsupercapacitors based on 3D G/CNTCs hybrid materials with optimal electrochemical performance. The microdevices constructed with short CNTCs exhibit much higher energy capacity than AECs while having comparable AC line filtering performances. With the increased heights of CNTCs, the as-produced microdevices show improved capacitances while maintaining satisfactory AC response. The most dramatic materials difference between these and other related structures are that the G/CNTCs have a seamless transition structure, maximizing the electrical conductivity. Water-etching significantly enhances the capacitance, resulting in ultrahigh power and energy densities. Given these performance characteristics, the G/CNTCs-MCs would provide a route to addressing the demands of the future microscale energy storage devices.

Example 3.1

Microsupercapacitor Fabrication Procedure

The microsupercapacitors were fabricated as follows. The interdigital-finger geometry was first patterned using conventional photolithography on a silicon substrate with 500 nm of thermal oxide. Next, 10 nm of chromium and 450 nm of nickel (purity: 99.99%), in which nickel acts as both current collector for the microsupercapacitors and the catalyst to grow few-layer graphene (FLG), were deposited on the patterned $Si/SiO_2$ substrate using electron beam evaporator (EBE) followed by a lift-off process. For easier lift-off, spin coating of bilayer photoresist (LOR 5B/S1813) was employed. After that, FLG was synthesized on patterned Ni electrodes by chemical vapor deposition (CVD) at 800° C. Later, one more step of photolithography was implemented on top of Cr/Ni followed by EBE of iron and alumina (Fe/1 nm and $Al_2O_3$/3 nm). After lift-off process, carbon nanotube carpets (CNTCs) were synthesized from the patterned $Fe/Al_2O_3$ by CVD at 750° C. The detailed fabrication procedure is illustrated in FIG. 36.

Example 3.2

Synthesis of Graphene

FLG films were directly synthesized on patterned Ni electrodes via CVD method. The process began with thermal annealing of Ni at 800° C. under the flow of 400 standard cubic centimeters (sccm) $H_2$ and 400 sccm Ar for 10 min at ambient pressure to coarsen the grain size. Next, carbon precursor gas $C_2H_4$ (10 sccm) was introduced into the tube and kept at 800° C. for 3 min. After that, $C_2H_4$ was turned off and samples were rapidly drawn to the room temperature zone of the tube using a magnet-on-a-rod sample retrieval system. The $H_2$ and Ar flow continued until the samples reached room temperature.

Example 3.3

Synthesis and Post-Growth Water Etching of CNTCs

A water-assisted hot filament furnace process was used to synthesize the CNTCs at reduced pressure. Before loading the samples to the heating zone of the furnace, the temperature was stabilized at 750° C., during which 1 sccm acetylene and 210 sccm $H_2$ were introduced into the furnace. Water vapor was then added into the furnace by bubbling 200 sccm $H_2$ through NANO Pure™ water (Thermo Scientific). After the samples were loaded into the furnace, a tungsten hot filament was immediately turned on, with a power of 45 W, to activate the catalysts for 30 s at 25 Torr, then turned off. After that, the pressure was reduced to 5 Torr and CNTCs were grown for 1 to 5 min. Next, the samples were quickly cooled to the room temperature. For the post-growth water etching, the carbon precursor was turned off after the growth of the CNTCs, and 210 sccm $H_2$ and water vapor created by bubbling 200 sccm $H_2$ into water were fed for 2 min at 750° C.

Example 3.4

Materials Characterization

A Renishaw InVia Raman microscope equipped with a 50× optical objective and constant power of 5 mW was employed to characterize the FLG films and CNTCs. A laser with wavelength of 514.5 nm was used to characterize the FLG, while CNTCs were characterized with a laser with wavelength of 633 nm. The scanning electron microscope (SEM) images were taken with a JEOL 6500F. High-resolution transmission electron microscope (TEM) images were obtained on a JEOL 2100F field emission gun TEM.

Example 3.5

Assembly and Testing Method of Microsupercapacitors

The electrodes of the microsupercapacitors were connected to external electrodes of an electrical box via wire bonded leads. The electrodes of the electrical box were connected to a CHI 608D potentiostat/galvanostatic for electrochemical characterization in a two-electrode cell configuration. The microsupercapacitors using 1 M $Na_2SO_4$ aqueous electrolyte were measured under ambient environment. The microsupercapacitors using 1-butyl-3-methylimidazolium-tetrafluoroborate (BMIM-$BF_4$, from Sigma Aldrich) were assembled and sealed in a $N_2$-filled glove box (VAC, model: NEXUS) with controlled $O_2$ and $H_2O$ level lower than 1 ppm. Electrochemical impedance spectroscopy (EIS) measurements were performed using sinusoidal signal of 10 mV amplitude at frequency ranging from 10 m Hz to 100K Hz.

Example 3.6

EIS Measurements

To investigate the AC line-filtering performance of microdevices, EIS measurements were performed. From EIS, the frequency response specific areal capacitances ($C_A$, in F/cm²) were estimated using a series-RC circuit model (Eq. S1):

$$C_A = \frac{-1}{2\pi f S Z''(f)} \quad \text{(Eq. S1)}$$

In Eq. S1, f is frequency; S is the total surface area of positive and negative conductive planar electrodes (in cm²); and Z"(f) is the imaginary part of the impedance. In the device configuration, the total area of active planar electrodes is 0.04 cm². Alternatively, the specific capacitance of the microsupercapacitors can be described by using C'(f) and C"(f) as functions of frequency[2] (Eq. S2 and Eq. S3):

$$C'(f) = \frac{-Z''(f)}{2\pi f S |Z(f)|^2} \quad \text{(Eq. S2)}$$

$$C''(f) = \frac{Z'(f)}{2\pi f S |Z(f)|^2} \quad \text{(Eq. S3)}$$

In Eq. S2 and Eq. S3, f is frequency; C'(f) is the real part of specific capacitance; C"(f) is the imaginary part of specific capacitance; Z'(f) and Z"(f) are real and imaginary parts of the impedance; and |Z(f)| is the absolute value of the impedance.

Example 3.7

Calculations of Figure of Merit for Microsupercapacitors

Based on the near rectangle shapes of the CV curves, the specific areal capacitance ($C_A$, in F/cm²) was calculated by Eq. S4:

$$C_A = I/(S \times s) \quad \text{(Eq. S4)}$$

In Eq. S4, I is the discharge current (in A); S is the total surface area of positive and negative planar conductive electrodes (in cm²); and s is the voltage sweep rate (in V/s). In the device configuration, the total area of planar electrodes is 0.04 cm². The $C_A$ (in F/cm²) was also calculated from the galvanostatic charge/discharge (CC) curves using Eq. S5:

$$C_A = \frac{I}{S \times (dV/dt)} \quad \text{(Eq. S5)}$$

In Eq. S5, I is the discharge current (in A); S is the total surface area of positive and negative conductive planar electrodes (in cm²); and dV/dt is the slope of galvanostatic discharge curve. The specific volumetric energy densities ($E_V$, in Wh/cm³) were estimated from the constant current discharge curves using Eq. S6:

$$E_V = \frac{C_V V_i^2}{2} \times \frac{1}{3600} \quad \text{(Eq. S6)}$$

In Eq. S6, $$C_V = \frac{C_A}{h}$$

is the specific volumetric capacitance (F/cm³); $V_i = V_{max} - V_{drop}$ is the operational potential window ($V_{max}$ is the maximum voltage, 1 V for $Na_2SO_4$ electrolyte, 3 V for BMIM-$BF_4$ electrolyte), $V_{drop}$ is voltage drop at the beginning of discharge; and h (in cm) is the measured height of CNTCs. h is 20 μm for the devices in FIGS. 35 and 41.

The average specific volumetric power densities ($P_V$, in W/cm$^3$) calculated from the constant current discharge curves are given in Eq. S7:

$$P_V = \frac{E_V}{\Delta t} \qquad \text{(Eq. S7)}$$

In Eq. S7, $E_V$ is the specific volumetric energy density; and Δt is discharge time. The above estimated specific energy densities and power densities were employed for the Ragone plot in FIG. 35. The effective series resistance was estimated by the equation $$R_{ESR} = \frac{V_{drop}}{2I},$$

where $V_{drop}$ is the voltage drop at the beginning of discharge and I is the constant discharge current. The theoretic maximum power density (in W/cm$^3$) were estimated by Eq. S8:

$$P_{max} = \frac{V_{max}^2}{4R_{ESR}v} \qquad \text{(Eq. S8)}$$

In Eq. S8, $V_{max}$ is the potential window (1 V for Na$_2$SO$_4$, 3 V for BMIM-BF$_4$); $R_{ESR}$ is the effective series resistance; and v=S×h is the volume of CNTs active material. S is 0.04 cm$^2$, and h is 20 μm for the devices in FIG. 35.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of making a graphene-carbon nanotube hybrid material, comprising:
    associating a graphene film with a substrate;
    applying a catalyst and a carbon source to the graphene film; and
    growing carbon nanotubes on the graphene film,
        wherein the grown carbon nanotubes are covalently linked to the graphene film through carbon-carbon bonds,
        wherein the grown carbon-carbon bonds are at one or more junctions between the carbon nanotubes and the graphene film, and
        wherein the grown carbon nanotubes are in ohmic contact with the graphene film through the carbon-carbon bonds at the one or more junctions.

2. The method of claim 1, wherein the substrate comprises one or more atoms selected from the group consisting of Ni, Co, Fe, Pt, Au, Al, Cr, Cu, Mg, Mn, Mo, Rh, Si, Ta, Ti, W, U, V, Zr, SiO$_2$, Al$_2$O$_3$, BN, diamond, alloys thereof, and combinations thereof.

3. The method of claim 1, wherein the substrate is a copper foil.

4. The method of claim 1, wherein the substrate is a porous substrate.

5. The method of claim 4, wherein the porous substrate comprises porous nickel.

6. The method of claim 1, wherein the associating comprises forming the graphene film on the substrate.

7. The method of claim 6, wherein the forming comprises chemical vapor deposition.

8. The method of claim 1, wherein the associating comprises transferring a pre-grown graphene film onto the substrate.

9. The method of claim 1, wherein the graphene film is selected from the group consisting of monolayer graphene, few-layer graphene, double-layer graphene, triple-layer graphene, multi-layer graphene, and combinations thereof.

10. The method of claim 1, wherein the graphene film excludes reduced graphene oxide.

11. The method of claim 1, wherein the graphene film excludes graphite.

12. The method of claim 1, wherein the catalyst comprises a metal, wherein the metal is selected from the group consisting of iron, nickel, cobalt, palladium, platinum, gold, ruthenium, rhodium, iridium, alloys thereof, and combinations thereof.

13. The method of claim 1, wherein the catalyst comprises a metal and a buffer.

14. The method of claim 13, wherein the metal comprises iron.

15. The method of claim 13, wherein the buffer is selected from the group consisting of aluminum, magnesium, silicon, alloys thereof, derivatives thereof, and combinations thereof.

16. The method of claim 13, wherein the buffer comprises aluminum oxide.

17. The method of claim 13, wherein the buffer has a thickness between about 1 nm to about 10 nm.

18. The method of claim 13, wherein the metal has a thickness of about 1 nm.

19. The method of claim 13, wherein the applying comprises:
    depositing the metal onto a surface of the graphene film; and
    depositing the buffer onto a surface of the metal.

20. The method of claim 1, wherein the applying occurs by electron beam deposition.

21. The method of claim 1, wherein the carbon source is selected from the group consisting of alkanes, alkenes, alkylenes, alkynes, polymers, carbon oxides, and combinations thereof.

22. The method of claim 1, wherein the growing of carbon nanotubes comprises heating.

23. The method of claim 22, wherein the heating occurs at temperatures between about 500° C. and about 1,100° C.

24. The method of claim 1, wherein the catalyst is lifted off from the graphene film by the carbon nanotubes.

25. The method of claim 1, wherein the grown carbon nanotubes are selected from the group consisting of single-walled carbon nanotubes, double-walled carbon nanotubes, triple-walled carbon nanotubes, multi-walled carbon nanotubes, ultra-short carbon nanotubes, small diameter carbon nanotubes, and combinations thereof.

26. The method of claim 1, wherein the grown carbon nanotubes comprise vertically aligned carbon nanotubes that are substantially perpendicular to the graphene film.

27. The method of claim 1, further comprising a step of controlling the length of the grown carbon nanotubes.

28. The method of claim 27, wherein the controlling comprises adjusting carbon nanotube growth time.

29. The method of claim 28, wherein the growth time is adjusted from about 1 minute to about 20 minutes.

30. The method of claim 1, further comprising a step of removing the substrate from the graphene-carbon nanotube hybrid material, wherein the removing forms free-standing graphene-carbon nanotube hybrid materials.

31. The method of claim 30, wherein the removing comprises etching the substrate from the graphene-carbon nanotube hybrid material.

32. The method of claim 1, wherein the graphene-carbon nanotube hybrid material spans one side of the substrate.

33. The method of claim 1, wherein the graphene-carbon nanotube hybrid material spans both sides of the substrate.

34. The method of claim 1, wherein the one or more junctions comprise seven-membered carbon rings.

35. The method of claim 1, wherein the one or more junctions are seamless.

36. A graphene-carbon nanotube hybrid material, comprising:
a graphene film; and
carbon nanotubes,
wherein the carbon nanotubes are covalently linked to the graphene film through carbon-carbon bonds,
wherein the carbon-carbon bonds are at one or more junctions between the carbon nanotubes and the graphene film, and
wherein the grown carbon nanotubes are in ohmic contact with the graphene film through the carbon-carbon bonds at the one or more junctions.

37. The graphene-carbon nanotube hybrid material of claim 36, wherein the graphene film is selected from the group consisting of monolayer graphene, few-layer graphene, double-layer graphene, triple-layer graphene, multi-layer graphene, and combinations thereof.

38. The graphene-carbon nanotube hybrid material of claim 36, wherein the graphene film excludes reduced graphene oxide.

39. The graphene-carbon nanotube hybrid material of claim 36, wherein the graphene film excludes graphite.

40. The graphene-carbon nanotube hybrid material of claim 36, wherein the carbon nanotubes are selected from the group consisting of single-walled carbon nanotubes, double-walled carbon nanotubes, triple-walled carbon nanotubes, multi-walled carbon nanotubes, ultra-short carbon nanotubes, small diameter carbon nanotubes, and combinations thereof.

41. The graphene-carbon nanotube hybrid material of claim 36, wherein the carbon nanotubes comprise vertically aligned carbon nanotubes that are substantially perpendicular to the graphene film.

42. The graphene-carbon nanotube hybrid material of claim 41, wherein the carbon nanotubes comprise vertically aligned single-walled carbon nanotubes.

43. The graphene-carbon nanotube hybrid material of claim 36, wherein the one or more junctions comprise seven-membered carbon rings.

44. The graphene-carbon nanotube hybrid material of claim 36, wherein the one or more junctions are seamless.

45. The graphene-carbon nanotube hybrid material of claim 36, further comprising a substrate associated with the graphene film.

46. The graphene-carbon nanotube hybrid material of claim 45, wherein the substrate comprises one or more atoms selected from the group consisting of Ni, Co, Fe, Pt, Au, Al, Cr, Cu, Mg, Mn, Mo, Rh, Si, Ta, Ti, W, U, V, Zr, $SiO_2$, $Al_2O_3$, BN, diamond, alloys thereof, and combinations thereof.

47. The graphene-carbon nanotube hybrid material of claim 36, wherein the material has a specific surface area of about 2,000 $m^2/g$ to about 3,000 $m^2/g$.

48. The graphene-carbon nanotube hybrid material of claim 36, wherein the material has a specific surface area of more than about 650 $m^2/g$.

49. The graphene-carbon nanotube hybrid material of claim 48, wherein the capacitor has a specific capacitance of about 1 $mF/cm^2$ to about 1 $F/cm^2$.

50. The graphene-carbon nanotube hybrid material of claim 48, wherein the capacitor has a specific capacitance of about 2 $mF/cm^2$ to about 500 $mF/cm^2$.

51. The graphene-carbon nanotube hybrid material of claim 48, wherein the capacitor has a specific capacitance of about 2 $mF/cm^2$ to about 100 $mF/cm^2$.

52. The graphene-carbon nanotube hybrid material of claim 48, wherein the capacitor has a specific capacitance of about 2 $mF/cm^2$ to about 20 $mF/cm^2$.

53. The graphene-carbon nanotube hybrid material of claim 36, wherein the material is a component of a capacitor.

54. The graphene-carbon nanotube hybrid material of claim 53, wherein the capacitor is a two-electrode electric double-layer capacitor (EDLC).

55. The graphene-carbon nanotube hybrid material of claim 54, wherein the capacitor has an impedance phase angle of -81.5° at a frequency of 120 Hz.

* * * * *